(12) United States Patent
Laubach

(10) Patent No.: US 9,170,671 B2
(45) Date of Patent: Oct. 27, 2015

(54) TOUCH ENHANCED INTERFACE

(71) Applicant: Intellitact LLC, Beverly Hills, CA (US)

(72) Inventor: Kevin Laubach, Beverly Hills, CA (US)

(73) Assignee: Intellitact LLC, Beverly Hills, CA (US)

( * ) Notice: Subject to any disclaimer, the term of this patent is extended or adjusted under 35 U.S.C. 154(b) by 0 days.

(21) Appl. No.: 14/312,563

(22) Filed: Jun. 23, 2014

(65) Prior Publication Data

US 2014/0300568 A1  Oct. 9, 2014

Related U.S. Application Data

(63) Continuation of application No. 13/423,212, filed on Mar. 17, 2012, now Pat. No. 8,760,424.

(60) Provisional application No. 61/465,345, filed on Mar. 17, 2011, provisional application No. 61/465,308, filed on Mar. 17, 2011, provisional application No. 61/465,309, filed on Mar. 17, 2011.

(51) Int. Cl.
*G06F 3/041* (2006.01)
*G06F 3/0488* (2013.01)
*G06F 3/023* (2006.01)

(52) U.S. Cl.
CPC .............. *G06F 3/041* (2013.01); *G06F 3/0235* (2013.01); *G06F 3/0416* (2013.01); *G06F 3/04883* (2013.01); *G06F 2203/04808* (2013.01)

(58) Field of Classification Search
None
See application file for complete search history.

(56) References Cited

U.S. PATENT DOCUMENTS

| 8,698,764 | B1 * | 4/2014 | Karakotsios et al. ......... 345/173 |
| 2009/0143141 | A1 | 6/2009 | Wells et al. |
| 2010/0203948 | A1 | 8/2010 | Falciglia, Sr. |
| 2010/0281440 | A1 | 11/2010 | Underkoffler et al. |
| 2010/0309147 | A1 | 12/2010 | Fleizach et al. |
| 2013/0063385 | A1 * | 3/2013 | Nishio .......................... 345/173 |

OTHER PUBLICATIONS

International Search Report and Written Opinion for PCT/US12/29573, Jun. 8, 2012, 7 pages.

* cited by examiner

*Primary Examiner* — Kenneth B Lee, Jr.
(74) *Attorney, Agent, or Firm* — Los Angeles Patent Group; Arman Katiraei

(57) ABSTRACT

Some embodiments provide a Touch Enhanced Interface (TEI) that translates data from touch devices into a wide variety of output actions, free from the construct of mapping such touch data to an on-screen pointer or direct screen-mapped coordinates. Based on the touch and hold of one or more fingers, the TEI enables access to different sets of operations. Then based on different taps, holds, directional slides, and directional flicks of one or more fingers, the TEI performs specific operations in an accessed set of operations. Some embodiments provide a TEI viewer that displays symbols that identify the operations that can be performed using the various touches.

20 Claims, 48 Drawing Sheets

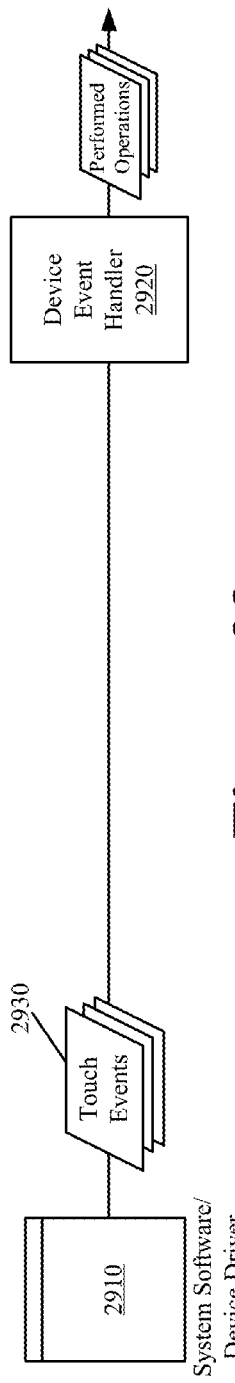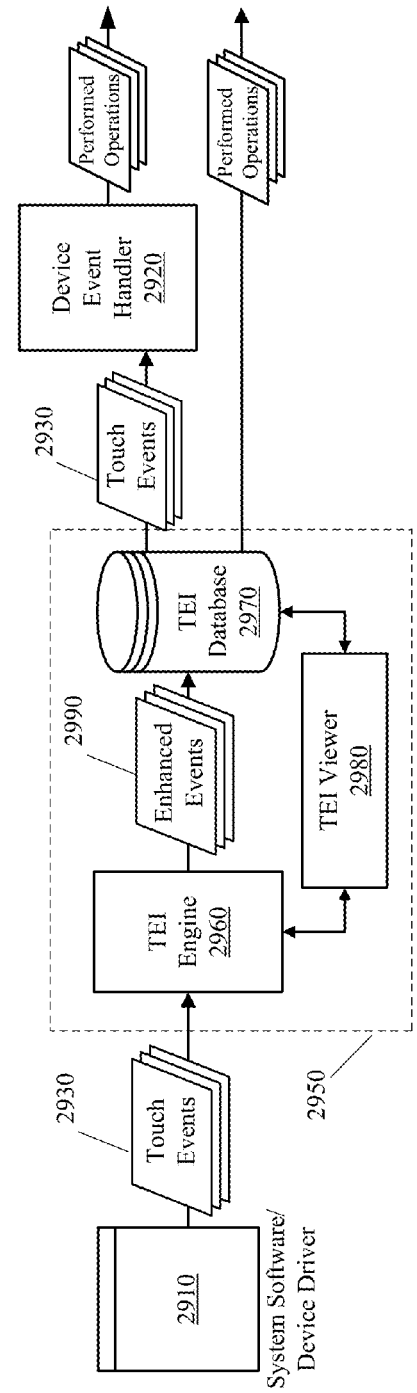
Figure 29a
Figure 29b

TOUCH ENHANCED INTERFACE

CLAIM OF BENEFIT TO RELATED APPLICATIONS

This application is a continuation of U.S. non-provisional application Ser. No. 13/423,212, entitled "Touch Enhanced Interface", filed Mar. 17, 2012 which claims the benefit of U.S. provisional application 61/465,309, entitled "Touch Enhanced Interface", filed Mar. 17, 2011, U.S. provisional application 61/465,345, entitled "Input Device User Interface Enhancements", filed Mar. 17, 2011, and U.S. provisional patent application 61/465,308, entitled "Keyboard Enhanced Interface", filed Mar. 17, 2011. The contents of application Ser. No. 13/423,212, 61/465,309, 61/465,345, and 61/465,308 are hereby incorporated by reference.

TECHNICAL FIELD

The present invention generally relates to touch-based user interface enhancements for computer systems and electronic devices.

BACKGROUND OF THE INVENTION

Laptop computers with integrated trackpads familiarized and popularized the concept of using a touch surface to control a graphical user interface (GUI). The operating systems which hosted the GUI on such devices treated the trackpad almost interchangeably with a mouse or similar pointing device because the fundamental point-and-click paradigm of the GUI was suitably mapped to basic trackpad operations such as touching, sliding and tapping. Over the years, a few "gestures" were added to expand the control vocabulary of the trackpad, but the underlying paradigm of manipulating an on-screen pointer remained the primary focus.

With the more recent development of touch surfaces integrated into an upper layer of a display device (such as in a tablet computer), specialized user interfaces have emerged which do not rely on the on-screen pointer paradigm, but rather utilize the direct mapping of touches to screen coordinates. There are ergonomic tradeoffs, however, in such a pointerless screen-mapped UI, so it will not replace pointer-based UIs, but the two paradigms will both continue to provide useful UIs for touch input.

Touch-based input devices (such as a trackpad) running under a pointer-based UI (such as Microsoft Windows or MacOS) present various shortcomings that limit their broader application to many tasks. Specifically, the trackpad and other touch-based input devices are often limited to point, click, drag, and scroll operations. As such, the speed with which a user can invoke specific output actions (such as launching an application, opening a web site, copying the selected text, etc.) is limited because of the visual identification, spatial cognition, and fine motor skills that are always a prerequisite to invoking a particular output action. Specifically, to invoke an output action, the user first identifies the on-screen location of the symbol (sometimes called a "user interface element") that identifies the desired output action. The user then moves a pointer that is controlled by the touch input device from its current location to the location of the symbol, and then issues a tap to invoke the output action. The user must perform the same visual, mental and physical steps each time the user desires to invoke the same output action. Since the pointer is at an arbitrary starting location before each invocation, the pointer trajectory will be different, and the user is unable to develop and leverage muscle memory for repeated output action invocation because the actual physical motion is not consistent.

For example, when using a touch-based input device running under a pointer-based UI to enter text, a traditional "qwerty" on-screen keyboard may be displayed with clickable symbols representing the alphabetic characters. To type the word "were", for example, the user first moves the pointer to the location of the "w" symbol and taps, then moves to the right to the location of the "e" symbol and taps, moves right again over the "r" symbol and taps, and finally moves left back to the "e" symbol and taps. Note that the "e" character was inserted two times, but the actual physical movement of invoking the first "e" involved sliding to the right and tapping, and the second "e" involved sliding to the left and tapping. This violates the first rule of muscle memory in that the same exact output action was invoked with a completely different motion. Because of this phenomenon, using a touch device to enter text on a pointer-based OS (without the enhancements provided in the present invention) is impractical and unpleasant to use. The same inefficiencies and frustration inure to other frequently used output actions in a traditional pointer-based UI. The more frequent the use, the higher the user's likely aggravation quotient.

A further limitation of touch input devices running under a pointer-based UI is that the symbol that identifies the desired output action may be hidden within folders, or hidden within a hierarchy of option screens, or hidden behind on-screen windows or within menus, etc. The user must therefore either memorize these hierarchical constructs, or search through the various menus, option screens, etc. until the symbol is finally visible and accessible on-screen. Even when the exact pathway to a desired output action is fully known because of repeated use (such as perhaps a sub-menu item within another menu item), there is a time expenditure and lack of spontaneity always associated with the precise physical movement sequence required for each invocation.

Yet a further limitation of touch input devices running under a pointer-based UI is the visual acuity and development of fine motor skills that is required in order to reliably invoke desired output actions. This is especially true for touch input, which, unlike other input modalities such as a mouse or pen, normally leaves the fingers unsupported by the palm. The degree of fine motor skills is especially apparent when output actions are only accessible within a hierarchical construct, when symbols are small or closely spaced, when the user is navigating a complex UI, and when utilizing a large screen or multiple screens.

Touch input devices running under newer screen-mapped UIs are currently used in media and gaming devices such as the iPod Touch®, smartphones (e.g., Apple's iPhone® and other smartphones powered by the Android or Windows Phone 7 operating systems), tablet computing devices such as the iPad™, automobile console controls, and a wide variety of other devices. These screen-mapped UIs allow users to utilize touch input to more directly interact with symbols, widgets, and other elements that they perceive on-screen. While this can provide significant benefit, there are still many shortcomings shared with pointer-based UIs including those outlined above, as screen-based UIs often emulate traditional keyboard and mouse functionality.

For instance, to type text on a screen-mapped touch UI, users normally insert characters by tapping on a virtual keyboard that is graphically depicted on-screen. However, when emulating a keyboard in this manner, a large amount of screen space is relegated to displaying the virtual keyboard. For smaller devices with less screen space (e.g., smartphones), the virtual keyboard occupies a majority of the screen, thereby reducing access to other functionality. If the virtual keyboard is made smaller, however, the user is more likely to make errors when using the virtual keyboard to insert characters. In an attempt to compensate for this, some manufacturers have resorted to predictive text and auto dictionary correction methods, though these methods only work in some cases and may be distracting or confusing for some users.

When emulating mouse functionality, users can invoke different output actions by tapping directly on various on-screen symbols in a manner similar to clicking or tapping on the on-screen symbols indirectly in a pointer-based UI. There are benefits and tradeoffs to this approach, and there remain inefficiencies including those described above which limit the speed and accuracy with which users can invoke output actions, including the arrested development of muscle memory for repeated output action invocation. Additionally, the hand and fingers themselves often obscure the identification of symbols, and the fingers do not provide a precise point at which object delineation is apparent.

Some pointer-based and screen-mapped UIs utilize a limited set of predefined touch gestures to improve upon the above-described shortcomings. However, these predefined touch gestures are inconsistently applied across applications, and certain gestures perform different operations in different applications or are ignored in other applications. Also, it is difficult for the user to readily identify or discover the gestures that may be available or applicable, or the techniques required to invoke them properly.

Accordingly, there is a need for enhancements to both pointer-based and screen-mapped UIs that allow users to better interact with computers and devices using existing touch hardware. Specifically, there is a need to improve how users invoke frequently used output actions when using a touch-based input device, such as launching favorite applications or web sites. There is a further need to increase the accuracy and degree of comfort with which users can invoke output actions when using touch devices so that the user does not have to guess at which output actions will be executed. There is a further need to relieve users from the need to memorize the location of hierarchically confined symbols, or search through multiple screens or other UI constructs to locate a desired symbol. There is also a need to develop and leverage the user's innate muscle memory so that with repeated use output actions can be performed with little mental, visual or physical effort. There is also a need to move users away from traditional emulated virtual keyboards so that character insertion can occur more quickly and accurately, while requiring little or no screen space.

SUMMARY OF THE INVENTION

It is an object of the present invention to define an apparatus, method, system and computer software product that translates data generated by touch devices into a wide variety of output actions, free from the construct of first mapping such touch data to an on-screen pointer or direct screen-mapped coordinates. This provides significant interface enhancements for all types of touch input devices, whether running under a traditional pointer-based user interface (UI) or a newer screen-mapped UI. This is because the present invention utilizes touch input in a unique way that is not dependent on either a pointer or screen coordinates, and represents another paradigm shift in the evolution of touch input devices. This new type of touch utilization allows a user to invoke actions from anywhere on a touch surface, so the UI is essentially omnipresent, and for the sake of disambiguation will be referred to herein as an omni-touch UI. A further object of the present invention is to seamlessly integrate an omni-touch UI into an existing pointer-based UI. A further object of the present invention is to seamlessly integrate an omni-touch UI into an existing screen-mapped UI.

To achieve the objects and in accordance with the purpose of the invention, as embodied and broadly described herein, some embodiments provide an apparatus, method, system and computer program product that provides a touch enhanced interface (TEI) system for monitoring touch input device activity and for performing various operations including output action invocation, character insertion (typing text), and text operations in response to specific touch manipulations. In some embodiments, the touch manipulations include an individual or combinational touch of the index, middle, ring, and little fingers. Through these variations, users can (i) gain access to different sets of operations and (ii) perform specific operations in an accessed set of operations with various touch actions that include taps, holds, directional slides, and directional flicks.

Some embodiments provide a TEI viewer that displays a set of symbols that identify the set of operations that can be performed using the various touch combinations. In some embodiments, the TEI viewer displays a first set of symbols when a user performs a four finger tap anywhere on the device. The first set of symbols identifies a first set of operations that can be invoked with flicks or taps of corresponding touch combinations. The display of the TEI viewer can swap a first set of symbols with a second set of symbols that identify different operations by performing a four finger flick in at least one of two directions (e.g., right or left). The TEI viewer can then be hidden or dismissed by performing one of the identified operations, by issuing a four finger tap, or by issuing a four finger downward flick in some embodiments.

Rather than display the TEI viewer with the four finger tap and cycle through the sets of symbols to identify a desired set of symbols with four finger flicks, some embodiments allow the TEI viewer to be directly invoked with a specified set of symbols that identify a specified set of operations. To do so, the user performs a four finger flick in one of several different directions (e.g., up, right, and left) instead of performing the four finger tap. For example, a four finger upward flick displays the TEI viewer with a second set of symbols that identifies a second set of operations, a four finger leftward flick displays the TEI viewer with a third set of symbols that identifies a third set of operations, and a four finger rightward flick displays the TEI viewer with a fourth set of symbols that identifies a fourth set of operations.

In addition to or instead of the four finger taps and four finger directional flicks, some embodiments display the TEI viewer with a specified set of symbols when a user performs a touch and hold with any variable number of touches (e.g., one, two, three, four, or more touches) in a relevant combination. In some such embodiments, a different set of operations are identified by a different set of displayed symbols based on which fingers perform the touch and hold. Consequently, users can immediately and repeatedly access a desired set of symbols for a desired set of operations. After repeated use, users can automatically utilize muscle memory to select a desired set of operations and perform a desired operation without conscious effort and without having to look at the TEI viewer display for visual confirmation.

In some embodiments, the TEI viewer displays multiple rows of symbols with each lower row displaying more symbols than the row that is immediately displayed above it. This provides a geometrically identifiable shape (e.g., triangle or pyramid) within which the location of various symbols is readily apparent. In some embodiments, the first row or the bottommost row includes four symbols. Each of the four symbols identifies a different operation that can be performed by flicking a particular individual touch in a particular direction. For example, a flick of the index finger downward performs the operation that is identified by the leftmost symbol in the first row and a flick of the little finger downward performs the operation that is identified by the rightmost symbol in the first row.

The second row that is displayed above the first row includes three symbols in some embodiments. The three symbols identify different operations that can be invoked by flicking different pairs of adjacent touches in a particular direction. For example, an essentially simultaneous flick of the index finger and the middle finger downward performs the operation that is identified by the leftmost symbol in the second row and an essentially simultaneous flick of the ring finger and the little finger downward performs the operation that is identified by the rightmost symbol in the second row.

The third row that is displayed above the second row includes two symbols in some embodiments. The two symbols identify different operations that can be performed by essentially simultaneously flicking different sets of three adjacent touches in a particular direction.

The fourth row that is displayed above the third row includes a single symbol in some embodiments. In some embodiments, the single symbol identifies an operation that can be performed by essentially simultaneously flicking four touches in a particular direction.

In some embodiments, the TEI viewer highlights or otherwise designates the symbols that a user can access based on the detected set of touches. Accordingly, when the TEI viewer is displayed and the user retains an index finger touch, the leftmost symbol in the first row is highlighted. If the user retains the index finger touch and adds a middle finger touch, the leftmost symbol in the second row is highlighted. The display of other un-highlighted symbols may be unchanged, dimmed, or partially obscured through blurring or other graphical means.

In some embodiments, each symbol of the TEI viewer is a topmost symbol. Each topmost symbol is expandable to present an underlying set of symbols. To expand a particular topmost symbol in the TEI viewer, the user performs a slide of the touch combination that is associated with the particular topmost symbol beyond a distance threshold in some embodiments. The expanded set of symbols can be collapsed back to the topmost symbol by releasing the touch combination or selecting a new touch combination.

In some embodiments, each topmost symbol is expanded to a set of four symbols that are displayed in a cross-shaped orientation with a first symbol at the down position, a second symbol at the up position, a third symbol at the left position, and a fourth symbol at the right position. Each symbol within an expanded set of symbols identifies a different operation. A particular operation that is identified by a particular symbol in the expanded set of symbols can be performed by sliding the corresponding touch combination that is used to expand the set of symbols in the direction of the particular symbol and then performing a directional flick in the same direction. Alternatively, the particular operation can be performed by directionally flicking the corresponding touch combination in the direction of the particular symbol without having to first perform a slide. In this manner, an operation that is identified by a symbol within a set of expanded symbols can be performed without expanding the corresponding topmost symbol. Through repeated use, the one or more touches, taps, holds, slides and directional flicks that are used to access and perform different operations become ingrained in the user's muscle memory. Automatically utilizing this innate muscle memory, the user can recreate these actions without conscious effort in order to perform desired operations on a touch operated device. In this manner, output actions are invoked, text is inserted, and text operations are performed quickly, accurately, and without needing to consult the TEI viewer, and in some cases without even looking at the device display when performing an operation. In some embodiments, a setting may be specified to cause the TEI viewer not to display after the user has developed sufficient muscle memory to know which operations can be performed with which flicks or taps. To further enhance one's ability to use the TEI system without referring to the TEI viewer, the TEI system also includes audio feedback to audibly identify operations based on an oscillating motion of detected touches.

In some embodiments, the symbols of the TEI viewer automatically change based on system state information. For example, the TEI viewer invokes automatically and symbols automatically change to identify characters for insertion when a text field has focus and when there are no selected characters within the text field. As another example, the symbols automatically change to identify text operations to perform when a text field has focus and when there are characters selected within the text field. As yet another example, the symbols automatically change to identify specific output actions that are associated with an application that has become frontmost. Accordingly, the symbols that are displayed and the operations that can be performed dynamically change based on system state information.

BRIEF DESCRIPTION OF THE DRAWINGS

In order to achieve a better understanding of the nature of the present invention, a preferred embodiment of the touch enhanced interface will now be described, by way of example only, with reference to the accompanying drawings in which:

FIG. 29a illustrates the simplified operation of a touch operated device without the TEI system of some embodiments.

FIG. 29b illustrates the enhanced operation of the touch operated device when the device is enhanced with the TEI system of some embodiments.

DETAILED DESCRIPTION

Figure 1:
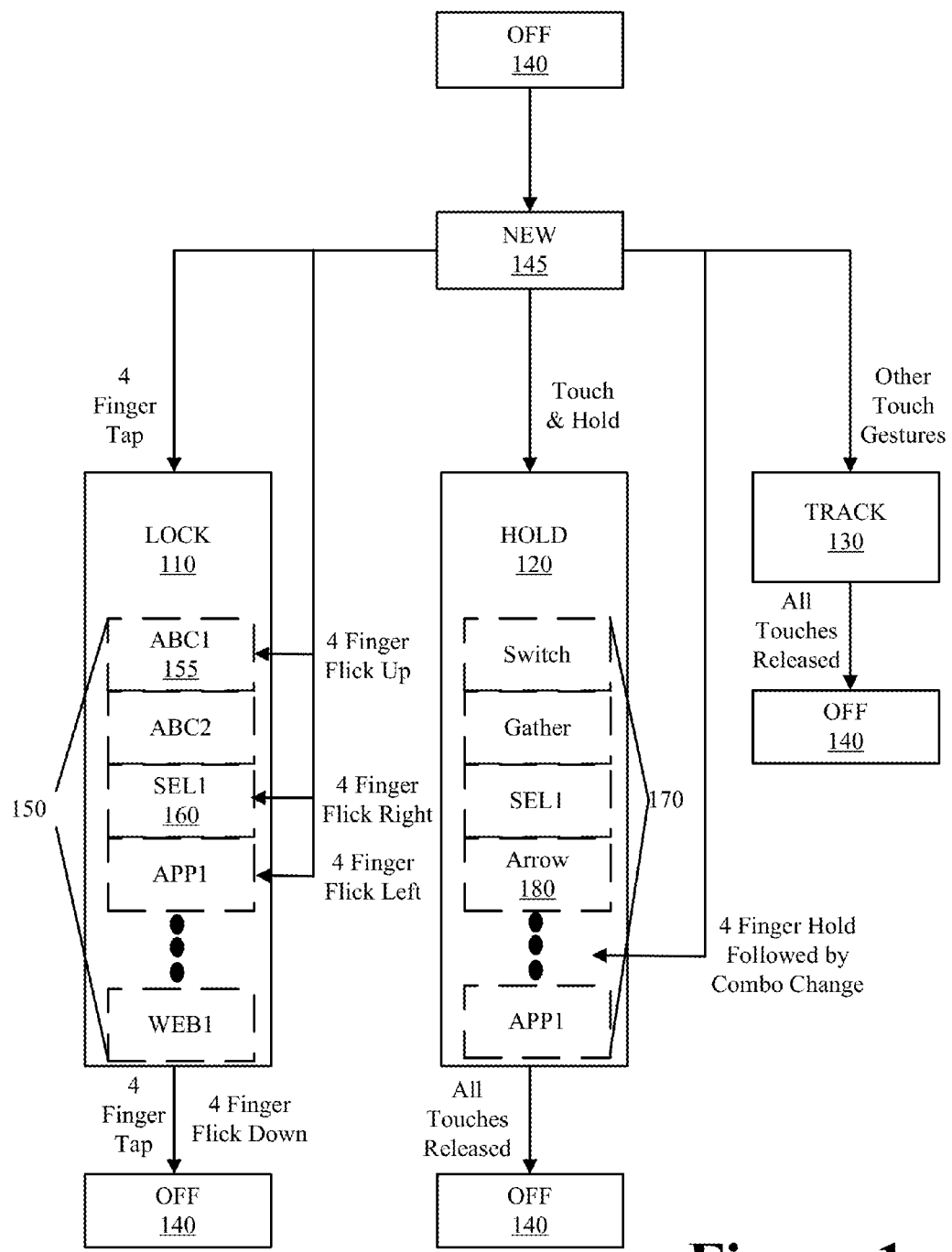
FIG. 1 illustrates various operational modes of the TEI system and steps to access different sub-modes within a particular operational mode in accordance with some embodiments.

In the following detailed description, numerous details, examples, and embodiments of the Touch Enhanced Interface (TEI) system are set forth and described. As one skilled in the art would understand in light of the present description, the TEI system is not limited to the embodiments set forth, and the TEI system may be practiced in other embodiment permutations not specifically delineated, and without some of the specific details and examples discussed, without departing from the scope and objects of the invention.

Specifically, embodiments will first be described which utilize combinations of four-finger touches. This is done for the sake of clarity and simplicity, and it should be clear that embodiments utilizing more or fewer fingers, thumbs, palms, or inputs from multiple devices acting in concert would fall within the scope and objects of the present invention. Some further embodiments utilizing fewer fingers are subsequently set forth to illustrate and reinforce this understanding. Also, reference is made to accompanying figures, which illustrate specific embodiments in which the invention can be practiced. It is to be understood that other embodiments can be used and structural changes can be made without departing from the scope of the embodiments of this invention.

To aid in the discussion below, the terms essentially simultaneous and essentially simultaneously are used to address the fact that touches of a touch combination involving two or more touches may not be applied, tapped, slid, or flicked at exactly the same instance in time, and further, the operating system representations of touch began, moved, and ended messages are normally or necessarily processed in a serial fashion. Therefore, some acceptable time deviation is permitted by the TEI system to register the touch combination, register a touch combinational tap, register a touch combinational slide, or register a touch combinational flick in a manner that the user would expect based on their actions. More specifically, when a user touches a touch sensitive surface of a multi-touch device with what the user intended to be two simultaneous touches, the device is able to interpret the touches as such, even though one touch actually occurred slightly later in time than the first touch. Similarly when sliding two touches across a touch sensitive surface, the device is able to distinguish that the slide of one finger began later than that of another finger. In all such situations, the TEI system provides various algorithms, which are dynamic, iterative, and self-correcting in some embodiments, to correctly interpret such touch combinational touches, taps, slides, and flicks as occurring essentially simultaneously in order to produce the results described below. Furthermore, in some embodiments, the timing and deflection of touch movements factor into the algorithm which delineates physical movements into user intended actions. In this disclosure therefore, when reference is made to a touch combinational tap, flick, or slide without the term essentially simultaneous, it is to be inferred that the touch combination is one that occurs essentially simultaneously.

Furthermore, the figures are presented to describe right-handed operation of the TEI system with illustrated touches, taps, slides, and flicks being performed by the right hand of a user. Specific exceptions for left-handed usage are noted below. However as will be described below, the TEI system provides functionality for differentiating between a right-handed user and a left-handed user and the TEI system also provides functionality for either default right-handed operation or default left-handed operation. Accordingly, it should be apparent to one of ordinary skill in the art that in light of the discussion below that the TEI system may be operated with the left hand using left-handed touches, taps, slides, and flicks without any loss of functionality. Also, some embodiments allow for dual and/or multiple hand operation on hardware of sufficient size, and the left-right hand determination description below applies in such settings in a dynamic manner.

I. TEI Operation

Some embodiments provide a touch enhanced interface (TEI) for performing various operations including output action invocation, character insertion (typing text), and text operations based on variations of a combinational touch. In some embodiments, the combinational touch includes an individual or multiple touches of the index, middle, ring, and little fingers. In some other embodiments, the combinational touch may incorporate use of fingers and thumbs of either hand, palms, and inputs from multiple devices acting in concert. Through these various touch combinations, users can (i) gain access to different sets of operations and (ii) perform specific operations in an accessed set of operations with various touch actions that include taps, holds, directional slides, and directional flicks. In the following discussion, a touch combination refers to individual touches or essentially simultaneous sets of two or more touches and a touch action refers to a touch, tap, hold, slide, and flick of any touch combination.

In some embodiments, a touch is distinguished from a hold, a tap, a slide, and a flick. A touch involves the contact of a finger or other part of the hand (e.g., palm). A hold involves a touch wherein at least one contact is held beyond a time threshold and does not move beyond a distance threshold. In some embodiments, the time threshold is defined as a duration that if exceeded will cause the threshold to be satisfied. In some embodiments, the distance threshold is defined to be some surrounding area or region of regular or irregular shape and size that if moved beyond or outside of will cause the threshold to be satisfied. A tap involves a touch and release of one or more touches before a time threshold is reached, where repeated touches and releases of a finger combination can be used to distinguish different taps (e.g., double taps or triple taps). A slide involves movement of one or more touches with the touches being retained after the movement is complete. A flick involves movement of one or more touches beyond a distance threshold within a time threshold just prior to the release of the touches.

A. Operational Modes

In some embodiments, the TEI is implemented by a TEI system that includes a TEI engine, a TEI database, and a TEI viewer that are described below in Section II. The TEI system operates in one of several operational modes. Each operational mode includes zero or more sub-modes. Each sub-mode provides access to a different set of operations. Each operation can invoke an output action, insert a character, or perform a text manipulation action. In some embodiments, the set of operations of a particular sub-mode are related. For example, operations of a first sub-mode may be used to invoke output actions of a first application and operations of a second sub-mode may be used to perform character insertion in a text field.

FIG. 1 illustrates the various operational modes of the TEI system and steps to access different sub-modes within a particular operational mode in accordance with some embodiments. As shown, the TEI system includes a LOCK operational mode 110, a HOLD operational mode 120, and a TRACK operational mode 130. The LOCK operational mode 110 includes sub-modes 150. The HOLD operational mode 120 includes sub-modes 170. In this figure, each sub-mode is represented by a rectangular box that identifies the set of operations that are available in that sub-mode. Each sub-mode is also associated with a set of symbols, speech, audio, zipper text, etc. that identify the corresponding set of operations through the TEI viewer. The TRACK operational mode 130 does not include any sub-modes as it is generally under control of the OS and not the TEI system.

When starting the TEI system and before any touches are detected, the TEI system is in the OFF state 140. The TEI system transitions from the OFF state 140 to the NEW state 145 upon receiving events that include raw data for identifying user touches. In the NEW state 145, the TEI system aggregates the received events for analysis where the aggregated events include events that are received in an essentially simultaneous timeframe beginning from the detection of the first touch (e.g., a few milliseconds). The analysis of the aggregated events performed when in the NEW state 145 determines which operational mode and, more specifically, which sub-mode to enter.

The TEI system enters a sub-mode 150 of the LOCK operational mode 110 when the TEI system determines that the aggregated event analyzed while in the NEW state 145 produce in an essentially simultaneous four finger tap or an essentially simultaneous four finger directional flick in the up, left, or right directions in some embodiments. In some embodiments, an essentially simultaneous four finger tap can be used to enter the last accessed sub-mode in the LOCK operation mode 110. For example, if sub-mode 160 was last accessed before exiting the LOCK operational mode 110, an essentially simultaneous four finger tap will cause the TEI system to reenter sub-mode 160 and provide access to the set of operations that are associated with sub-mode 160.

In some embodiments, the TEI system remains in the selected sub-mode until an operation is performed, another four finger tap is issued, or a four finger downward directional flick is performed. When one of these three actions is performed, the TEI system exits the LOCK operational mode 110 and reverts to the OFF state 140 and in some embodiments, the TEI viewer will be dismissed from the display.

The user can cycle between the different sub-modes 150 when already in the LOCK operational mode 110 by performing a four finger directional flick in one of two directions in some embodiments. Each four finger directional flick in one of the specified directions causes the TEI system to enter a different LOCK sub-mode, thereby providing the user with access to a different set of output actions that are associated with the active sub-mode. Switching between sub-modes may be depicted on the TEI viewer with a corresponding animation. For example, the TEI viewer swaps out the symbols that identify a set of operations of a first sub-mode (e.g., sub-mode 155) with the symbols that identify a set of operations of a second sub-mode (e.g., sub-mode 160).

In addition to or instead of a four finger tap, the TEI system allows users to enter a specific sub-mode of the LOCK operational mode 110 from the OFF state 140 by using four finger directional flicks in the up, left, and right directions. Each directional flick (i.e., up, left, or right) causes a different sub-mode to become active and thereby provides the user with immediate access to a different set of operations. For example, when the TEI system detects the first touch of an upward four finger flick, the TEI system transitions from the OFF state 140 to the NEW state 145 where the flick is analyzed to determine the number of fingers involved in the flick and the direction of the flick. Upon determining that an essentially simultaneous upward four finger flick was performed, the TEI system transitions from the NEW state 145 to the sub-mode 155 of the LOCK operational mode 110. A rightward four finger flick causes the TEI system to enter sub-mode 160 of the LOCK operational mode 110.

From the OFF state 140, the user can perform a touch and hold to cause the TEI system to enter one of the sub-modes 170 of the HOLD operational mode 120. The NEW state 145 analyzes the number of touches being held and which touches are being held in order to determine which of the HOLD operational sub-modes 170 to enter. The TEI system may also enter a sub-mode 170 of the HOLD operational mode 120 when a user performs a four finger touch and immediately thereafter releases some of the touches while continuing to hold other touches. This "partial release" operation is described in further detail below with reference to 3076 of FIG. 30*b*. Each sub-mode 170 of the HOLD operational mode 120 provides access to a different set of operations. The sets of operations may include zero or more sets of operations that were accessible from the sub-modes 150 of the LOCK operational mode 110 or may include different sets of operations. The TEI system remains in the selected HOLD sub-mode so long as the at least one touch that is used to gain access to that sub-mode remains held and not moved beyond a distance threshold. The user can switch between the different HOLD sub-modes 170 by altering which one or more touches are held.

The TRACK operational mode 130 allows users to perform traditional preexisting touch gestures of the device. For example, when the TEI system is used in conjunction with a trackpad, the TRACK operational mode 130 allows touches on the trackpad to revert to preexisting trackpad operations such as pointer movements (one finger trackpad operation) or scrolling (two finger trackpad operation). In this manner, the TEI system does not interfere or prevent preexisting touch gestures from being performed.

As noted above, the TEI system includes a TEI viewer which displays a set of symbols that identify the set of operations that can be performed using the various touch combinations when in a particular sub-mode of the LOCK operational mode 110 or HOLD operational mode 120 is active. In some embodiments, the TEI viewer is hidden when the TEI system is in the OFF state 140 or in the TRACK operational mode 130 and the TEI viewer is displayed when a sub-mode of either the LOCK operational mode 110 or HOLD operational mode 120 is active. In the figures that are presented in the discussion below, the TEI viewer is displayed on-screen to aid in the discussion. However, the TEI system of some embodiments includes settings that allow users to hide the TEI viewer in certain operational modes or sub-modes. For example, the size of the TEI display may be rendered smaller and smaller, and eventually hidden completely when a user's muscle memory is sufficiently developed to perform various operations without needing to reference the TEI viewer display. Additionally, the settings may be set to display the TEI viewer at different times after different sub-modes become active. For example, the TEI viewer may be set to (i) display two seconds after a first LOCK sub-mode becomes active and (ii) immediately display after a second LOCK sub-mode becomes active. This allows the user (i) to leverage her/his muscle memory to perform various operations without occupying screen space with the TEI viewer for certain sub-modes that have been repeatedly accessed by the user and (ii) to refer to the TEI viewer display for other sub-modes when the user's muscle memory has not yet sufficiently developed to know which actions of which touches perform which operations. In some embodiments and with continued use, automatic background heuristic analysis performed by the TEI system dynamically sets TEI viewer size, delay, and other parameters based on the user, current application and application state, current mode and sub-mode, and other data.

For the sake or clarity and simplicity, many of the figures and discussion for the TEI system operation and functionality below is presented relative to a multi-touch trackpad device that is utilized as an input device to a computing system running a pointer-based UI. The same or similar operation and functionality may be utilized with other touch-based input device and touch-based interfaces. For example, the operation and functionality described below is adaptable to any type of a capacitive touchscreen, resistive touchscreen, any other touchscreen technology, a set of touch sensitive buttons, areas, or touch sensitive keys that are used to provide inputs to a device, or any other sensing hardware that detects multiple finger movements and that is coupled to a device or is attached as a peripheral. The device may include a media and gaming device (see above), touch sensitive mouse (e.g., Apple Magic Mouse), cellular phone, smartphone, portable digital assistant (PDA), tablet computing device, navigation device, electronics console, notebook or laptop computer system, desktop computer system, "ten foot" interface to another device or computer system, or other electronic device or computer system with touch-based input capabilities. Accordingly, the figures and discussion below is not intended to limit the operation and functionality of the TEI system to a trackpad and pointer-based UI, but is presented using the trackpad for explanatory and exemplary purposes. Some specific embodiments utilizing a screen-mapped UI (tablet) device will also follow.

B. TEI Viewer

Figure 2:
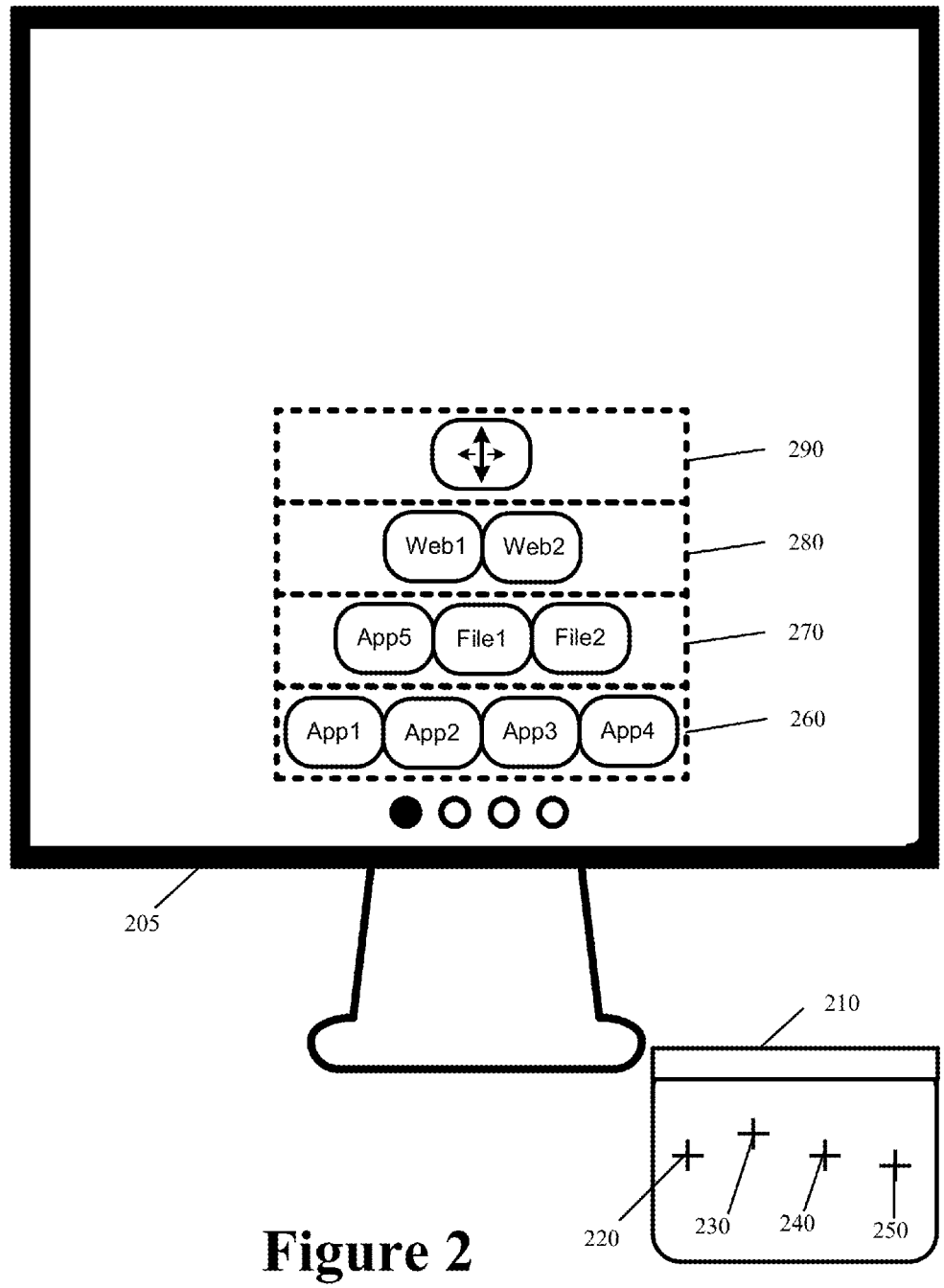
FIG. 2 illustrates displaying the TEI viewer of some embodiments by issuing a four finger tap on an external trackpad device running under a pointer-based UI.

FIG. 2 illustrates displaying the TEI viewer of some embodiments by issuing a four finger tap on an external trackpad device 210 running under a pointer-based UI. The trackpad 210 can be used separately or in conjunction with other input devices (e.g., keyboard, touchscreen, etc.) to operate the computer system 205. The trackpad 210 may also be built into a laptop or notebook or its functionality may be incorporated into a display.

In FIG. 2 and in subsequent figures, each tap that is performed by a finger is depicted by a "+". For example, 220, 230, 240, and 250 represent an essentially simultaneous four finger tap that is performed on the trackpad 210 with the right hand. In this figure, the tap 220 is performed by the index finger of the right hand, the tap 230 is performed by the middle finger of the right hand, the tap 240 is performed by the ring finger of the right hand, and the tap 250 is performed by the little finger of the right hand. The four finger tap causes the TEI system to enter the sub-mode that was last accessed when in the LOCK operational mode. Several of the figures immediately following FIG. 2 continue with examples for describing the operation of the TEI system when in the LOCK operational mode. Examples of operating the TEI system in other modes such as the HOLD operational mode are presented further below with reference to FIG. 16.

The four finger tap 220-250 causes the TEI viewer to display on-screen with rows of symbols 260, 270, 280, and 290. Symbols within the rows 260-290 are represented in this figure by rounded rectangles and are arranged in a triangular or pyramid configuration at the bottom center of the screen. This provides a geometrically identifiable shape within which the location of various symbols is readily apparent to the user. As one skilled in the art would understand in light of the present description, the TEI viewer may be displayed in any shape, size, or representation with symbols of any shape, size, or representation. For example, under a screen-mapped UI, the TEI viewer may be presented at the top center of the device in an inverted triangle configuration in order to minimize the occlusion of the TEI viewer by the fingers of the user.

The TEI viewer remains on-screen until an operation that is identified by a symbol in rows 260-290 is performed, or the TEI viewer is removed by issuing a four finger tap or performing a four finger downwards flick in some embodiments. The operations that are identified by the symbols in rows 260-290 can be performed with touch combination directional flicks that are performed independent of the TEI viewer display. Specifically, the touch combination directional flick that performs an operation identified by a particular symbol can be performed anywhere on the trackpad device without the need to first position the fingers or a pointer over any particular symbol. In this manner, touch-based operations can be performed without the need for great visual acuity and fine motor skills, and without performing actions in discrete constrained regions that are determined by the actual display resolution of the device. In fact, after the user develops muscle memory for invoking a particular output action with a particular touch combination directional flick, the TEI viewer may optionally be reduced in size or hidden, and the user can still invoke the particular output action with that particular touch combination directional flick.

As shown in FIG. 2, the TEI viewer displays multiple rows of symbols 260-290. Each lower row displays more symbols than the row that is immediately displayed above it. The rows of symbols 260-290 are shown at the bottom center of the screen though the TEI viewer can be configured to display the rows of symbols 260-290 anywhere on the screen and in other configurations (e.g., inverted pyramid configuration from the top of the screen). In some embodiments, the display of the TEI viewer is animated such that the rows of symbols 260-290 rise up from the bottom of the screen when the four finger tap is issued. In some embodiments, when the TEI viewer is displayed over other graphical content, the graphical content underneath is blurred, dimmed, or otherwise partially obscured. In some embodiments, the TEI viewer is displayed with partial opacity to reveal the content underneath. In some embodiments, the TEI viewer is displayed with a three dimensional effect and/or a drop shadow effect to distinguish it from the underlying content.

In some embodiments, the symbols of the TEI viewer in FIG. 2 and the symbols of the TEI viewer in the following figures display textual descriptions, graphics, icons, and/or animations. In some embodiments, "zipper" text is displayed across a symbol. The zipper text provides a textual description or label that scrolls across the symbol. In some embodiments, a symbol includes zero or more badges. A badge is displayed over the symbol and provides status information such as a number of unread emails, new voicemails, whether an application is currently running, etc.

The TEI viewer may display the same symbol at different resolutions based on the size of the TEI viewer on-screen. At each resolution, a symbol may include more or less visual information such as text, graphics, icons, and/or animations. In some embodiments, the size of the TEI viewer and the displayed symbols of the TEI viewer may be enlarged by sliding all four touches of the four finger touch in a first direction (e.g., upward) and reduced by sliding all four touches of the four finger touch in an opposite direction (e.g., downward). In some embodiments, the size of the TEI viewer is retained in memory such that the next time the TEI viewer is displayed, the size of the TEI viewer is as the user previously specified for a particular sub-mode and set of symbols. Furthermore, in some embodiments the size of the TEI viewer slowly increases or decreases in size after the viewer is first invoked, and subsequent invocations after a time threshold may reset the TEI viewer to a previous size.

With reference back to FIG. 2, the first row of symbols 260 includes four symbols in some embodiments which identify different operations that can be performed by flicking different individual touches in a particular direction (e.g., up, down, left, or right). These operations may include different output actions that can be invoked such as launching an application or visiting a web site, different characters that can be inserted, and/or different text operations that can be performed. Invoking an output action may include launching an application, opening a file (e.g., documents, images, videos, audio files, etc.), accessing folders, adjusting a widget, executing scripts, issuing calls to one or more application programming interfaces (APIs) or libraries, executing operating system (OS) or application commands, or performing other OS or application operations. Performing a text operation may include, for example, selecting text or cutting, copying, pasting, bolding, italicizing, etc. a selected set of characters.

The second row of symbols 270 that is displayed above the first row 260 includes three symbols in some embodiments which can be accessed by essentially simultaneously flicking different pairs of adjacent touches in a particular direction. For example, essentially simultaneously flicking the index finger (identified by tap 220) and the middle finger (identified by tap 230) downward performs an operation that is identified by the leftmost symbol in the second row 270, essentially simultaneously flicking the middle finger and the ring finger (identified by tap 240) downward performs an operation that is identified by the middle symbol in the second row 270, and essentially simultaneously flicking the ring finger and the little finger (identified by tap 250) downward performs an operation that is identified by the rightmost symbol in the second row 270.

The third row of symbols 280 that is displayed above the second row 270 includes two symbols in some embodiments which can be performed by essentially simultaneously flicking different sets of three adjacent touches in a particular direction. For example, essentially simultaneously flicking the touch combination of the index finger, middle finger, and ring finger downward performs the operation that is identified by the leftmost symbol in the row 280 and essentially simultaneously flicking the touch combination of the middle finger, ring finger, and the little finger downward performs the operation that is identified by the rightmost symbol in the row 280.

The fourth row 290 that is displayed above the third row 280 includes a single symbol in some embodiments that is accessed when all four fingers are touching. In some embodiments, the single symbol in the fourth row 290 identifies one or more operations for altering the TEI viewer display or accessing different sets of symbols. In some embodiments, the single symbol in the fourth row 290 provides a graphical or textual identification of the group of symbols that are displayed in the other rows of the TEI viewer. For example, if the group of symbols relate to operations for launching applications, then the symbol in the fourth row may include "Apps" as a textual description of the group of symbols.

In some embodiments, the TEI viewer includes additional rows or symbols that identify operations that can be performed by flicking or tapping sets of non-adjacent touches. For example, an optional fifth row may be displayed with a set of symbols that identify operations that can be performed with directional flicks of the touch combination of the index finger and the little finger.

i. Symbol Highlighting

Figure 3:
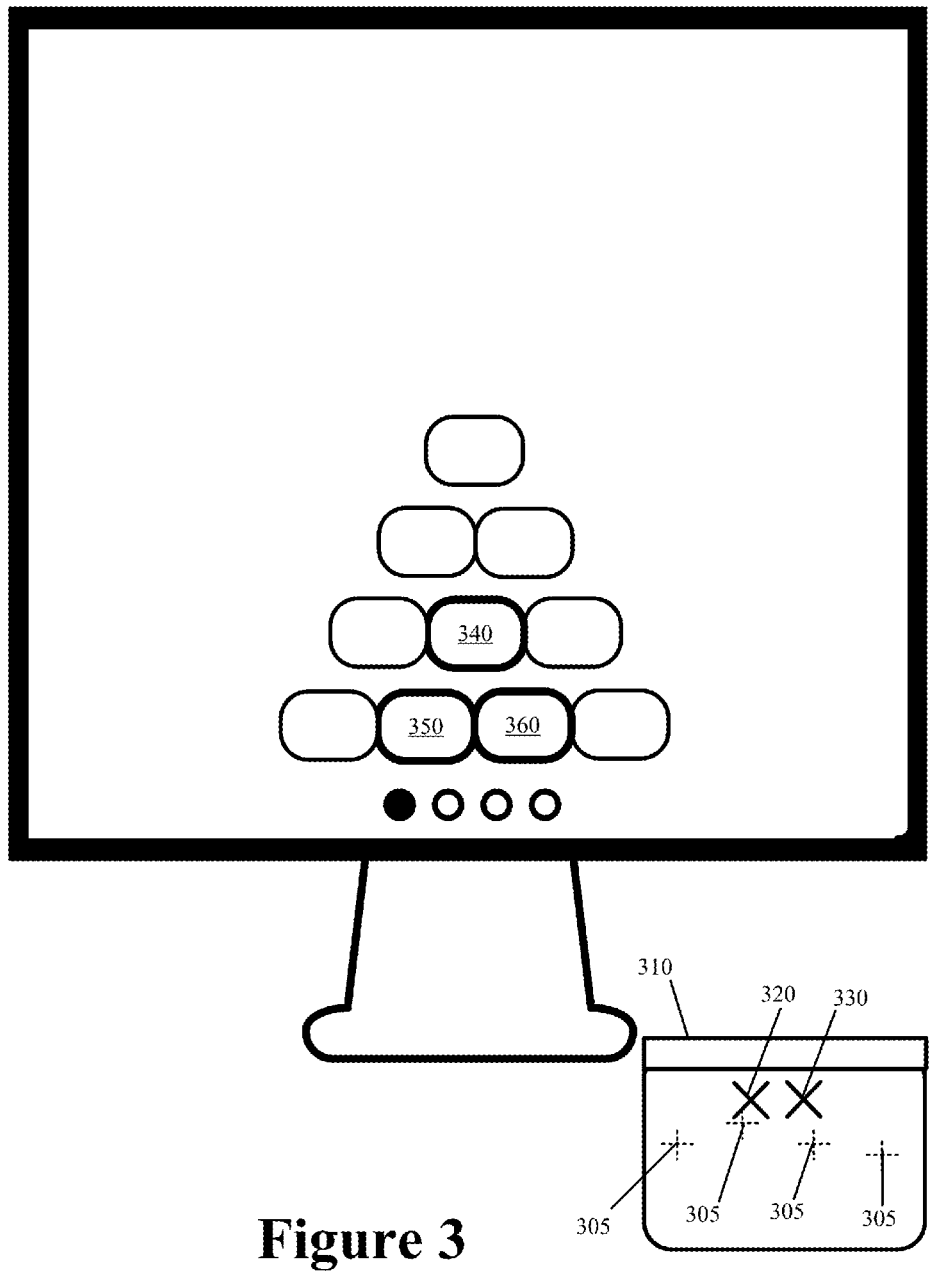
FIG. 3 illustrates the TEI viewer symbol highlighting in accordance with some embodiments.

To assist the user in identifying which symbols are accessible with which touch combinations, the TEI viewer highlights or otherwise designates accessible symbols based on detected touch combinations. FIG. 3 illustrates the TEI viewer symbol highlighting in accordance with some embodiments. In this figure, the user performs an initial four finger tap 305 (as denoted by the dotted "+"s) on the trackpad 310 to display the TEI viewer. The user then performs a middle finger touch 320 and a ring finger touch 330 on the trackpad 310.

Figure 4:
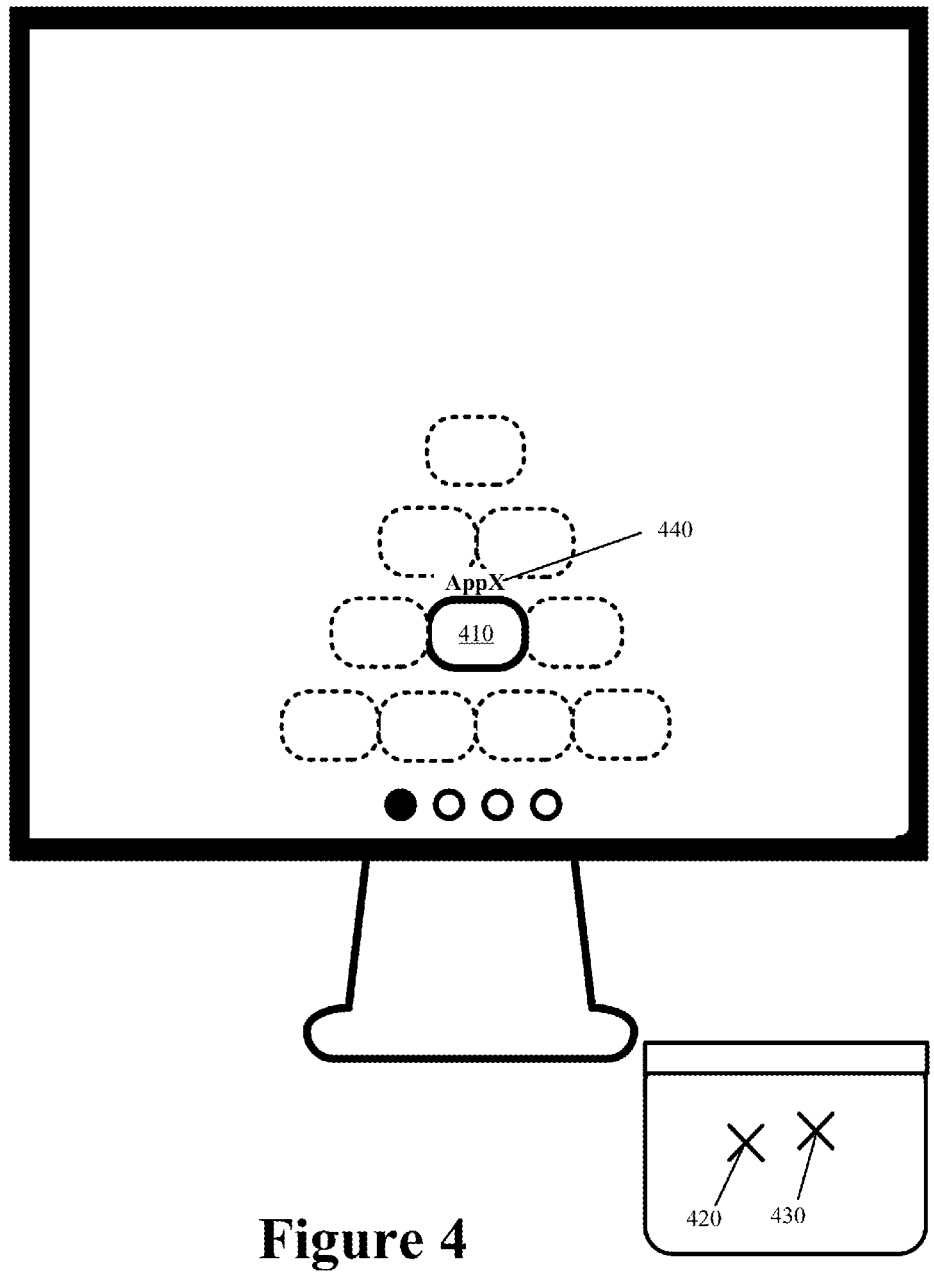
FIG. 4 illustrates highlighting a symbol to indicate that the user can perform the operations that are identified by the symbol while retaining the touch of the middle and ring fingers.

Based on the current detected touch combination (i.e., 320 and 330), the user can perform (i) operations that are identified by symbol 340 using the touch combination, (ii) operations that are identified by symbol 350 using the individual touch 320 of the middle finger, and (iii) operations that are identified by symbol 360 using the individual touch 330 of the ring finger. To identify this correspondence, the TEI viewer highlights symbols 340, 350, and 360 in order to provide a visual reference to the user. In some embodiments, highlighting includes shading, bolding, coloring, or otherwise making the border of a symbol more prominent than the borders of other symbols. In some embodiments, the display of other symbols that are not highlighted (not symbols 340, 350, and 360) remains unchanged. In some other embodiments, the other symbols that are not highlighted are dimmed or are partially obscured through blurring or other graphical means. For example, in FIG. 4, symbol 410 is highlighted to indicate that the user can perform the operations that are identified by the symbol 410 while retaining the touch of the middle 420 and ring 430 fingers. However, the other symbols are dimmed as represented by the dotted symbols. As the user alters the touch combination, the TEI viewer display updates in real-time to highlight or remove highlighting from the symbols.

In addition to or instead of the highlighting, some embodiments provide a textual description over a symbol that is accessed based on a detected touch combination. For example, in FIG. 4, text 440 displayed over symbol 410 identifies that the "AppX" application can be launched using the detected touch combination of the middle 420 and ring 430 fingers.

ii. Cycling Between Different LOCK Sub-Modes

When a particular sub-mode of the LOCK operational mode is active, the user can cycle to other sub-modes by issuing a four finger directional flick in one of two directions (e.g., right or left) in some embodiments. Whenever a four finger flick is issued to cycle between the sub-modes, the TEI viewer display is updated to present a set of symbols that identify the set of operations that are associated with the sub-mode that is currently active. In some embodiments there is a corresponding animation with the change of symbols to help the user associate the new set of symbols with the left or right flick. To facilitate muscle memory development, some embodiments further provide an audible message that describes or otherwise identifies the sub-mode that has become active. The audible message may correspond to the graphical or textual description that is provided by the symbol in the topmost row.

Figure 5:
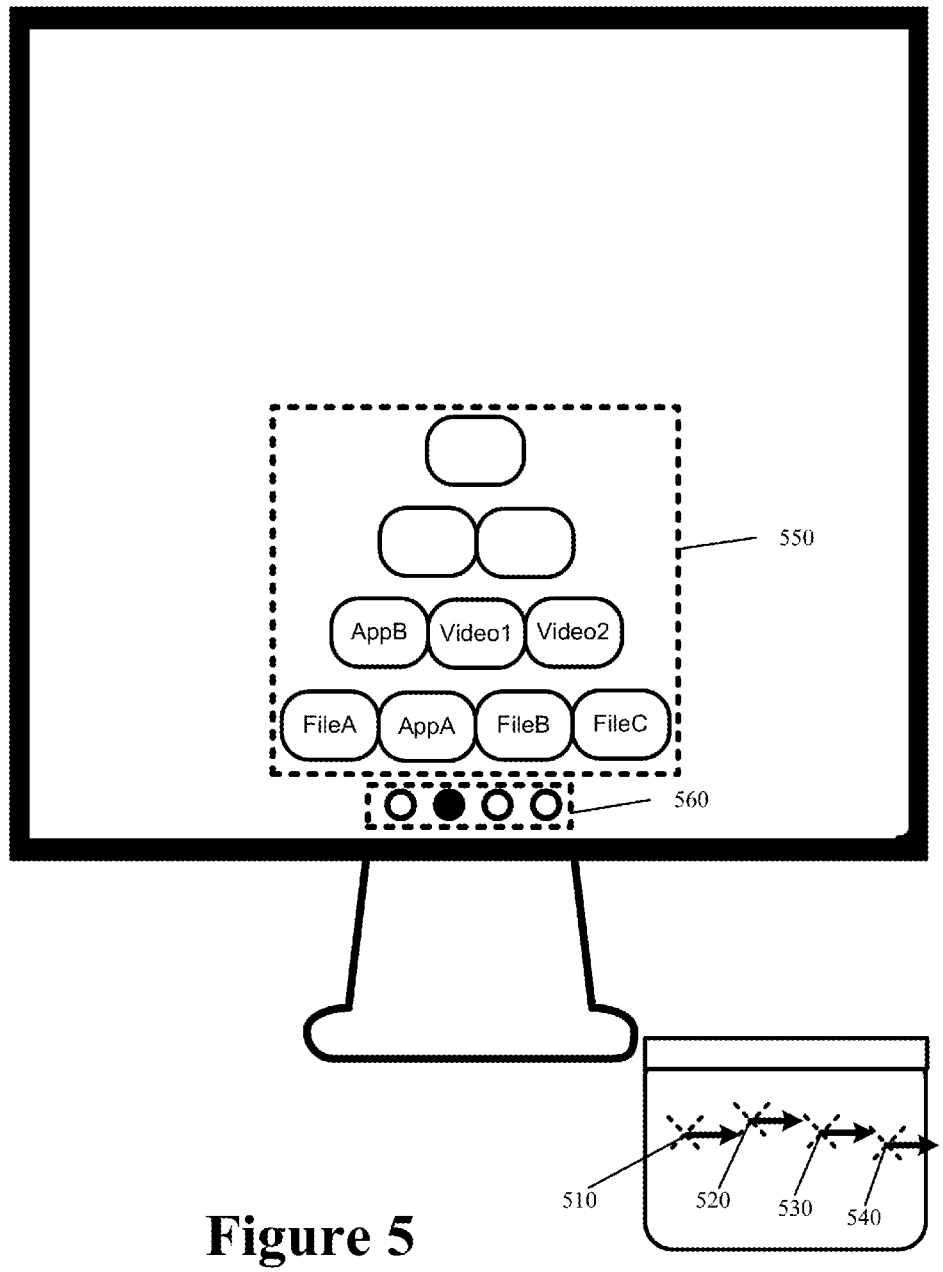
FIG. 5 illustrates changing the set of symbols that are displayed on the TEI viewer when cycling between different sub-modes of the LOCK operational mode in accordance with some embodiments.

In accordance with some embodiments, FIG. 5 illustrates changing the set of symbols that are displayed on the TEI viewer when cycling between different sub-modes of the LOCK operational mode. In this figure, the user issues a four finger flick to the right when the TEI system is already in a sub-mode of the LOCK operational mode. 510, 520, 530, and 540 illustrate performing on a trackpad a four finger flick to the right. In FIG. 5 and in the subsequent figures below, a flick of a particular finger is depicted by illustrating the initial touch with a dotted "X", the movement of the touch with a directional arrow, and the release of the touch by not displaying the "X" at the end of the directional arrow. As noted above, a flick is registered when the touch is moved beyond a distance threshold within a time threshold before the touches are released.

The rightward four finger flick causes the TEI viewer (i) to swap out a first set of symbols that identify a first set of operations of a first LOCK sub-mode and (ii) to swap in a second set of symbols that identify a second set of operations of a second LOCK sub-mode which are now accessible as a result of the four finger directional flick. Specifically, the TEI viewer changes the set of symbols that were displayed in FIG. 2 (rows 260-290 inclusively) to a different set of symbols 550. The set of symbols 550 identify a different set of operations than the symbols of FIG. 2. In some embodiments, an audible message is played to audibly notify the user as to which sub-mode is now active. For example, a first sub-mode may include symbols for launching different applications and therefore an audible message that announces "Apps" is played when that first sub-mode become active and a second sub-mode may include symbols for accessing different hyperlinks or web sites and therefore an audible message that announces "Web" is played when that second sub-mode becomes active. In some embodiments, the swapping of the sets of symbols when cycling between the different LOCK sub-modes is animated so as to provide a fluid visual connection in the changing of sub-modes.

Status indicator 560 identifies the active sub-mode of the LOCK operational mode. Each four finger flick to the right or left cycles to select a different set of symbols for a different LOCK sub-mode thereby changing the status indicator 560. In this figure, the status indicator 560 identifies four LOCK sub-modes. However, the TEI system can be customized with more or fewer LOCK sub-modes as per preferences of the user or developer.

As noted above, once the TEI viewer is displayed with a four finger tap, it remains on-screen until an operation is performed, another four finger tap is issued, or a four finger downward flick is issued to hide the TEI viewer and exit the LOCK operational mode. In some embodiments, when the TEI viewer is subsequently displayed with a four finger tap, the TEI viewer displays the sub-mode that was last active.

Muscle memory arises when a repeated set of physical actions produce the same outcome. The above described cycling through the sub-modes of the LOCK operational mode may not encourage the full utilization of muscle memory in some cases. The TEI system therefore allows users the ability to directly enter a particular sub-mode of the LOCK operational mode from the OFF state with a four finger flick in one of several directions (e.g., up, left, and right). Specifically, an upward four finger flick causes the TEI system to enter a first LOCK sub-mode that provides access to a first set of operations identified using a first set of symbols in the TEI viewer; a leftward four finger flick when the TEI system is in the OFF state causes the TEI system to enter a second LOCK sub-mode that provides access to a second set of operations identified by a second set of symbols in the TEI viewer; and a rightward four finger flick when the TEI system is in the OFF state causes the TEI system to enter a third LOCK sub-mode that provides access to a third set of operations identified using a third set of symbols in the TEI viewer. This is in contrast to the aforementioned steps of (i) performing a four finger tap to enter the last active sub-mode of the LOCK operational mode and (ii) cycling through the various LOCK sub-modes until a desired LOCK sub-mode is identified.

Some embodiments provide other methods with which to cycle between different sets of operations when the TEI viewer is displayed or when the TEI system functionality is active. In some such embodiments, an action modifier can be used to switch from a currently selected set of operations to a different set of operations. The action modifier includes issuing a tap or flick with a thumb of the hand that was used to perform the four finger tap or four finger directional flick that invokes the TEI viewer or TEI system functionality. Similarly, the action modifier may include a tap or flick of a finger of the opposite hand that was to invoke the TEI viewer or TEI system functionality. As will be explained below with reference to Section II A iii below, the TEI system recognizes the thumb or finger of the opposite hand as a different touch than the touches of the index, middle, ring, and little fingers used to invoke the TEI viewer or TEI system functionality. Based on the modifier, the TEI system changes the set of operations that are accessible by the user. In some embodiments, the action modifier also includes a key press, tilting, angling, or other movement of a device that is integrated with a gyroscope or other motion sensing capabilities.

C. Topmost Symbol Expansion

In some embodiments, each symbol displayed in the TEI viewer can identify a single operation that can be performed by flicking a corresponding touch combination in a particular direction. Each symbol can also identify multiple operations that can be performed by flicking a corresponding touch combination in different directions. For example, a symbol can display directional arrows to identify that other operations can be performed with flicks in the direction of the arrows. However, it is sometimes difficult to identify multiple operations from a single symbol as the resolution or screen space provided to the symbol is insufficient to identify the different operations. Accordingly, in some embodiments, each of the symbols displayed in the TEI viewer is a topmost symbol that can be expanded to present an underlying set of expanded symbols. Each symbol within a particular set of expanded symbols (i) identifies an operation, (ii) identifies a slide direction to select the identified operation, and (iii) identifies a flick direction to perform the identified operation.

Figure 6:
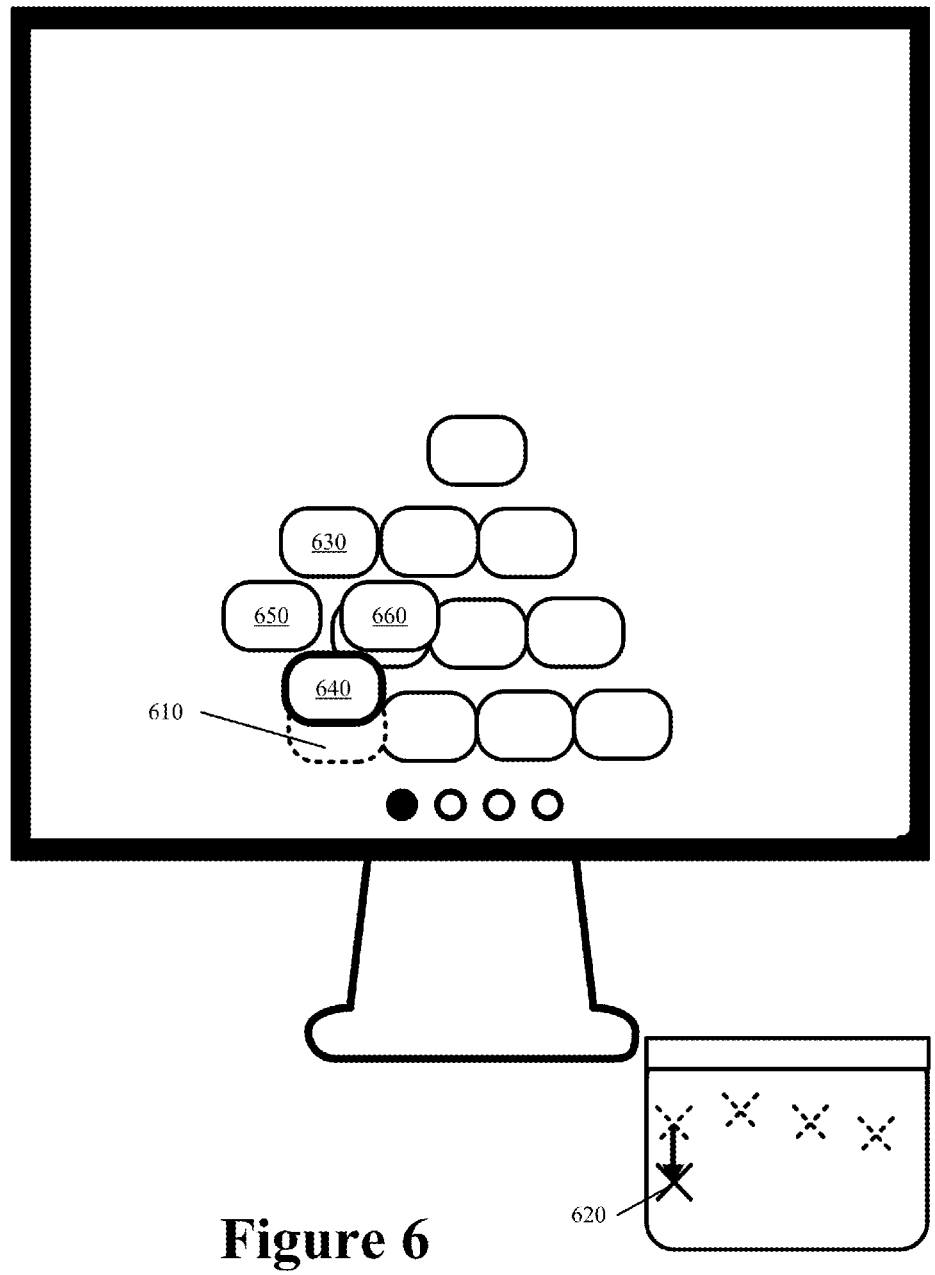
FIG. 6 illustrates expanding a topmost symbol in accordance with some embodiments.

FIG. 6 illustrates expanding a topmost symbol 610 in accordance with some embodiments. The symbol 610 is the leftmost symbol in the bottom row of the TEI viewer. A user can access the symbol 610 and the corresponding operations using the index finger 620. To expand the symbol 610, the user performs a slide of the index finger 620 beyond a particular distance threshold. As defined above, a slide involves establishing one or more touches, moving the touches beyond the particular distance threshold, and retaining the touches after the movement is complete. A slide is presented in the figures by illustrating the initial touch performed by a particular finger with a dotted "X", the movement of the touch beyond the particular distance threshold with a directional arrow, and the holding of the touch at the end of the movement with a solid "X".

As a result of the slide of the index finger 620, the topmost symbol 610 is expanded to a set of four symbols 630, 640, 650, and 660 that are displayed in a cross-shaped orientation in some embodiments. The slide of the index finger 620 occurred in the downward direction. Accordingly, the TEI viewer highlights the expanded symbol at the down position 640.

In some embodiments, the topmost symbol 610 is included in the expanded set of symbols. For example, the topmost symbol 610 is displayed at the down position (symbol 640). Therefore, the expanded symbol 640 may identify the same operation as the topmost symbol 610. When the topmost symbol 610 is displayed at the down position in the expanded set of symbols 630-660 (as 640), the operation that is identified by the topmost symbol 610 (as 640) can be performed with a downward directional flick of the touch 620. The expanded set of symbols 630-660 can be collapsed back to the topmost symbol 610 by releasing the touch 620.

The operation identified by the topmost symbol 610 and the expanded symbols 630-660 may be performed without having the TEI viewer first expand the topmost symbol 610. Specifically, to perform an operation that is identified by a symbol at a particular direction without visually expanding the corresponding topmost symbol, the user initiates the touch 620 and immediately thereafter flicks the touch 620 in the particular direction.

When a physical action consistently invokes a desired operation, the user automatically develops muscle memory over time. Once a particular four finger flick is associated with a particular set of operations of a LOCK sub-mode and a directional flick of one or more touches is associated with a specific operation of the particular set of operations in the user's muscle memory, the user can perform that specific operation without reference to the TEI viewer, without performing symbol expansion, or performing any kind of symbol or UI element spatial identification whatsoever. In this manner, the TEI system shifts the user from a selective mindset to a directive mindset. The user no longer needs to spatially identify a UI element prior to performing the associated operation. Rather, the user can directly perform an operation irrespective of where or if the operation is displayed on-screen. In this manner, the user can also operate the TEI system functionality with less refined motor skills or limited visual acuity. This is because the user does not have to touch directly over a displayed icon or symbol. Instead, the user performs location independent directional movements to invoke desired operations. For example, a user can perform the same operation by repeating the same touch action from any number of locations on the trackpad. The TEI system is therefore well suited for use by the vision impaired or in situations where one cannot be distracted by visually associating a touch to a specific UI element such as when operating an automobile. Using the TEI system, users need not identify a UI element before being able to invoke an operation that is associated with that particular UI element. Rather, distinct, unambiguous, and repeatable touch actions can be used to access desired functionality without the need for a visual reference.

Figure 7:
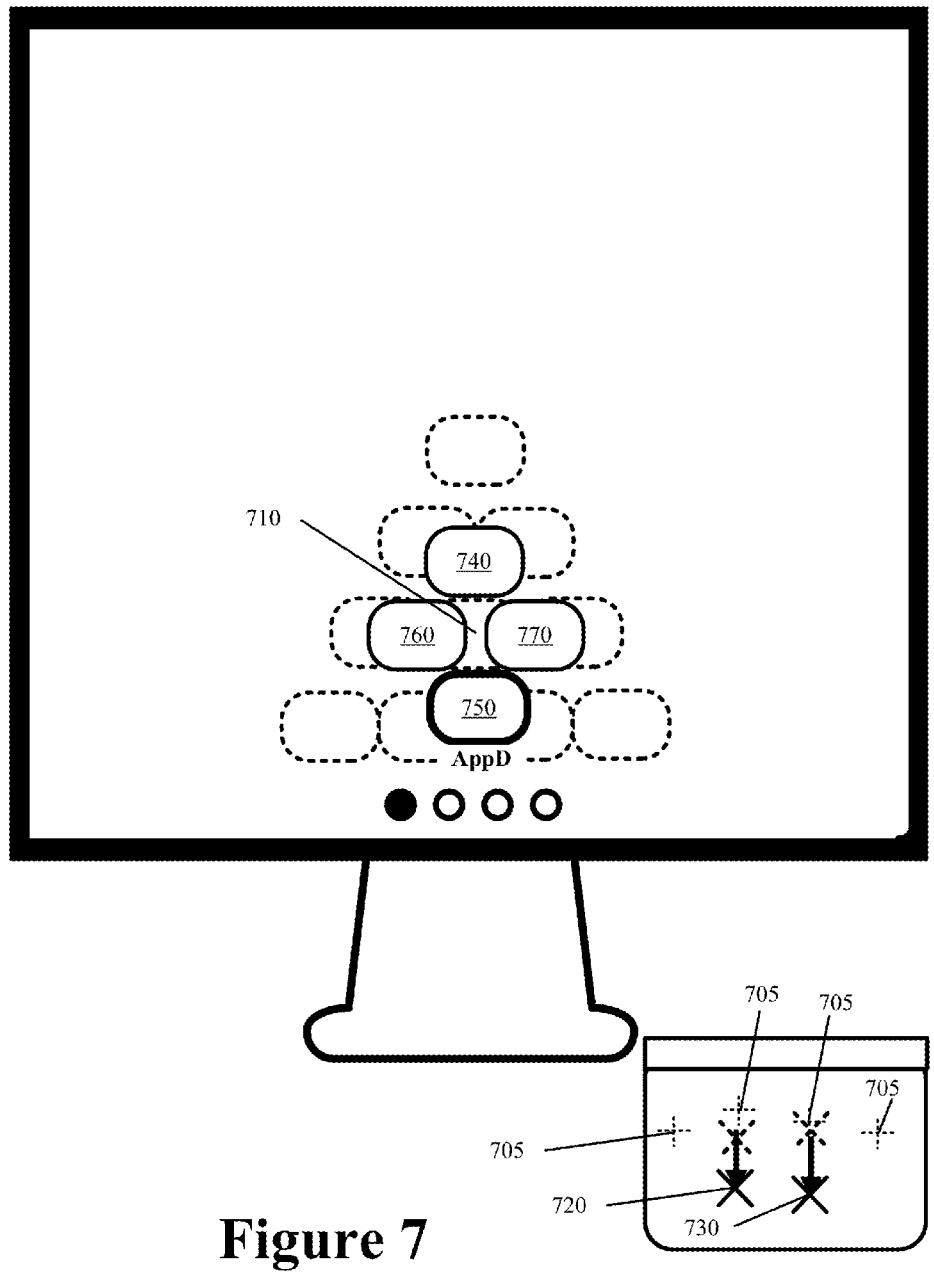
FIG. 7 illustrates expanding a symbol in the second row of the TEI viewer while other symbols are dimmed in accordance with some embodiments.

In some embodiments, when a particular topmost symbol is expanded, the other topmost symbols are dimmed or partially obscured. FIG. 7 illustrates expanding a symbol 710 in the middle position of the second row of the TEI viewer while other symbols are dimmed in accordance with some embodiments. In this figure, the user first performs a four finger tap 705 to display the TEI viewer. Next, the user slides the touch 720 of the middle finger and the touch 730 of the ring finger that are associated with the symbol 710 downward beyond a particular distance threshold. As shown, the symbol 710 is expanded to four symbols 740, 750, 760, and 770 that are displayed in the cross-shaped orientation. Symbol 750 in the down position is highlighted (shown by the bolding of the symbol) and text is displayed to identify its selection based on the downward slide of the touches 720 and 730. Additionally, the other symbols of the TEI viewer are dimmed as represented by the dotted symbols.

Figure 8:
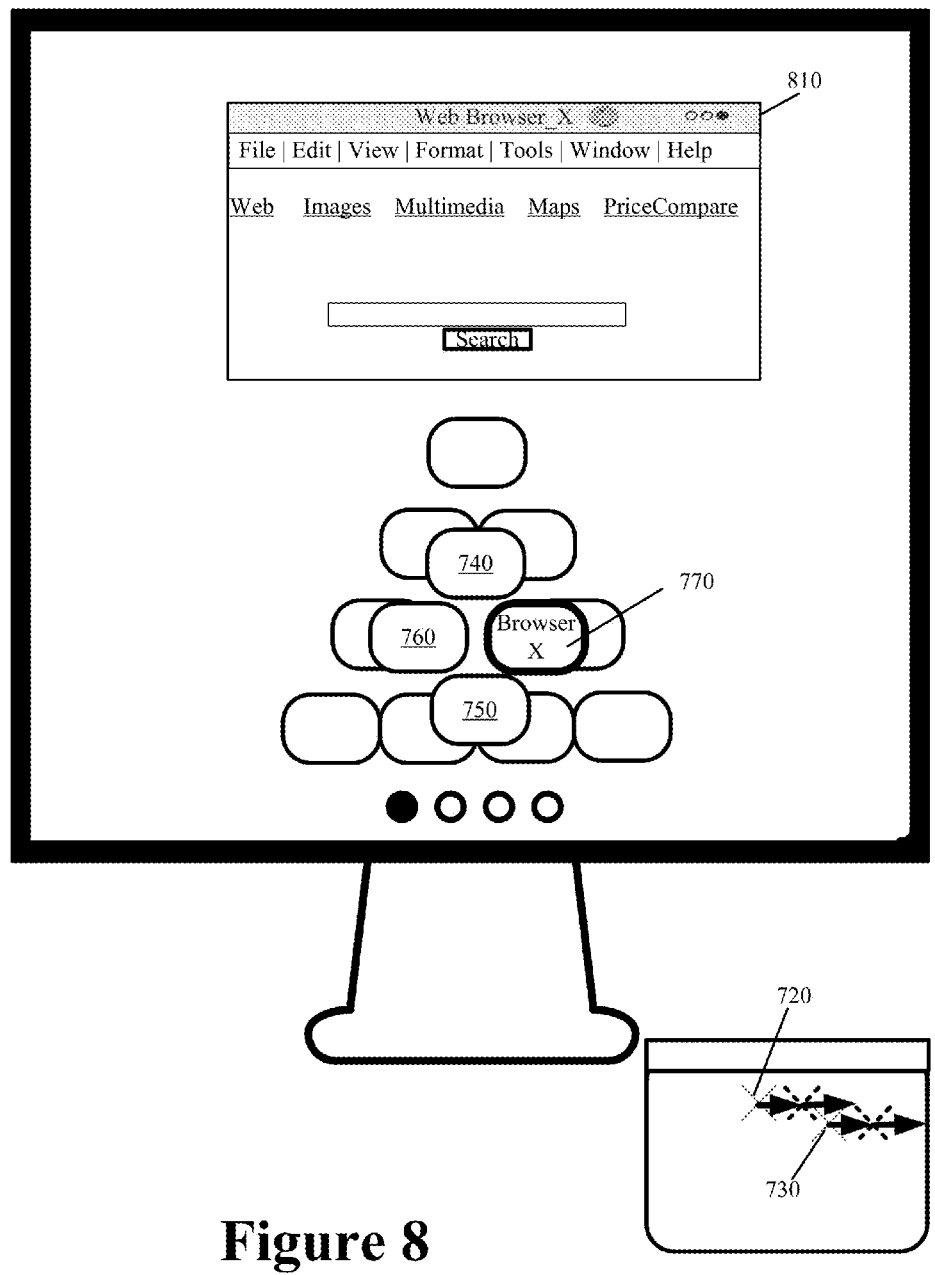
FIG. 8 illustrates performing the operation that is identified by the symbol of FIG. 7 in accordance with some embodiments.

FIG. 8 illustrates performing the operation that is identified by the symbol 770 of FIG. 7 in accordance with some embodiments. To perform the operation that is identified by the symbol 770, the user slides the touch combination that includes the touch 720 of the middle finger and the touch 730 of the ring finger rightward to highlight the symbol 770. While the symbol 770 is highlighted, the user performs a rightward flick of the touches 720 and 730 to perform the operation that is identified by the symbol 770. Alternatively, the same operation may be performed by flicking the touch combination rightward without first performing the slide to highlight the symbol 770. The symbol 770 identifies an operation for launching a web browser application. Accordingly, when the touch 720 and the touch 730 are essentially simultaneously slid to the right and then essentially simultaneously flicked to the right, or likewise when essentially simultaneously flicked to the right without first performing a slide, the TEI system launches the web browser application 810.

Figure 9:
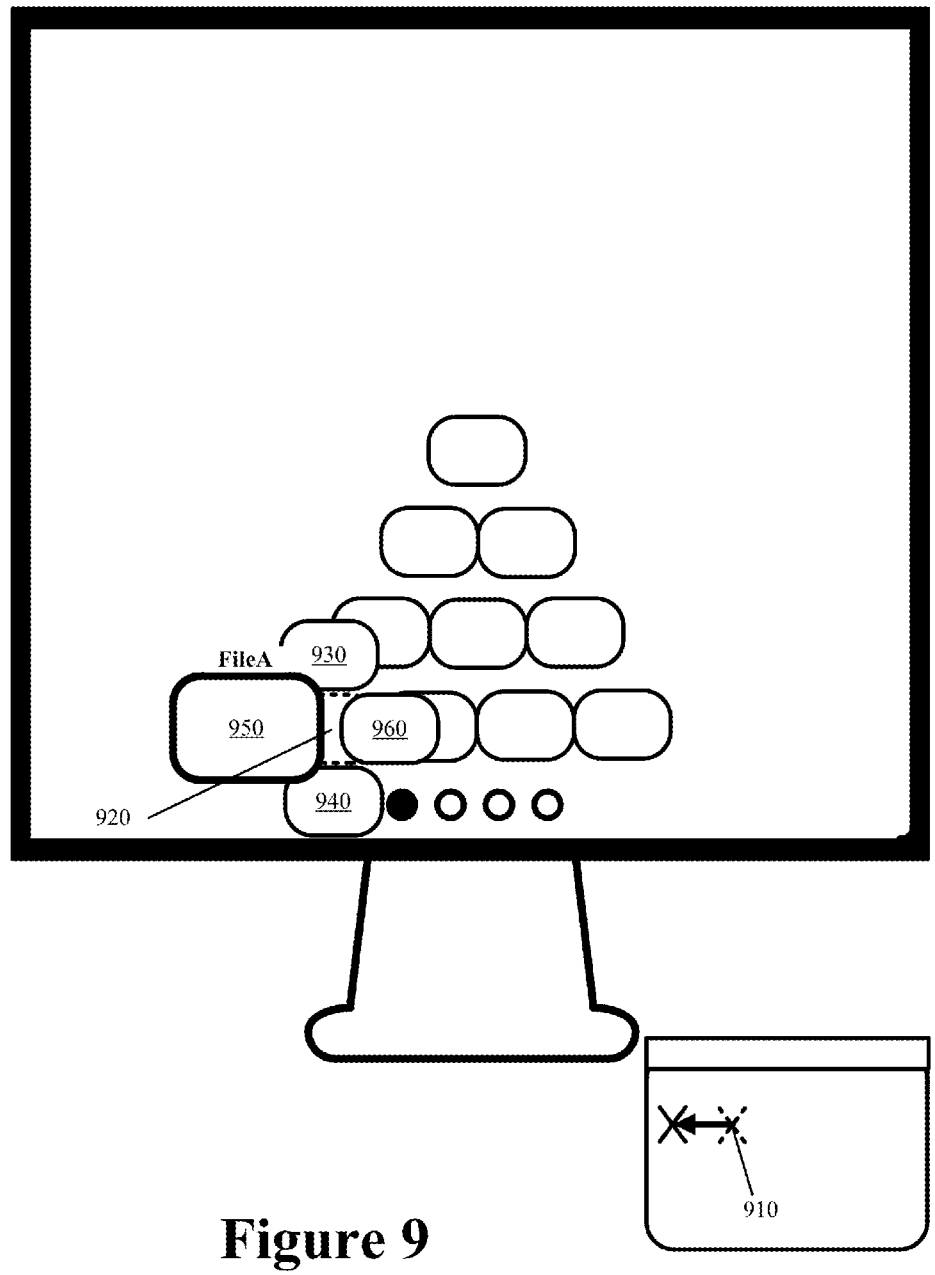
FIG. 9 illustrates a user sliding a touch of the index finger left to expand a topmost symbol into the set of symbols.
Figure 10:
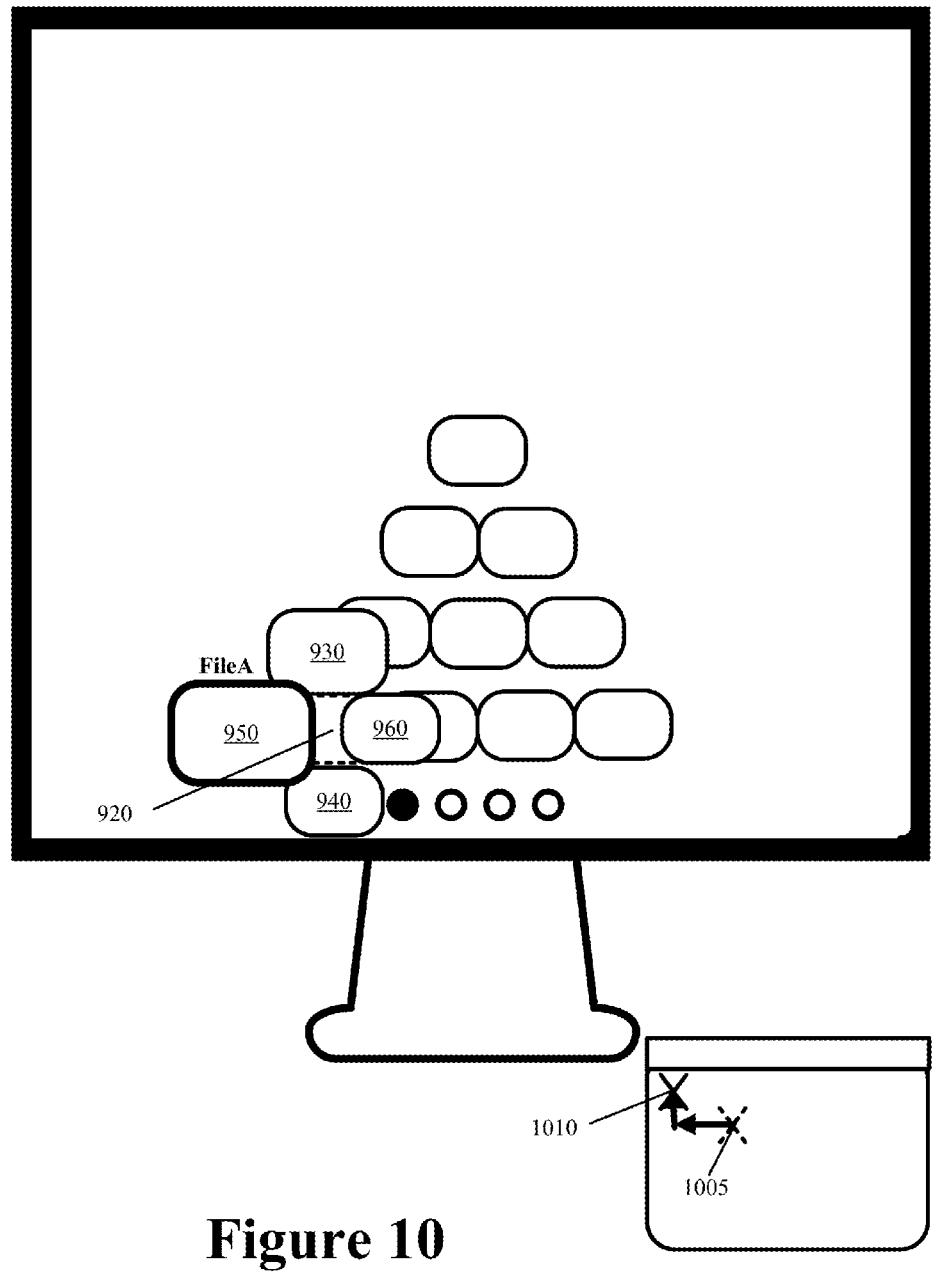
FIG. 10 illustrates the user continuing the slide from FIG. 9 upward.

In some embodiments, depending on the direction of the one or more touches that are slid, different symbols within the expanded set of symbols are enlarged and others are made smaller. This allows users to relate the motion of their touch or touches to the operation that is identified by a particular expanded symbol. FIGS. 9 and 10 illustrate a resizing of symbols of an expanded set of symbols relative to the touch combination that is slid in accordance with some embodiments. These figures assume that the TEI system is already in a particular LOCK sub-mode and that the TEI viewer therefore displays the symbols associated with the particular LOCK sub-mode.

In FIG. 9, the user slides the touch 910 of the index finger left to expand the topmost symbol 920 into the set of symbols 930, 940, 950, and 960. Because the user performed a slide in the leftward direction, the symbol 950 at the left position is enlarged relative to the other symbols 930, 940, 960 to more prominently display the symbol 950. Additionally, the symbol 950 is highlighted and optional descriptive text is presented near the symbol 950.

As the user adjusts the slide to a different position, the TEI viewer adjusts in real-time the size of the expanded set of symbols 930, 940, 950, and 960 according to the angle and distance relative to the average of the original touch contact points. As shown in FIG. 10, the user continues the slide from FIG. 9 upward to 1010. As a result, the size of the symbol 930 at the up position is enlarged and the size of the symbol 950 at the left position is reduced in proportion to the angle and distance from the original index finger touch position 1005. However, the size of symbol 950 remains larger than the symbols 940, 930, and 960 and the symbol 950 remains highlighted with the added textual identifier. When the distance slid from the home position in the up direction is greater than the distance slid from the home position in the left direction, the symbol 930 will be highlighted instead of symbol 950 and the relative sizes of the symbols will adjust accordingly.

Some embodiments provide audible descriptions or other sounds in addition to or instead of the expanding of symbols to identify which operations can be performed using directional flicks of various touch combinations. A particular audible description or sound is played when a user performs multiple oscillating movements after first sliding a touch combination in a direction that is associated with a symbol.

Figure 11:
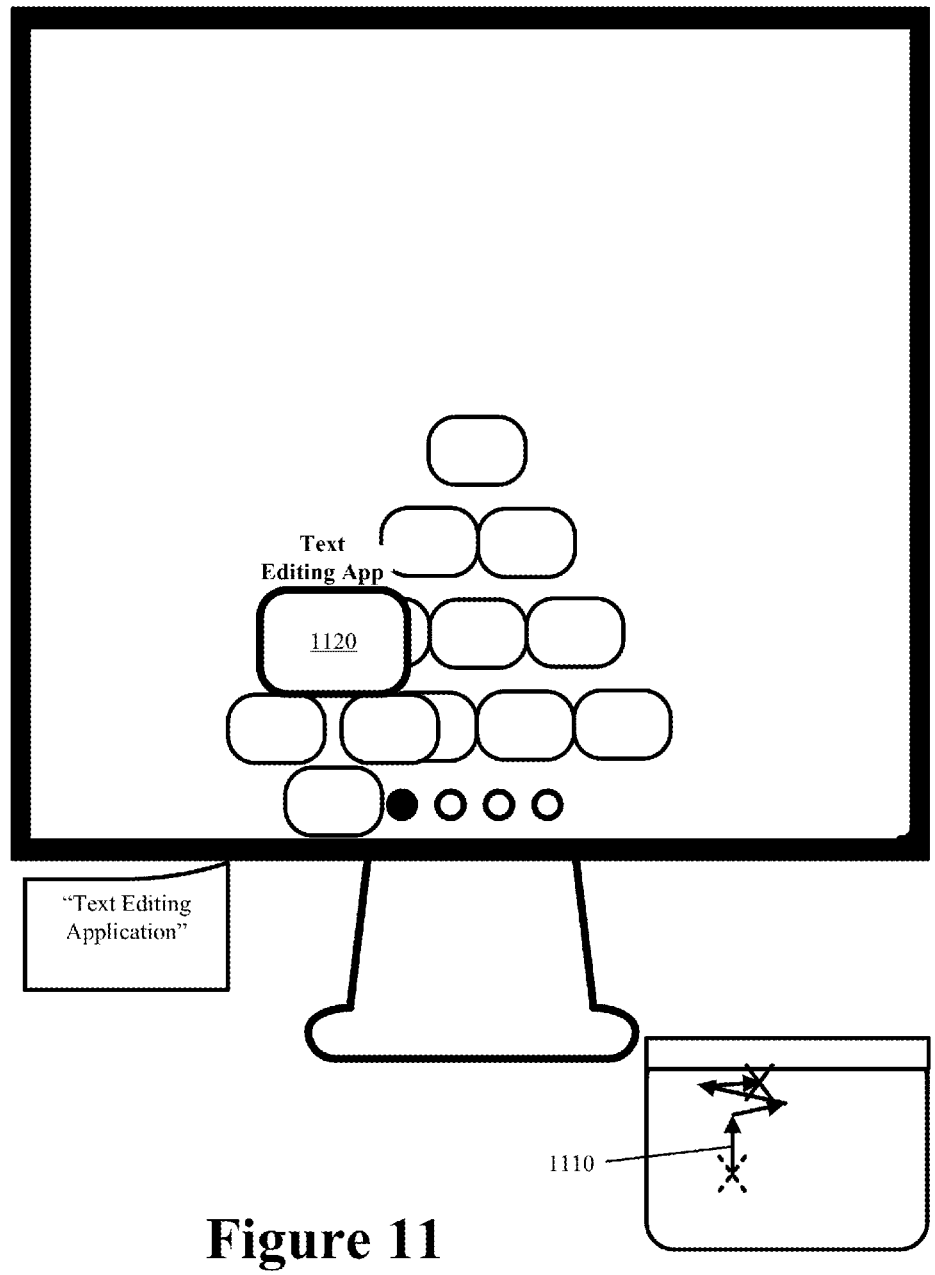
FIG. 11 illustrates a user performing an upward slide of the right hand index finger into the quadrant that is associated with a particular symbol.

To identify the symbol that is associated with a particular directional slide, the area surrounding and centered on the unexpanded topmost symbol is divided into quadrants that are rotated 45-degrees from a vertical reference. Each expanded symbol is associated with the quadrant over which it appears (with reference to ranges 3910-3940 of FIG. 39). When several oscillating movements occur within a quadrant that is associated with a particular symbol, the TEI system can identify the appropriate audible description or sound for that particular quadrant's symbol and play the audible description or sound. In some embodiments, the oscillating movements can be performed side to side and/or up and down. For example, in FIG. 11, the user performs an upward slide 1110 of the right hand index finger into the quadrant that is associated with symbol 1120. Next, the user oscillates the index finger side to side. In response, the device's speaker announces that the "Text Editing Application" can be launched with an upward flick of the current touch 1110. Section II below provides additional detail as to how the TEI system identifies the direction of a user slide or flick.

In the above embodiments, users can perform an operation with a touch combination of one or more fingers being flicked in one of four directions or being slid in one of four directions before being flicked. As one skilled in the art would understand in light of the present description, the TEI system may be modified to allow users the ability (i) to perform additional operations by flicking or sliding and flicking the touch combinations in more than four directions or (ii) to perform fewer operations by flicking or sliding and flicking the touch combinations in less than four directions. Specifically, some embodiments perform a different operation based on one of eight directional flicks or slides and flicks of a touch combination. In some such embodiments, the TEI viewer is modified to display an expanded set of eight symbols for each topmost symbol. The expanded set of symbols is presented in a square orientation and the operation that is identified by a particular symbol in the expanded set of symbols may be performed by flicking one or more touches in the direction of the particular symbol.

D. Character Insertion

Figure 12:
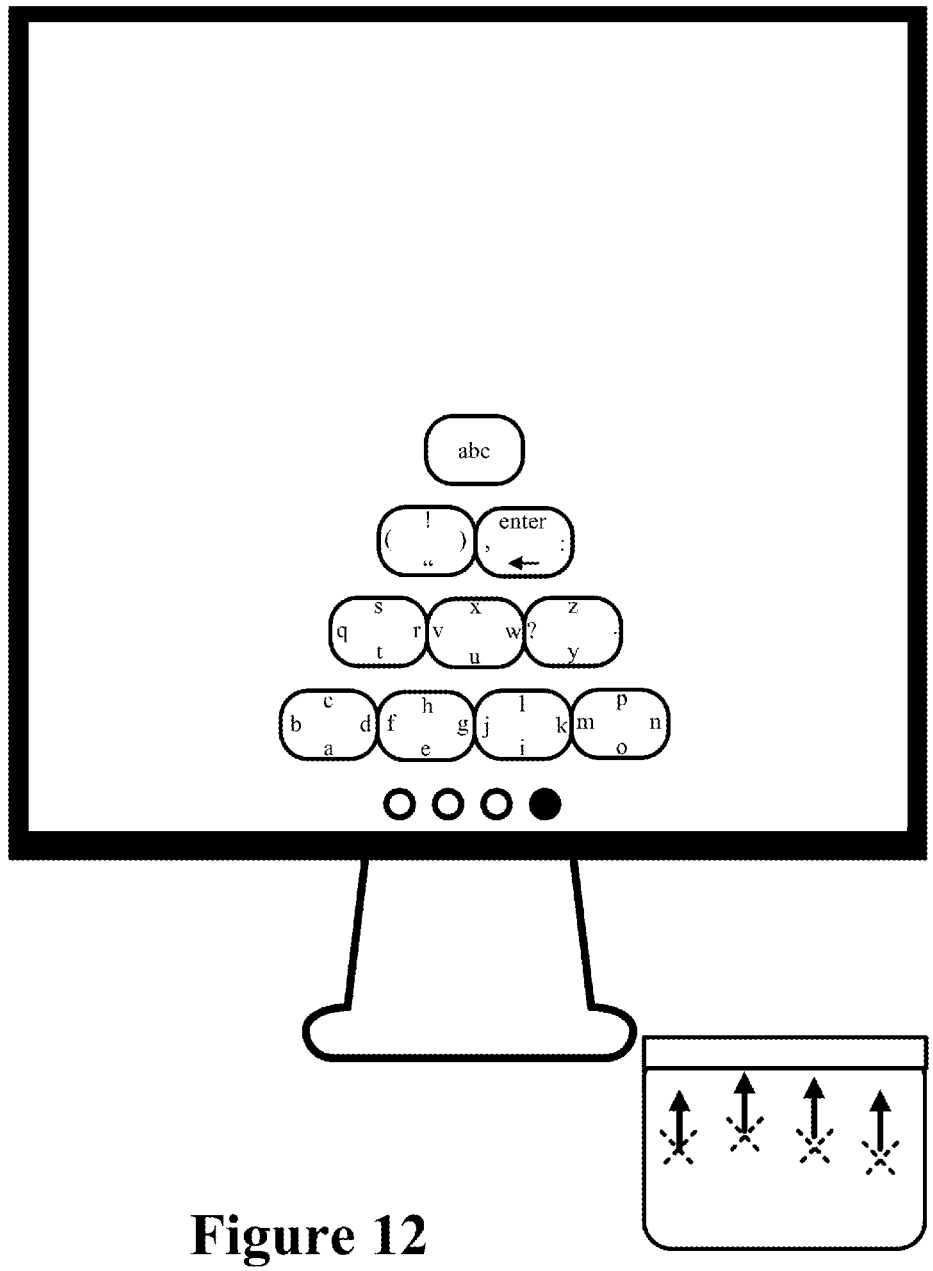
FIG. 12 illustrates a user gaining access to character insertion operations by performing a four finger upward flick.
Figure 13:
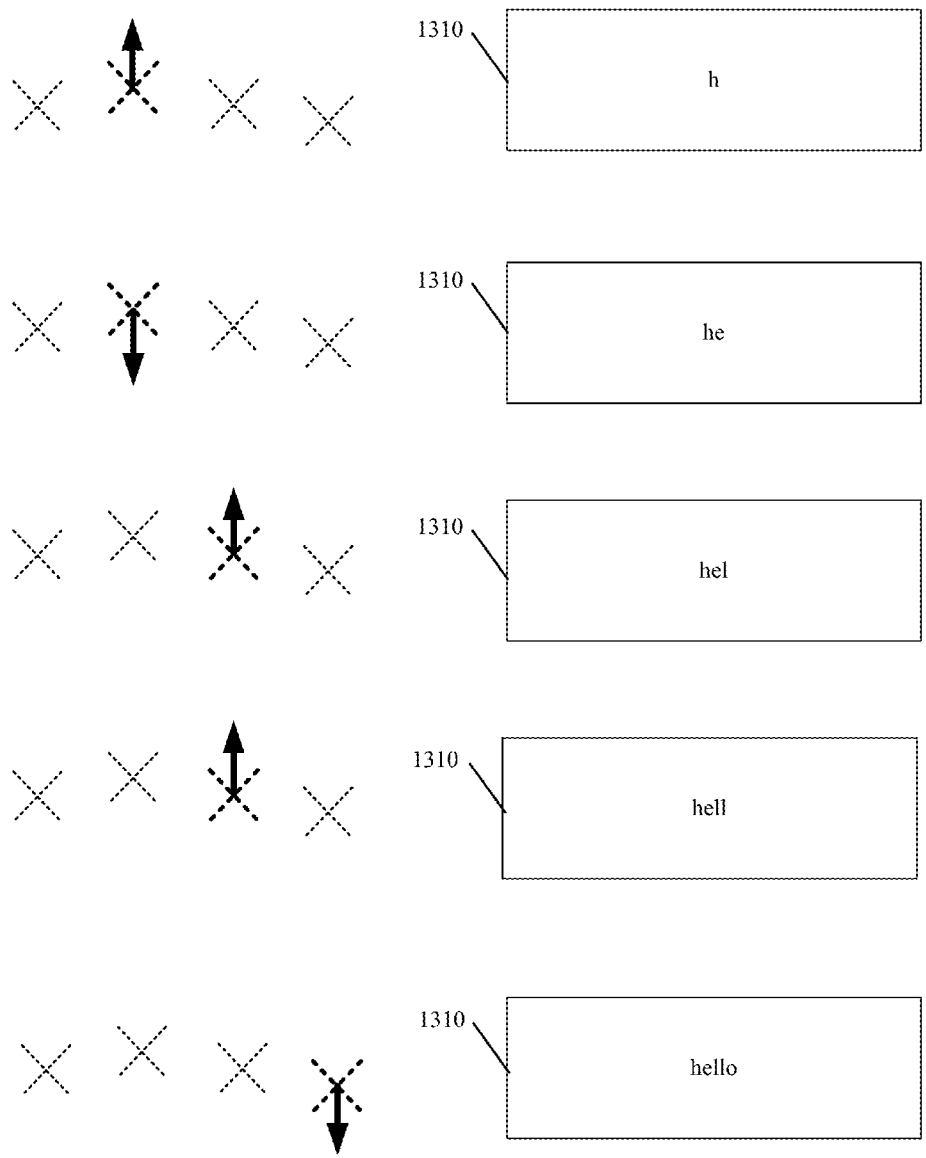
FIG. 13 illustrates a sequence of directional flicks that are used to insert the text "hello" in a text field in accordance with some embodiments.

In some embodiments, performing a four finger upward flick causes the TEI system to enter a sub-mode of the LOCK operational mode that provides access to character insertion operations. FIGS. 12 and 13 illustrate accessing and performing character insertion operations in accordance with some embodiments.

In FIG. 12, a user gains access to the character insertion operations by performing a four finger upward flick. As a result, the topmost symbols of the TEI viewer identify characters that can be inserted into a text field that has focus. Directional flicks of the index finger may be used to insert the "a", "b", "c", and "d" characters, directional flicks of the middle finger may be used to insert the "e", "f", "g", and "h" characters, directional flicks of the ring finger may be used to insert the "i", "j", "k", and "l" characters, directional flicks of the little finger may be used to insert the "m", "n", "o", and "p" characters, directional flicks of the touch of the index finger and the touch of the middle finger together may be used to insert the "q", "r", "s", and "t" characters, directional flicks of the touch of the middle finger and the touch of the ring finger together may be used to insert the "u", "v", "w", and "x" characters, and directional flicks of the touch of the ring finger and the touch of the little finger together may be used to insert the "y" and "z" characters. In order to facilitate the development of the user's muscle memory for frequently inserted characters such as vowels, and in order to provide ease of access to those frequently inserted characters, those characters are placed at the down position so that the more natural downward flicking motion of one or more fingers can be used to insert those characters.

Directional flicks of other touch combinations (including, in some embodiments, sets of non-adjacent touch combinations) may be used to insert punctuation marks (e.g., ".", ",", ";", "!", "?", etc.), text operations (e.g., "backspace", "enter", "shift", "caps lock", etc.), numbers, arrow keys, or various text symbols (e.g., "@", "#", "$", "+", "/", etc.). In some embodiments, when a user slides a touch combination towards a particular character, the particular character is enlarged or otherwise highlighted within the symbol of the TEI viewer.

As was previously described, after an operation is performed in a LOCK sub-mode, the TEI system exits from that sub-mode and returns to the OFF state. However, to allow for continuous character insertion in rapid succession (typing text), some embodiments do not exit the character insertion LOCK sub-mode after performing each character insertion operation. Instead, when the character insertion LOCK sub-mode is active, the user manually indicates when to exit from that sub-mode by performing a four finger tap or four finger downwards flick.

Through repeat use, the position of the characters, punctuation marks, text operations, numbers, arrow keys, and text symbols become ingrained in the user's muscle memory such that the user is able to quickly and accurately enter text without needing to refer to the TEI viewer display and without looking at the screen of the device when composing the text. As a result, character insertion can be performed using the TEI system without occupying limited screen space with a virtual keyboard. Additionally, the user is able to enter text without the fine motor skills that are otherwise needed to interact with a virtual keyboard. In the TEI system, each character is inserted with a fully distinct and deliberate user action that involves a specific touch combination and a flick in one of several directions. Conversely, a virtual keyboard places several characters in close proximity with one another and insertion is performed using the same non-distinct user action (i.e., a tap over the desired graphical key). Accordingly, users are much more likely to incorrectly insert characters when using the virtual keyboard than when using the TEI system text insertion functionality. For this reason, virtual keyboards usually include automatic correction functionality which itself produces other problems such as unintended corrections. By using distinct and unambiguous user actions for its text insertion, the TEI system produces accurate text and eliminates the need for automatic correction functionality and the frustration that is associated with virtual keyboards.

In some embodiments, the TEI system provides an audible announcement of which character is inserted after a flick is issued. Additionally or alternatively, audible announcements may be adapted for use with other text insertion techniques that are well known or frequently used by someone skilled in the art. For example, the TEI system provides an audible announcement of a word after the word is typed or is inserted by accepting auto complete text entry functionality.

In accordance with some embodiments, FIG. 13 illustrates a sequence of directional flicks that are used to insert the text "hello" in a text field 1310. The character layout depicted in the preferred embodiment of FIG. 12 is used to specify which characters are inserted as a result of the directional flicks shown in FIG. 13. As shown, the user performs: (1) an upward flick of the middle finger to insert the "h" character, (2) a downward flick of the middle finger to insert the "e" character, (3) two upward flicks of the ring finger to insert two "l" characters, and (4) a downward flick of the little finger touch to insert the "o" character. As one skilled in the art would understand in light of the present description, the character layout may be different in some embodiments such that the flicks performed in FIG. 13 insert different characters. In some embodiments, the flicks can be performed without displaying the TEI viewer and without looking at the screen of the device in which the text is entered when the flicks needed to insert the appropriate characters are ingrained in the user's muscle memory.

In addition to or instead of the character layout of FIG. 12, other character layouts may be used when performing text insertion while using the TEI system. Such alternative layouts may be better suited for some users or may include customized layouts that have been modified according to user preferences.

Figure 14A:
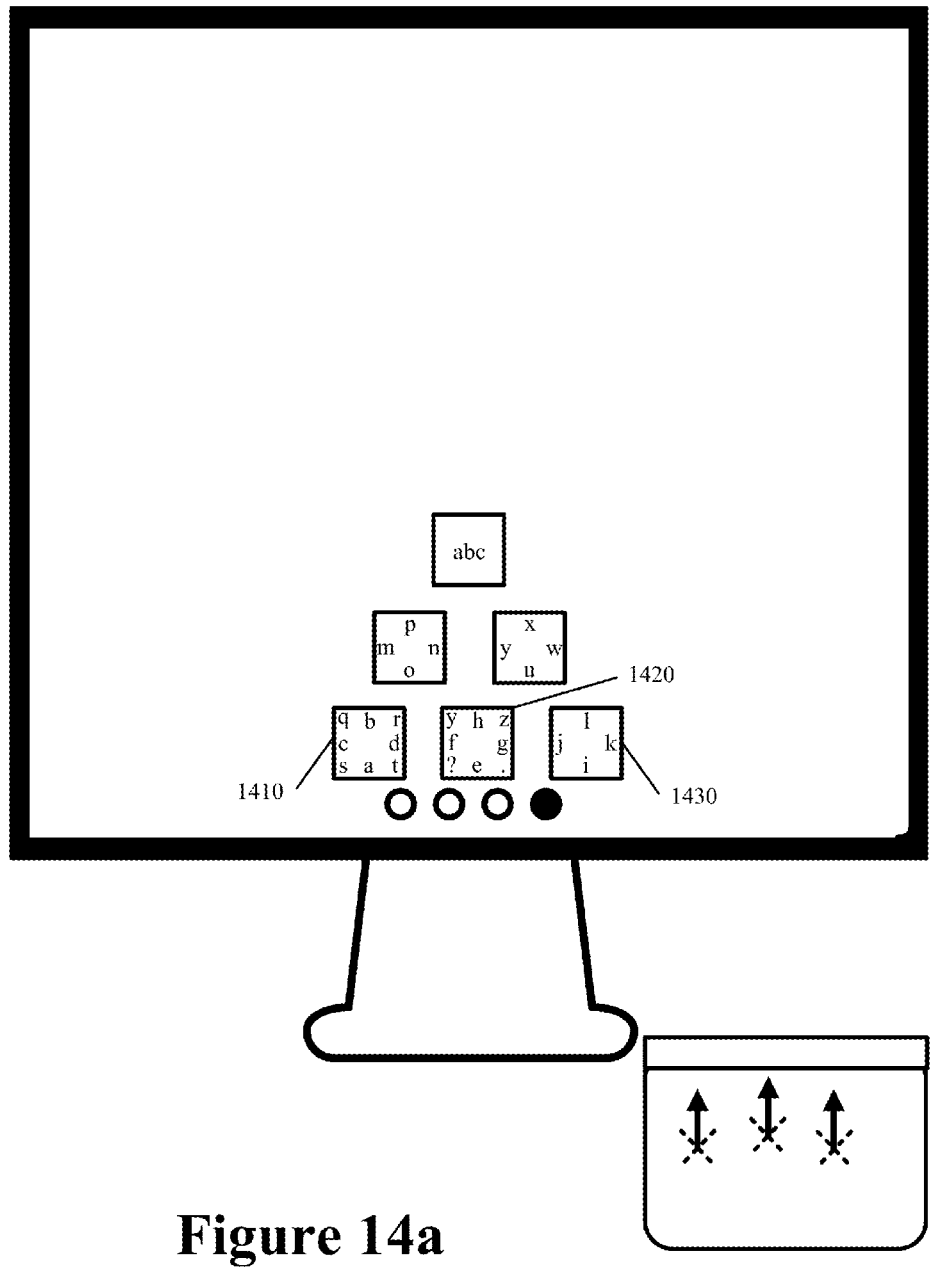
FIGS. 14a and 14b present alternative character layouts of the TEI system that can be used to perform text insertion in accordance with some embodiments.
Figure 14B:
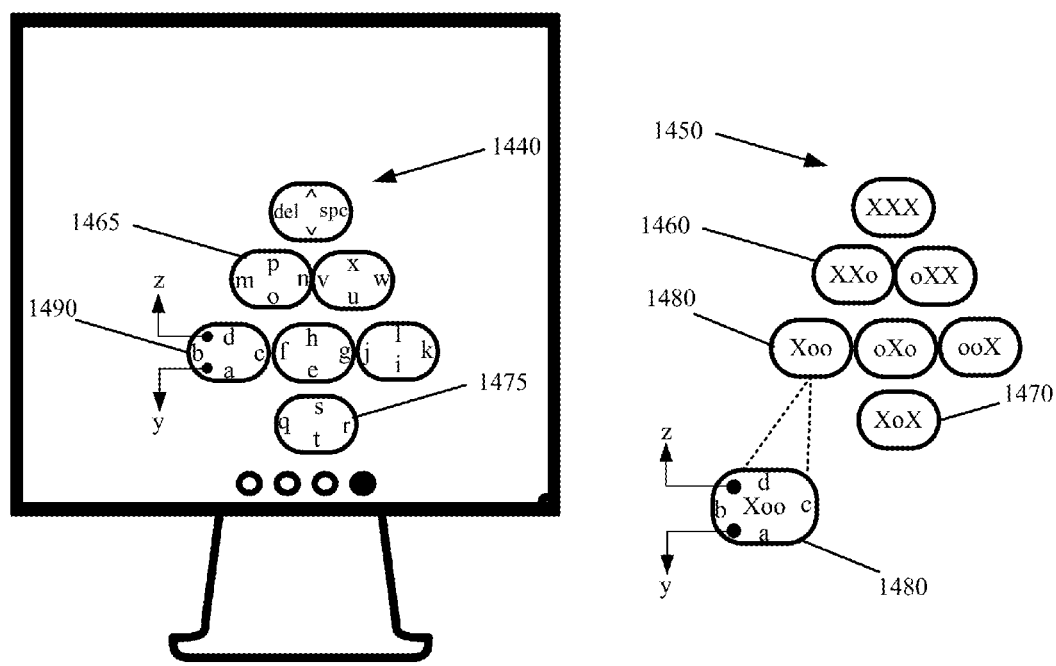

FIGS. 14*a* and 14*b* present alternative character layouts of the TEI system that can be used to perform text insertion in accordance with some embodiments. In FIG. 14*a*, the bottommost row of the TEI viewer includes three symbols 1410, 1420, and 1430 as opposed to the four symbols in the bottommost row of the TEI viewer of FIG. 12. With the character layout of FIG. 14*a*, users can insert characters using the index, middle, or ring fingers individually or in combination. Such a character layout may be preferred by some users that do not have sufficient dexterity in the little finger, or where the size of the device does not allow for 4 fingers. Another difference in the character layout of FIG. 14*a* is that symbols 1410, 1420, and 1430 each identify up to eight characters for insertion instead of four. Each of the eight characters displayed in a particular symbol may be inserted by performing a flick in the direction of the character as it appears in that particular symbol. For example, the "a" character can be inserted with a downwards flick of the index finger, the "s" character can be inserted with a diagonal flick of the index finger downwards and to the left, and the "r" character can be inserted with a diagonal flick of the index finger upwards and to the right. In such a configuration, the same finger can be used to perform eight different operations (e.g., inserting eight different characters into a text field). Other character layout permutations can similarly be adapted for use with the TEI system such that individual touches and touch combinations can be used to insert text differently.

FIG. 14b illustrates an alternative character layout 1440 in which users can insert characters using the index, middle, or ring fingers individually or in combination, like FIG. 14a, however each touch or touch combination is used to insert one of four characters. The set of symbols 1450 (that are adjacent to the set of symbols of the character layout 1440) illustrate the touch or touch combinations that are used to insert the characters from the character layout 1440. Specifically, the touches that may be used to insert the characters that are associated with each symbol of the layout 1440 are denoted with three values with the leftmost value representing whether a touch of the index finger is needed, with the middle value representing whether a touch of the middle finger is needed, with the rightmost value representing whether a touch of the ring finger is needed, the value "X" representing that a touch of the corresponding finger is needed, and the value "o" representing that a touch of the corresponding finger is not needed. For example, with reference to the symbol 1460, "XXo" indicates that the characters that are associated with the corresponding symbol 1465 in layout 1440 may be inserted using a touch combination that involves the index finger and middle finger used together. More specifically, an essentially simultaneous upward flick of the index finger and middle finger touch combination inserts the "p" character and an essentially simultaneous rightward flick of the index finger and middle finger touch combination inserts the "n" character. Similarly, with reference to the symbol 1470, "XoX" indicates that the characters that are associated with the corresponding symbol 1475 in layout 1440 may be inserted using a touch combination that involves the index finger and the ring finger. A special usage case is provided to allow for insertion of the "z" and "y" characters associated with the symbol 1490 in the character layout 1440. As shown by the corresponding usage symbol 1480, the touch of the index finger ("Xoo") is used to insert the "a", "b", "c", "d", "y", and "z" characters. To insert the "a", "b", "c", and "d" characters, a user performs directional flicks of the index finger in one of four directions (e.g., up, down, left, or right) in conformance with the usage that is described above. However, to insert the "y" and "z" characters of the symbol 1490, the user performs different combinational flicks of the index finger. To insert the "y" character, a user first slides the touch of the index finger to the left and then flicks the touch down. To insert the "z" character, a user first slides the touch of the index finger to the left and then flicks the touch up.

E. Ambidextrous Operation

In some embodiments, the position of the symbols and the means to perform an operation is adjusted depending on whether the user uses the fingers of the left hand or the fingers of the right hand. Specifically, the TEI viewer provides a mirror image of the symbols so that the same symbols can be accessed with the same touch combinations irrespective of whether the right hand is used or the left hand is used. Consequently, the same output action may be invoked or the same character may be inserted with a flick of the same touch combination irrespective of which hand is used. The description for how the TEI system determines which hand is used is provided in Section II A below.

Figure 15A:
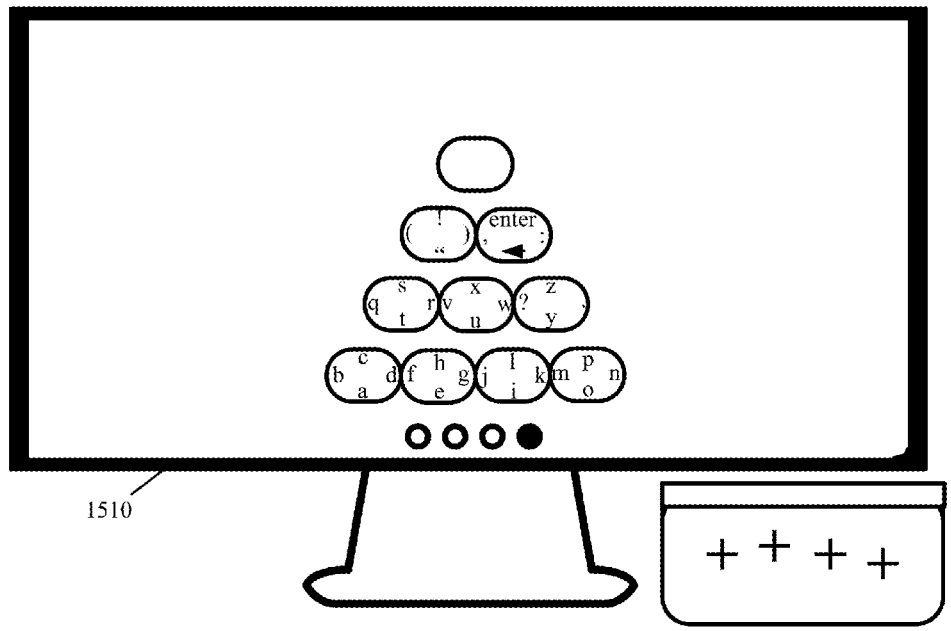
FIG. 15a illustrates (i) the TEI viewer display when a LOCK sub-mode is accessed using a four finger tap of the right hand and (ii) the TEI viewer display when the same LOCK sub-mode is accessed using a four finger tap of the left hand.
Figure 15A:
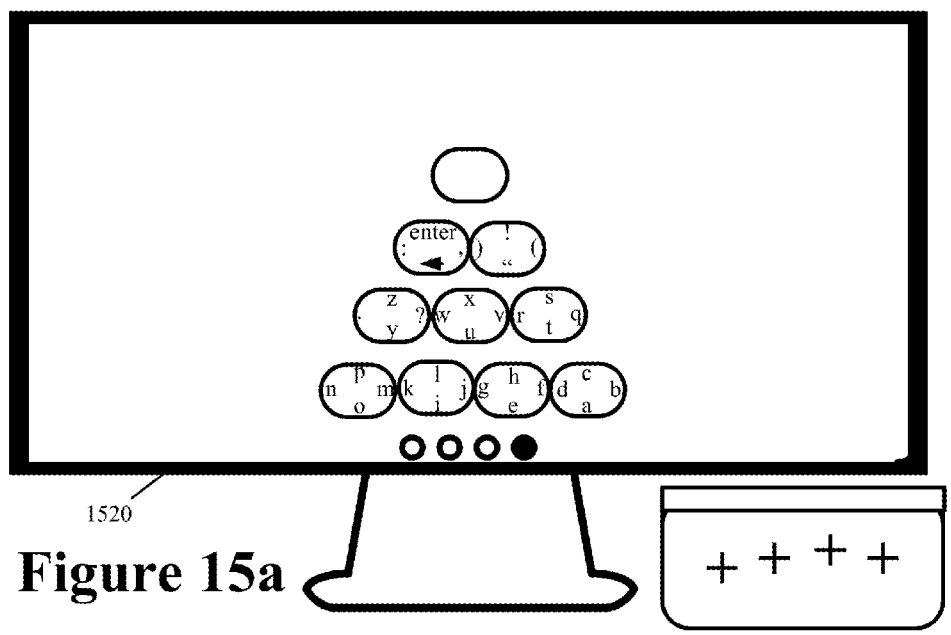

FIG. 15a illustrates (i) the TEI viewer display 1510 when a LOCK sub-mode is accessed using a four finger tap of the right hand and (ii) the TEI viewer display 1520 when the same LOCK sub-mode is accessed using a four finger tap of the left hand. As shown, flicking the index finger of either hand outward (to the left for right-handed operation and to the right for left-handed operation) may be used to insert the "b" character into a text field according to either the TEI viewer display 1510 or 1520. In this manner, the user's muscle memory develops irrespective of which hand is being used to access the TEI system functionality.

F. Password Entry

In some embodiments, the ABC sub-mode of the LOCK operational mode of the TEI system is utilized to enter passwords into secure text fields. Rather than utilizing the on-screen keyboard of existing art to enter passwords, the TEI system allows the user to enter passwords more discretely, so that onlookers or video surveillance may not be used to discover passwords. After repeated password entries, muscle memory is automatically acquired, and the TEI viewer is no longer required. Coupled with the fact that TEI password entry can be entered anywhere on the touch surface, password verification can then be accomplished with little or no visual contact with the device. Furthermore, TEI password entry is accomplished with one hand, which is important in mobile situations where one hand is holding the device.

In some embodiments, when the OS, an application, or process requires password verification, the user may invoke the TEI viewer and enter the ABC mode in the normal manner described above. The user may then enter upper and lower-case characters, numbers, and symbols in a manner similar to normal ABC mode text entry. As characters are entered into the secure text field, the last character of the input is displayed, and previous characters are depicted as dots, or in some embodiments, all characters are depicted as dots.

In some embodiments of the TEI system, rather than entering a text-based password, a custom user-defined gesture can be used instead. The custom user-defined gesture may itself be the password that enables access to desired functionality. Alternatively, the custom user-defined gesture may be used as a shortcut to enter text based passwords. For example, when a user successfully performs the custom user-defined gesture, the TEI system automatically enters a text based password in a password entry box that has operational focus.

The authentication gestures provided by the TEI system include any number of combinational touches, taps, holds, directional slides, and directional flicks, performed in a sequential manner with interrelationships in time and within a particular overall time duration. Such gestures may be entered beginning at any location on the touch device, and at any angle (refer to the omni-touch mode described below).

These authentication gestures provide greater customization options, and thereby greater security than other gesture based authentication systems of the prior art. For example, some prior art authentication gestures present a set of points. To successful perform an authentication gesture, the user connects the points according to a predefined pattern that was previously defined by the user. Such an authentication gesture is limited in the number of possibilities based on the presented set of points and the connections between them. The authentication gestures of the TEI system however provide greater combinational possibilities as a result of incorporating touches, taps, holds, directional slides, and directional flicks in the definition of the authentication gesture.

Figure 15B:
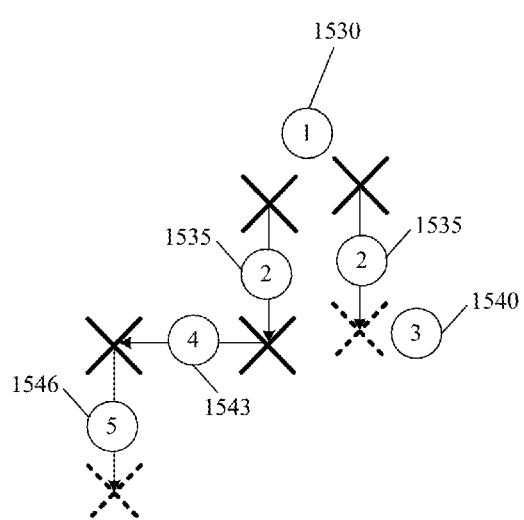
FIG. 15b presents providing a definition for an authentication gesture in accordance with some embodiments.

FIG. 15b presents providing a definition for an authentication gesture in accordance with some embodiments. Authentication gesture definition may be performed whenever a password or authentication is needed. For example, the authentication gesture definition may be performed to specify a gesture that can be used to unlock a smartphone or tablet device.

As shown, the user first performs a two finger touch at 1530. The user slides both touches downwards at 1535. The user releases the rightmost touch at 1540 before performing a leftward slide of the remaining touch at 1543. At 1546, the user performs a downward flick of the remaining touch to then complete the definition of the authentication gesture. The authentication gesture is then stored by the TEI system. The TEI system uses the stored authentication gesture to compare against a user provided gesture whenever a password or authentication is needed. The TEI system can also store different authentication gestures for different applications, sites, functions, etc.

In some embodiments, a graphical icon-based vocabulary for each such component of an authentication gesture is depicted on-screen either in an animation or in figures which resemble the definition depicted in FIG. 15b for example. Such animations and figures are automatically generated from the custom user gesture, so as to aid the user in visualizing and verifying a newly created authentication gesture when in the authentication gesture learning mode. In this mode, the user may experiment until they create a gesture that feels comfortable to them. In some embodiments, sound is interactively generated as the user performs gestural input sequences. For example, each finger generates different types of sounds, and as gestures are performed the sound changes (e.g., a slide up raises the pitch, a slide down lowers the pitch, a slide left changes a filter parameter, etc.).

After the user accepts their newly entered authentication gesture, the user must accurately reenter the authentication gesture to confirm the gesture. Some embodiments employ a multi-step authentication gesture confirmation process wherein the user must accurately confirm the previously entered authentication gesture a number of times to fully validate a new authentication gesture. Depending on device usage, such confirmation requests are instantiated by the TEI system at increasing time intervals (e.g., 1 minute, 5 minutes, 20 minutes, 1 hour, etc.), in order to refresh the memory of the user and acclimate the user to the motions of the new authentication gesture so that muscle memory is acquired. Such confirmation requests vary in frequency and number based on the accuracy and speed of confirmation attempt entries. If the user has trouble remembering the new authentication gesture, hints are displayed in the animation or figure formats described above. In some embodiments, such authentication gesture confirmation requests may be delayed by the user until a more convenient time. Previous authentication gestures are not erased from TEI system memory until a number of accurate and non-hesitant authentication gesture confirmations are successfully performed.

With repeated use, the user will naturally require less and less time to enter their authentication gesture. In some embodiments, such entry timing cues are monitored so that slower than normal authentication gestures may be rejected. The same monitoring applies to touch movement deflection, so that otherwise conforming gestures may be rejected if touch deflections measured at each stage of gesture input deviate substantially from recent use patterns. In some embodiments, other characteristics such as handedness, hand size, finger size, shape, placement, pressure, and other metrics are utilized to further verify the authenticity of the person entering the authentication gesture.

The authentication gesture capabilities of the TEI system provide an extremely fast and secure way to validate user legitimacy. Authentication gestures are immune from key logger malware, and can be made even more secure by requiring more steps or complexity in the custom gesture, or employing custom gestures that require dexterity or practice to successfully enter within a certain timeframe.

G. HOLD Operational Mode

In some embodiments, users can perform various operations and/or display the TEI viewer without first performing the four finger tap or a four finger directional flick. In some such embodiments, the user performs a touch and hold of one or more fingers to cause the TEI system to enter the NEW state from the OFF state. In the NEW state, the TEI system determines the number of fingers and which fingers are used to perform the touch and hold. From this determination, the TEI system identifies which sub-mode of the HOLD operational mode to enter. Specifically, the TEI system enters different HOLD sub-modes based on which combination of one or more fingers are held (e.g., index, middle, ring, or little) for at least a time threshold without at least one touch moving beyond a distance threshold. For example, holding just the index finger for the time threshold without movement beyond a distance threshold enables access to a first set of operations of a first HOLD sub-mode and holding the index finger in conjunction with the middle finger for the time threshold without movement beyond the distance threshold enables access to a different second set of operations of a second HOLD sub-mode. In some embodiments, the time threshold is 10 milliseconds. In some embodiments, the distance threshold allows a touch to register as a hold even though the touch slightly deviates from its initial touch position by some acceptable amount during the time threshold.

The TEI system provides other methods with which to access different sub-modes of the HOLD operational mode. In some embodiments, the TEI system enters a particular HOLD sub-mode when a user (i) performs a four finger touch and (ii) then releases some but not all of the touches. In some embodiments, the TEI system changes between different HOLD sub-modes when the user changes the touch combination that is held by adding or removing one or more touches to the right or left of the initial hold touch combination. The TEI system remains in a particular HOLD sub-mode until all touches are released, in which case the TEI system reverts to the OFF state. In some cases the issuance of a tap, hold, slide or flick in a particular HOLD sub-mode executes an output action and then reverts to the OFF state. In some HOLD sub-modes and within some initial time windows, the sub-mode changes when the touch combination being held changes (e.g., one or more touches are added or removed), or when some or all touches are moved. Additionally, there are cases where the HOLD sub-mode is cancelled and the TEI system reverts to the OFF state. Such cases would include when a new touch is added which exceeds the expected maximum number of touches, and when a new touch is added which falls outside of the expected hand/finger geometric range.

The TEI system includes logic for determining which one or more fingers of which hand are used to perform each touch. The logic performs a touch assignment whereby each detected touch is assigned to control operations of a particular finger (e.g., index, middle, ring, or little). In some embodiments, the touch assignment is performed relative to home positions that are established from a previously issued four finger touch. Establishing home positions for each finger of a four finger touch is described with reference to Section II A ii below. Touch assignment is described with reference to Section II A iii below.

FIGS. 16-19 describe various HOLD sub-modes that are accessed by a user performing a four finger touch and then releasing one or more of the touches while retaining one or more other touches. However, any of the above described methods can be used to access the HOLD sub-modes of FIGS. 16-19.

Figure 16:
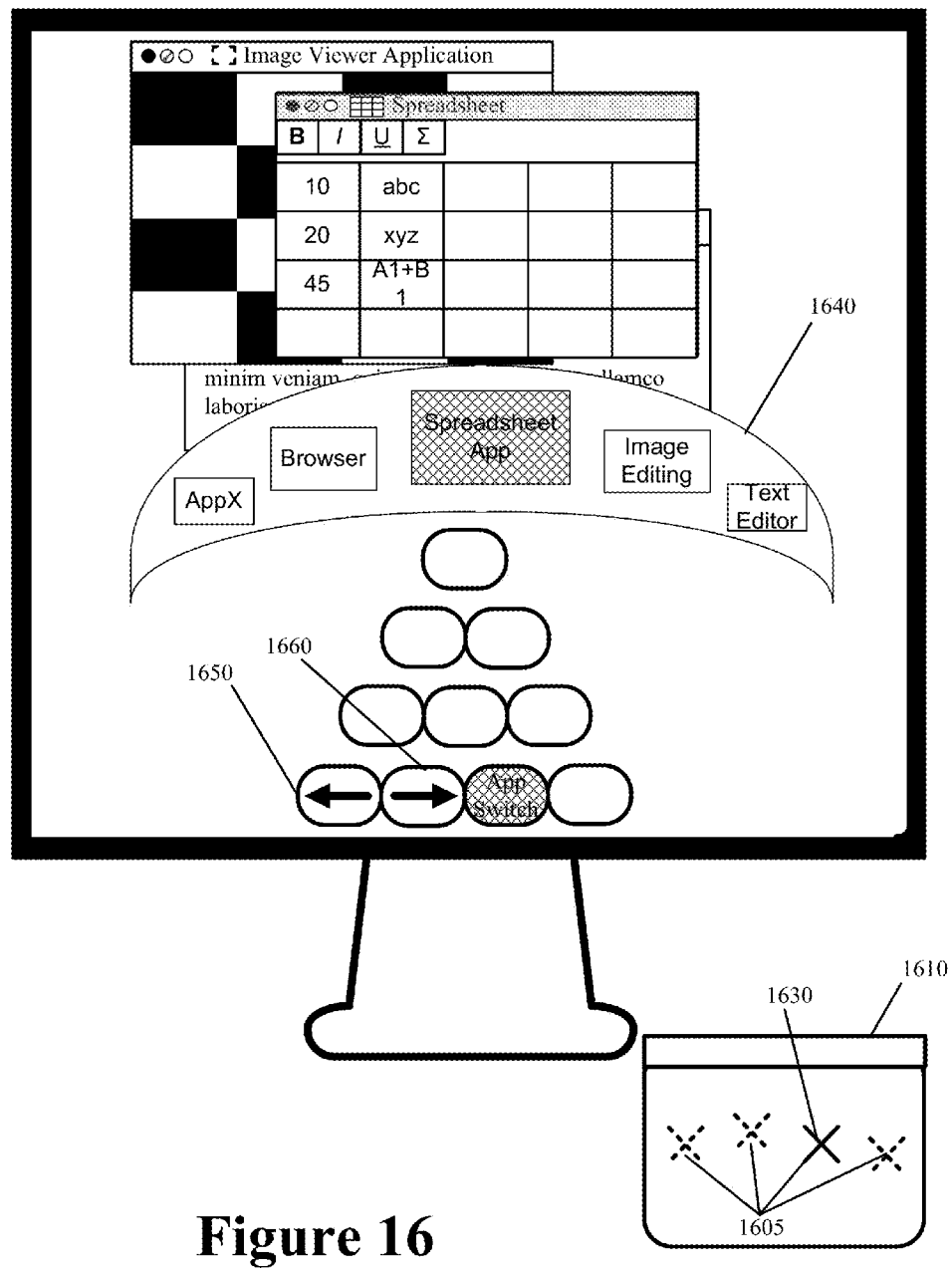
FIG. 16 illustrates a particular HOLD sub-mode from which a user can perform an operation by continuing to hold a touch of one finger while performing taps with another finger in accordance with some embodiments.

FIG. 16 illustrates a particular HOLD sub-mode from which a user can perform an operation by continuing to hold a touch of one finger while performing taps with another finger in accordance with some embodiments. To cause the TEI system to enter the particular HOLD sub-mode of FIG. 16, the user performs a four finger touch 1605 on the trackpad 1610 prior to releasing the touches of the index, middle, and little fingers while retaining the touch of the ring finger 1630 beyond a time threshold and without movement beyond a distance threshold. The hold of the ring finger 1630 is represented by the solid "X" while the dotted "X" indications represent touches that were removed.

In this figure, the HOLD sub-mode that is associated with holding down the ring finger invokes application switching functionality 1640 in some embodiments. Utilizing the application switcher 1640, the user can switch between open or active applications by tapping with either the index finger or the middle finger. Specifically, tapping the index finger invokes the output action that is identified by symbol 1650 in the TEI viewer. Tapping the index finger causes the application switcher 1640 to cycle and select an application to become frontmost that is displayed to the left of the current frontmost application. Tapping the middle finger invokes the output action that is identified by symbol 1660 in the TEI viewer. Tapping the middle finger causes the application switcher 1640 to select the application to become frontmost that is displayed to the right of the current frontmost application.

Figure 17:
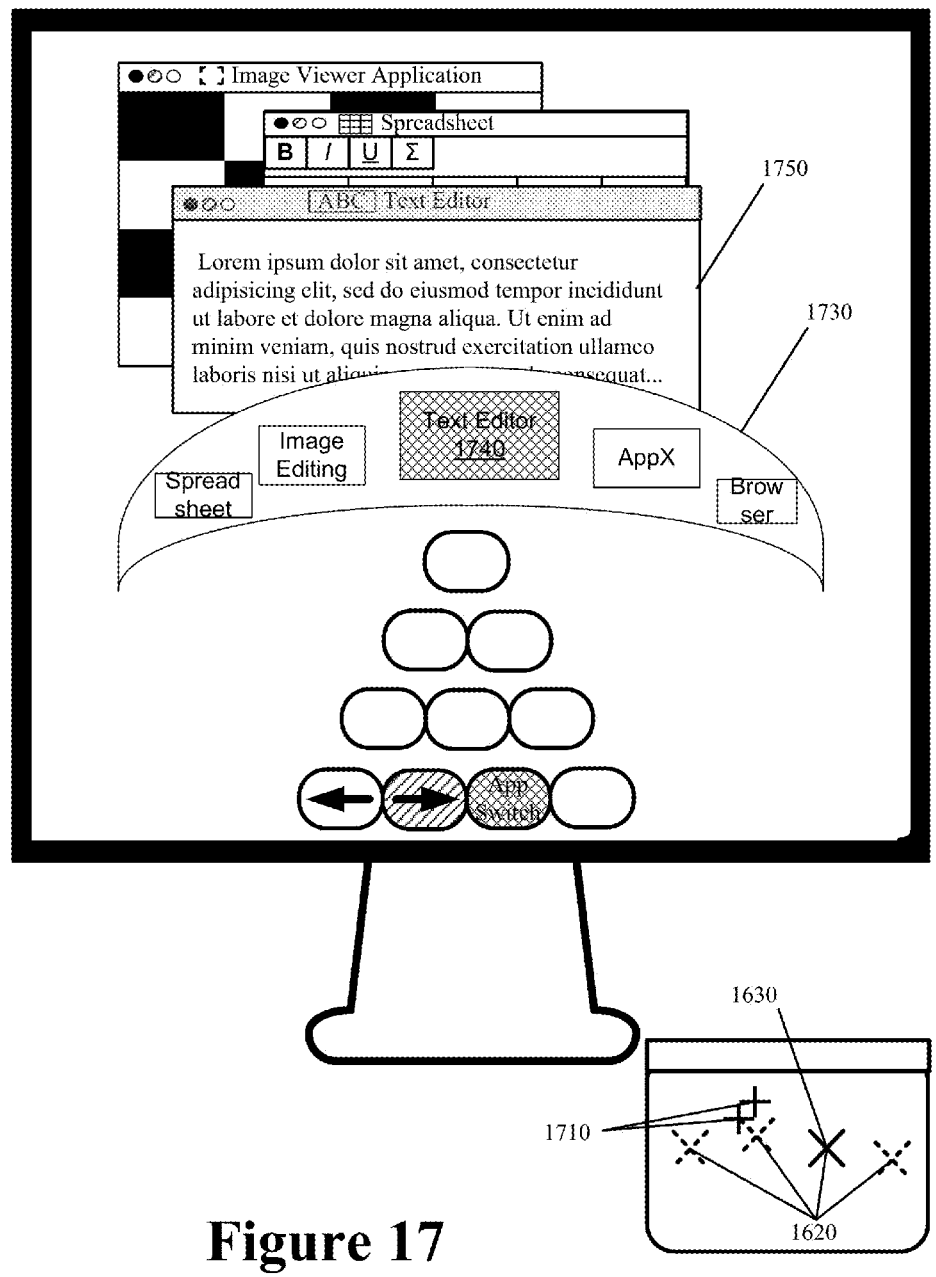
FIG. 17 illustrates a user continuing to hold down a ring finger touch while performing two taps of the middle finger within an acceptable proximity to the middle finger's current home position.

For example in FIG. 17, the user continues to hold down the ring finger touch 1630 while performing two taps of the middle finger 1710 within an acceptable proximity to the middle finger's current home position. The two taps 1710 cause the TEI system to invoke the output action that is associated with the middle finger which causes the application switching program 1730 to cycle two applications to the right (with reference to FIG. 16) to select application icon 1740 and make the corresponding application 1750 for the icon 1740 frontmost.

In some embodiments, a tap can invoke different output actions depending on the more precise position at which it is issued. Specifically, a first output action is invoked when a tap that is assigned to a particular finger is performed within an acceptable first area around the established home position of that particular finger, and a second output action is invoked when a tap is detected within an acceptable second area that is above the first area. In some embodiments, other output actions are invoked in response to taps with other directional cues such as left, right or diagonal offsets.

Figure 18:
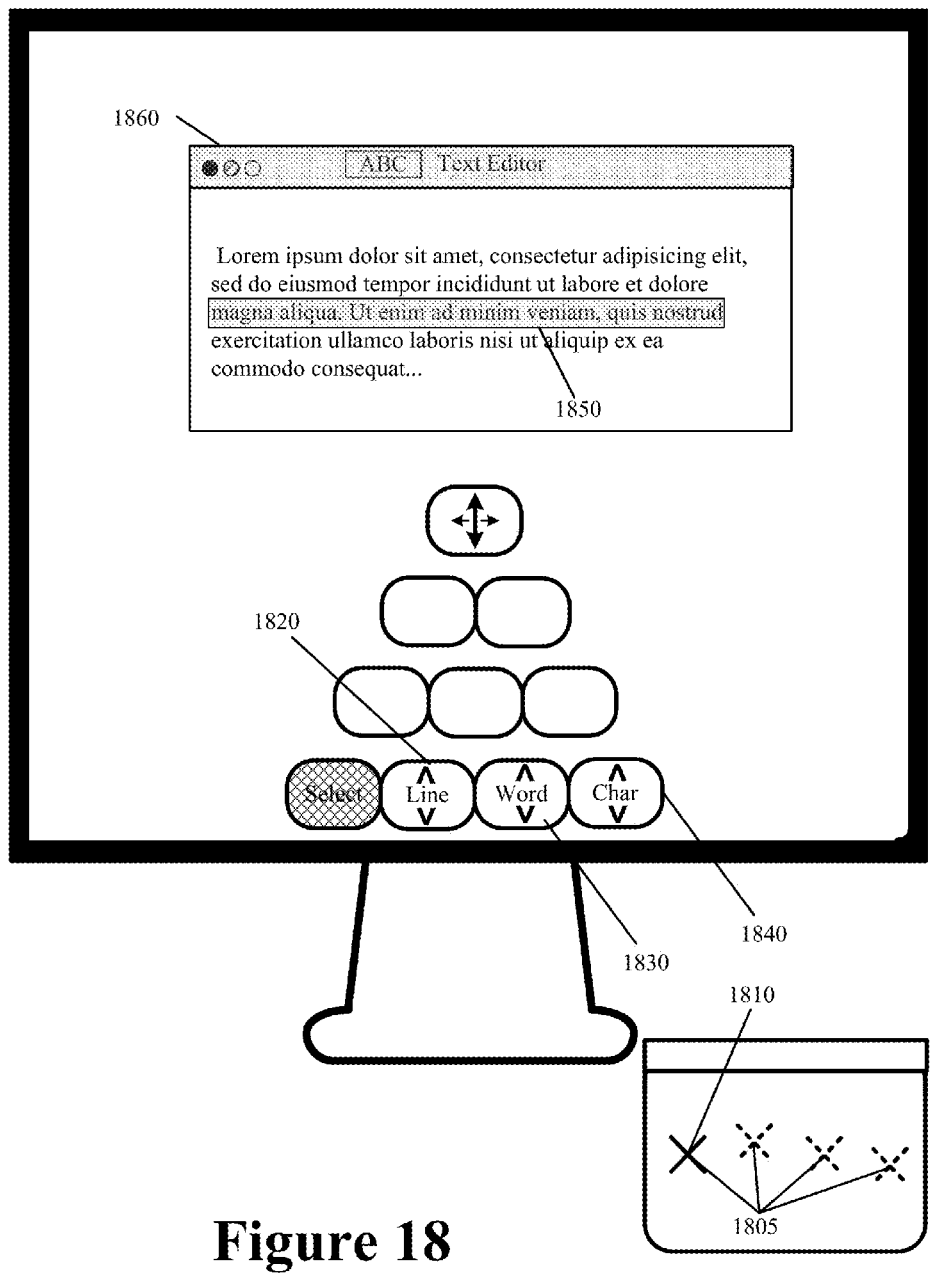
FIG. 18 illustrates a user performing a four finger touch on the trackpad and subsequent releases of the touches of the middle, ring, and little fingers while retaining the touch of the index finger beyond a time threshold and without movement beyond a distance threshold.
Figure 19:
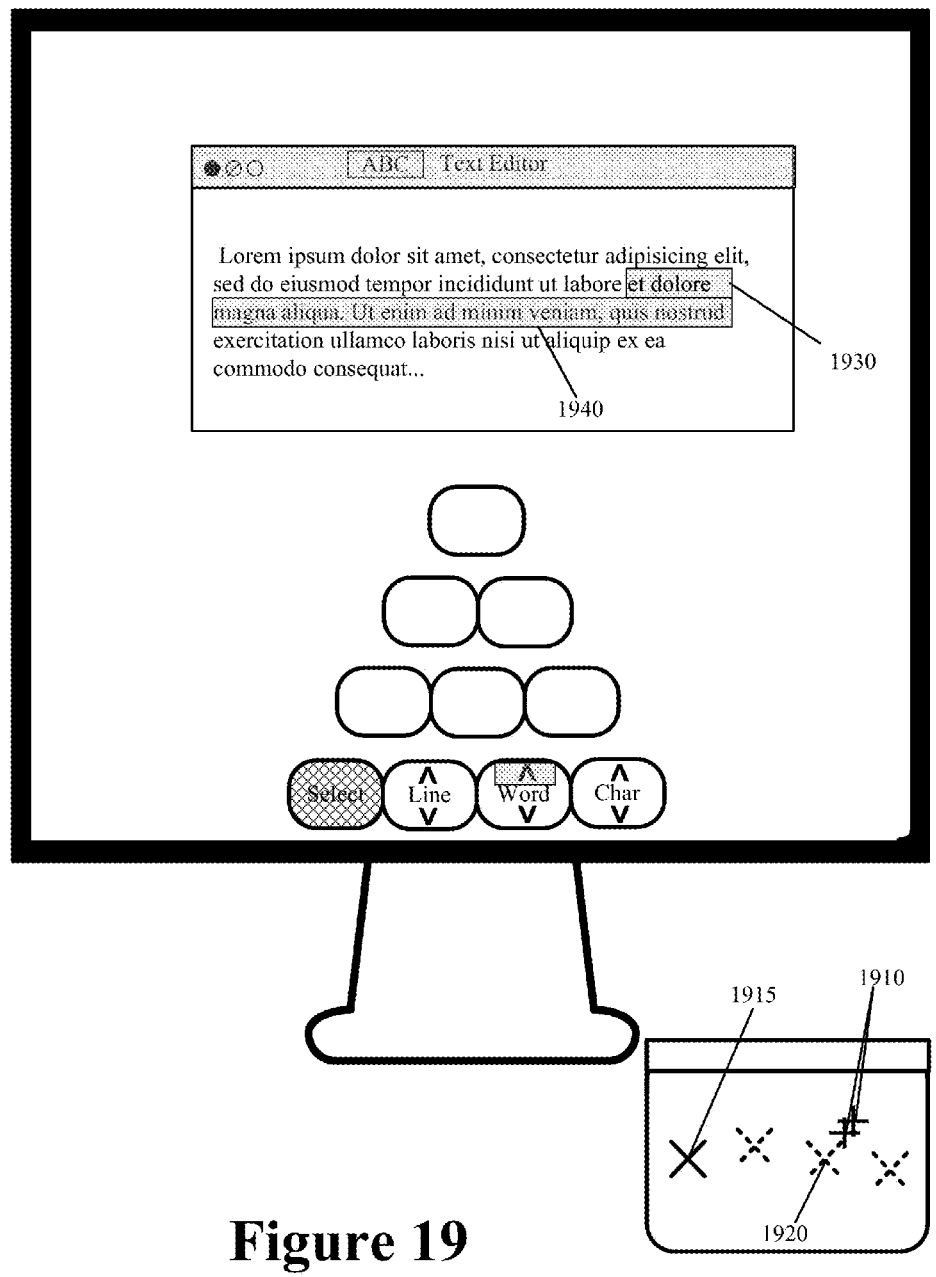
FIG. 19 illustrates a user performing two taps above the initial home position of the ring finger while continuing to hold the index finger touch.

FIGS. 18-19 illustrates using positional taps in a particular HOLD sub-mode to perform text selection in accordance with some embodiments which differentiate an upward biased positional tap. To cause the TEI system to enter the particular HOLD sub-mode of FIG. 18, the user performs a four finger touch 1805 on the trackpad and subsequent releases of the touches of the middle, ring, and little fingers while retaining the touch of the index finger 1810 beyond a time threshold and without movement beyond a distance threshold. From the four finger touch 1805, the TEI system maintains a reference to the home positions for each of the touches in the coordinate space of the trackpad even though they have been subsequently released. Using the established home positions and proximity computations, the TEI system can for each subsequent tap determine (i) which finger was responsible for the tap (e.g., middle, ring, or little), (ii) whether the tap occurred within the first acceptable area around the home position for that assigned finger, and (iii) whether the tap occurred within the second acceptable area that is above the first acceptable area for that assigned finger.

In FIG. 18, the hold of the index finger 1810 enables access to a HOLD sub-mode that includes a set of text selection operations according to some embodiments. The symbols of the TEI viewer then display which operations can be performed when this HOLD sub-mode is active. As shown, the symbols identify operations to select (i) a next line 1820 using taps of the middle finger, (ii) a next word 1830 using taps of the ring finger, and (iii) a next character 1840 using taps of the little finger. Specifically, a tap of the middle finger at or below the established home position of the middle finger selects a line below a current selection 1850 in the text editing application 1860 and a tap of the middle finger above an established home position of the middle finger selects a line above a current selection 1850 in the text editing application 1860. The taps may also be used to shrink a selection. For example, when an upward selection is first made, tapping at or below the established home position of the middle finger will cause the selection to shrink until no characters are selected at which point subsequent taps will extend a selection below the cursor position. Similar operation is used for selecting words with taps (i) at or below and (ii) above the established home position of the ring finger and for selecting characters with taps (i) at or below and (ii) above the established home position of the little finger.

As shown in FIG. 19, the user performs two taps 1910 above the initial home position of the ring finger 1920 while continuing to hold the index finger touch 1915. The two taps 1910 when assigned to the ring finger invoke output actions that select two words 1930 to the left of the selection 1940. When no text is selected but the insertion beam is within the text field, a tap either at or below or above the established home position of the middle finger causes the line at the current insertion beam position to be selected.

In some embodiments, the text selection operations are enhanced to allow text selection using slides of a touch in addition to or instead of the above described taps. For example, rather than tapping the ring finger, a user can slide or flick the ring finger downwards in order to continuously select words to the right of the current selection. Similarly, the user can issue a slide or flick of the ring finger upwards in order to continuously select words to the left of the current selection. The speed and characteristics of such slide or flick motions are proportional to the rate at which the selection size is modified such that the resulting effect is similar to inertial scrolling techniques which should be evident to one skilled in the art.

In some embodiments, users can seamlessly transition from the text selection HOLD sub-mode of FIGS. 18-19 to the TRACK operational mode by sliding the index finger touch beyond a particular distance threshold. The TEI system tracks the movement and converts the slide into a mouse pointer movement or echoes incoming trackpad pointer movement data by traditional means. In this manner, the user can freely move the cursor position to a new starting location. Once the movement ceases, the TEI system returns to the HOLD sub-mode whereby the above described text selection operations can be performed.

In some embodiments, after a selection has been made and the index finger is released, the TEI system enters the selection sub-mode of the LOCK operational mode. This enables the user to perform some output action on the newly selected text (e.g., copy or bold). After such operations are complete, the user may dismiss the LOCK sub-mode by the means described above, such as a four-finger tap, or a four-finger downward flick in accordance with some embodiments.

H. Combined LOCK and HOLD Mode Operation

Figure 20A:
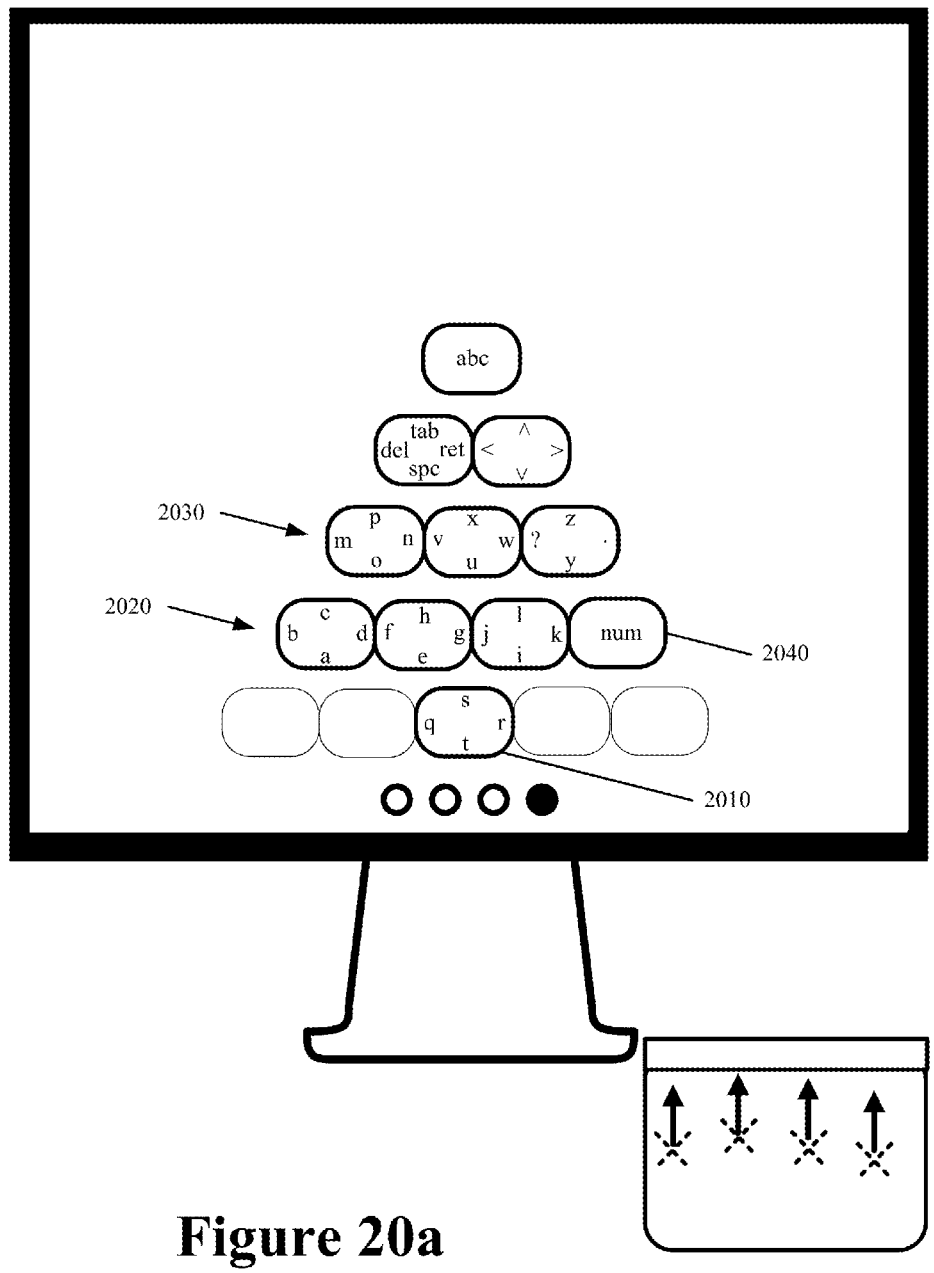
FIGS. 20a, 20b, and 21 illustrate a method of operating the TEI system using combined LOCK and HOLD operational mode functionality and further illustrate the TEI viewer with a fifth row of symbols in accordance with some embodiments.
Figure 20B:
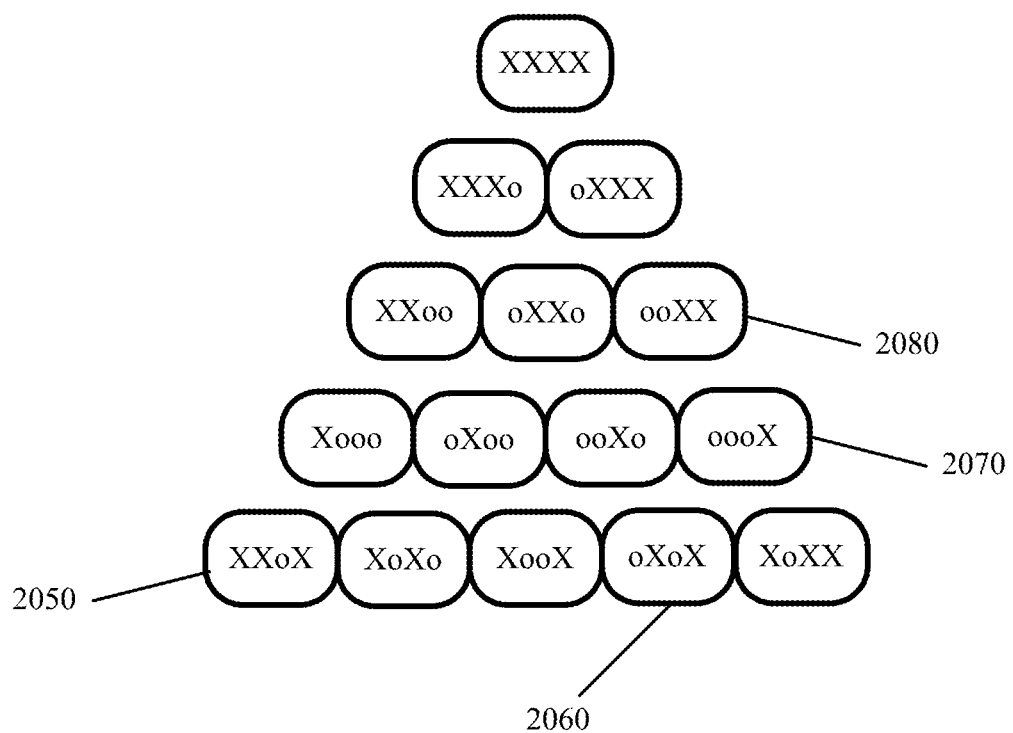
Figure 21:
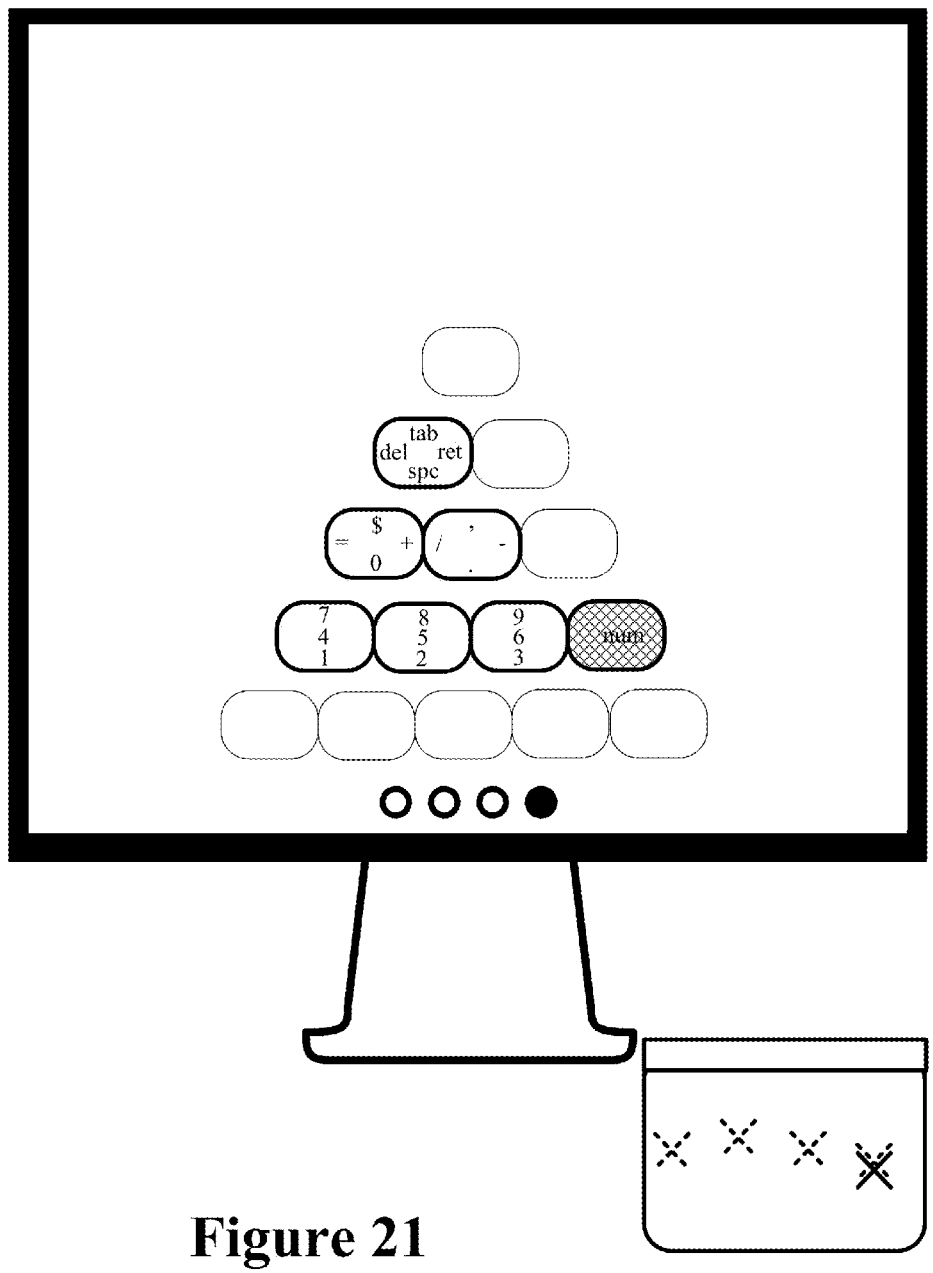

Though the LOCK operational mode and the HOLD operational mode have so far been described as separate modes of operation, some embodiments of the TEI system provide a method of operation that combines the functionality of both the LOCK and HOLD operational modes. Specifically, different sets of operations can be accessed from an active LOCK operational mode by issuing a hold of one or more fingers. FIGS. 20a, 20b, and 21 illustrate a method of operating the TEI system using combined LOCK and HOLD operational mode functionality and further illustrate the TEI viewer with a fifth row of symbols in accordance with some embodiments.

As shown in FIG. 20a, the TEI viewer is invoked with a four finger upward flick that provides access to a particular LOCK operational mode in a manner that is consistent with the above described methods of accessing LOCK operational mode functionality. In FIG. 20a, the TEI viewer displays yet another text insertion layout that is in accordance with some embodiments. Specifically, the TEI viewer displays a fifth row of symbols that includes a single symbol 2010 with four characters that can be inserted with different directional flicks of a discontinuous touch combination. Each of the characters displayed in the symbols in the fourth row of symbols 2020 can be inserted with different directional flicks of individual touches of the index finger, middle finger, and ring finger. Each of the characters displayed in the symbols in the third row of symbols 2030 can be inserted with different directional flicks of a pair of adjacent touches.

FIG. 20b illustrates the discontinuous touch combinations that are used to access output actions that are associated with the symbols in the fifth row of some embodiments, and other touches and touch combinations for accessing the output actions that are associated with the symbols in the other rows (i.e., rows one through four). In FIG. 20b, the touches that may be used to access the output actions that are associated with each symbol in the TEI viewer are denoted with four characters sequentially representing each finger (of a right hand), with the leftmost character representing whether a touch of the index finger is needed, with the rightmost character representing whether a touch of the little finger is needed, the character "X" representing that a touch of the corresponding finger is needed, and the character "o" representing that a touch of the corresponding finger is not needed. For example, with reference to symbol 2050, the characters "XXoX" indicate that the output actions that are associated with the symbol 2050 may be accessed using a touch combination that involves the index finger, middle finger, and little finger. Similarly, with reference to symbol 2060, the characters "oXoX" indicate that the output actions that are associated with the symbol 2060 may be accessed using a touch combination that involves the middle finger and the little finger. In conformance with the other TEI viewer representations earlier presented, symbol 2070 in the fourth row displays the characters "oooX" to indicate that the output actions that are associated with the symbol 2070 may be accessed using the little finger and the symbol 2080 in the third topmost row displays the characters "ooXX" to indicate that the output actions that are associated with the symbol 2080 may be accessed using a touch combination that involves the ring finger and little finger.

With reference back to FIG. 20a, a set of operations of a HOLD operational mode can be accessed from the LOCK operational mode by touching and holding the touch of the little finger that controls functionality associated with symbol 2040 in the fourth row of symbols 2020. In so doing, the character insertion layout of FIG. 20a changes to the numeric layout of FIG. 21. Based on the numeric layout of FIG. 21, different directional flicks of the index finger can be used to insert the numeric values 1, 4, and 7 while the touch of the little finger is retained; different directional flicks of the middle finger can be used to insert the numeric values 2, 5, and 8 while the touch of the little finger is retained; and different directional flicks of the ring finger can be used to insert the numeric values 3, 6, and 9 while the touch of the little finger is retained.

For each finger, the first numeric value (i.e., 1, 2, and 3) is inserted with a downward flick of the corresponding finger. For each finger, the middle numeric value (i.e., 4, 5, and 6) is inserted using either an upward slide that is immediately followed by a downward flick or a downward slide that is immediately followed by an upward flick of the corresponding finger. For each finger, the last numeric value (i.e., 3, 7, and 9) is inserted with an upward flick of the corresponding finger. So long as the touch of the little finger is held down, the numeric layout of FIG. 21 is accessed allowing the user to insert numbers into a text field. When the hold of the little finger is removed, the character layout of FIG. 20a is again presented allowing the user to resume character insertion into the text field.

Figure 22:
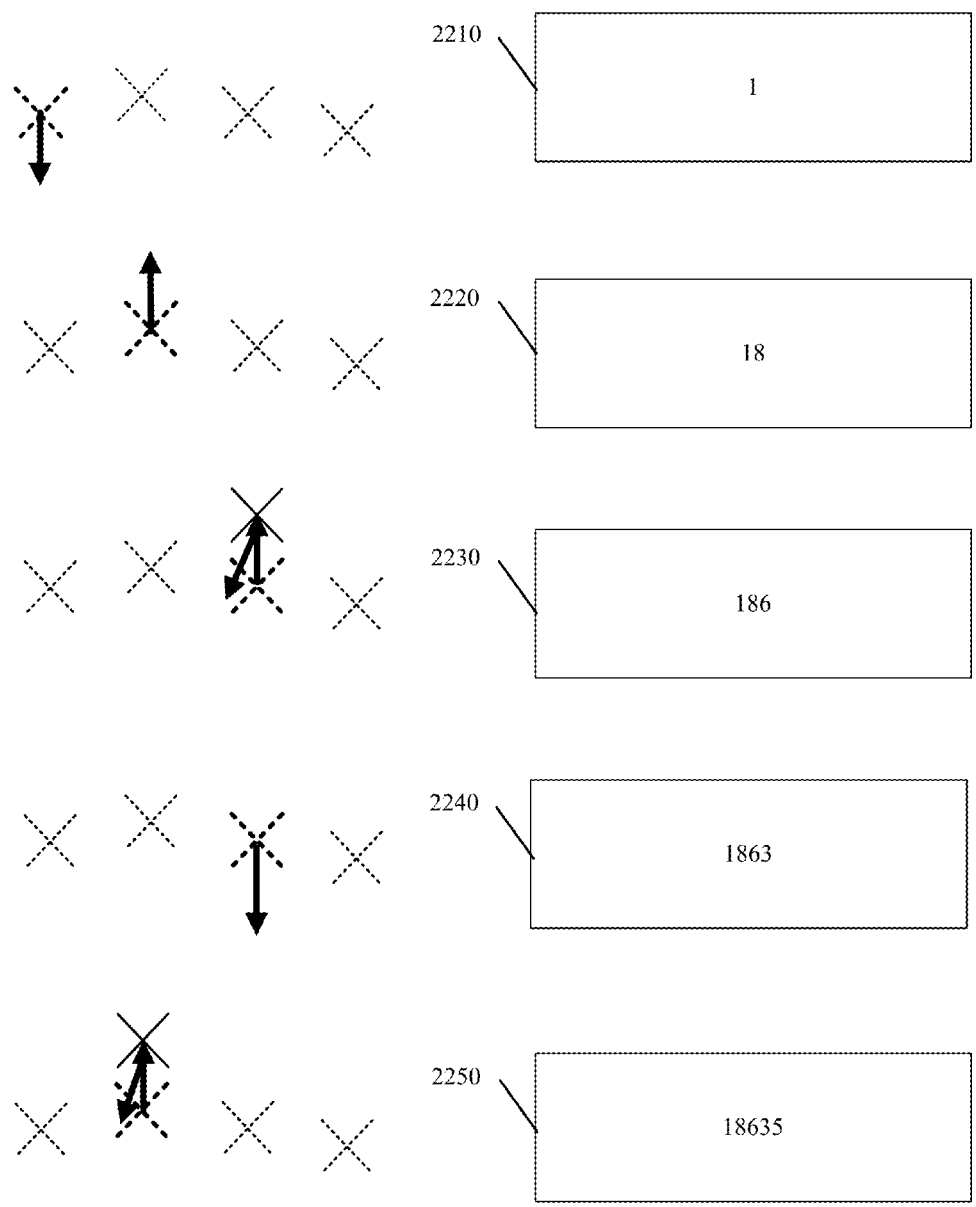
FIG. 22 illustrates inserting the number 18635 into a text field using the numeric layout of FIG. 21.

FIG. 22 illustrates inserting the number 18635 into a text field using the numeric layout of FIG. 21. As shown at 2210, the user performs a downward flick of the index finger to insert the numeral "1". At 2220, the user performs an upward flick of the middle finger to insert the numeral "8". At 2230, the user performs an upward slide of the ring finger that is immediately followed by a downward flick of the ring finger to insert the numeral "6". At 2240, the user performs a downward flick of the ring finger to insert the numeral "3". At 2250, the user performs an upward slide of the middle finger that is immediately followed by a downward flick of the middle finger to insert the numeral "5".

I. Automatic Operation Selection

In some embodiments, the symbols of the TEI viewer and the operations that are identified by the symbols are automatically selected for the user based on system state information and/or previous user activity. Specifically, the TEI system monitors system state information and/or previous user activity to automatically select an appropriate set of operations when the user performs a rightward four finger directional flick. Upon receiving the rightward directional flick, the TEI engine enters a particular LOCK sub-mode and the TEI viewer populates the symbols to identify the set of operations for that particular LOCK sub-mode.

The TEI system acquires the system state information from an operating system (OS) or other component or subsystem of the device on which the TEI system executes. In some embodiments, when the TEI system is initialized, it executes API calls that cause the OS to push various system state information to the TEI system. In some embodiments, the system state information notifies the TEI system of a change to the frontmost application, the focus within the frontmost application, and whether characters are selected in a text field that has focus. In some embodiments, the TEI system polls or otherwise periodically obtains the system state information from the OS or other components of the device.

Based on the system state information, the TEI system can identify different sets of symbols for the TEI viewer to display and identify different operations to perform when different applications are frontmost, when different UI elements of a particular application have focus, or when characters are selected within a particular text field that has focus. For example, FIGS. 23 and 24 illustrate the TEI viewer displaying different symbols that identify different output actions when a first application is frontmost and when a second application is frontmost in accordance with some embodiments.

Figure 23:
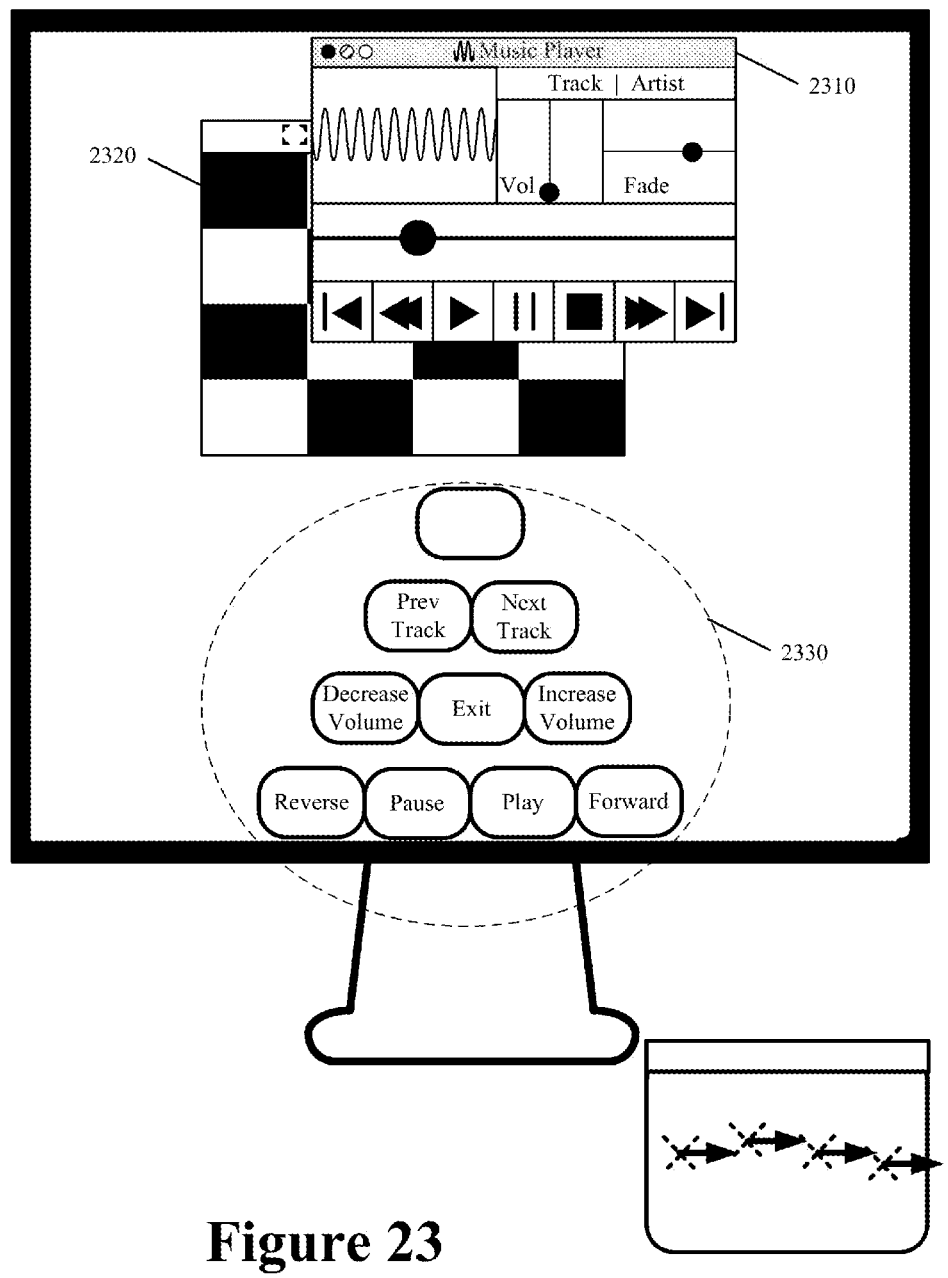
FIG. 23 illustrates that a first application is frontmost and that a second application is in the background.

In FIG. 23, application 2310 is frontmost and application 2320 is in the background. Accordingly, when the user performs the rightward four finger directional flick that causes the TEI system to enter the LOCK operational mode, the TEI viewer displays symbols 2330 that identify output actions that are specific to the frontmost application 2310. In this figure, the application 2310 is a music player application. The symbols 2330 identify various output actions that are specific to the music player application 2310.

Figure 24:
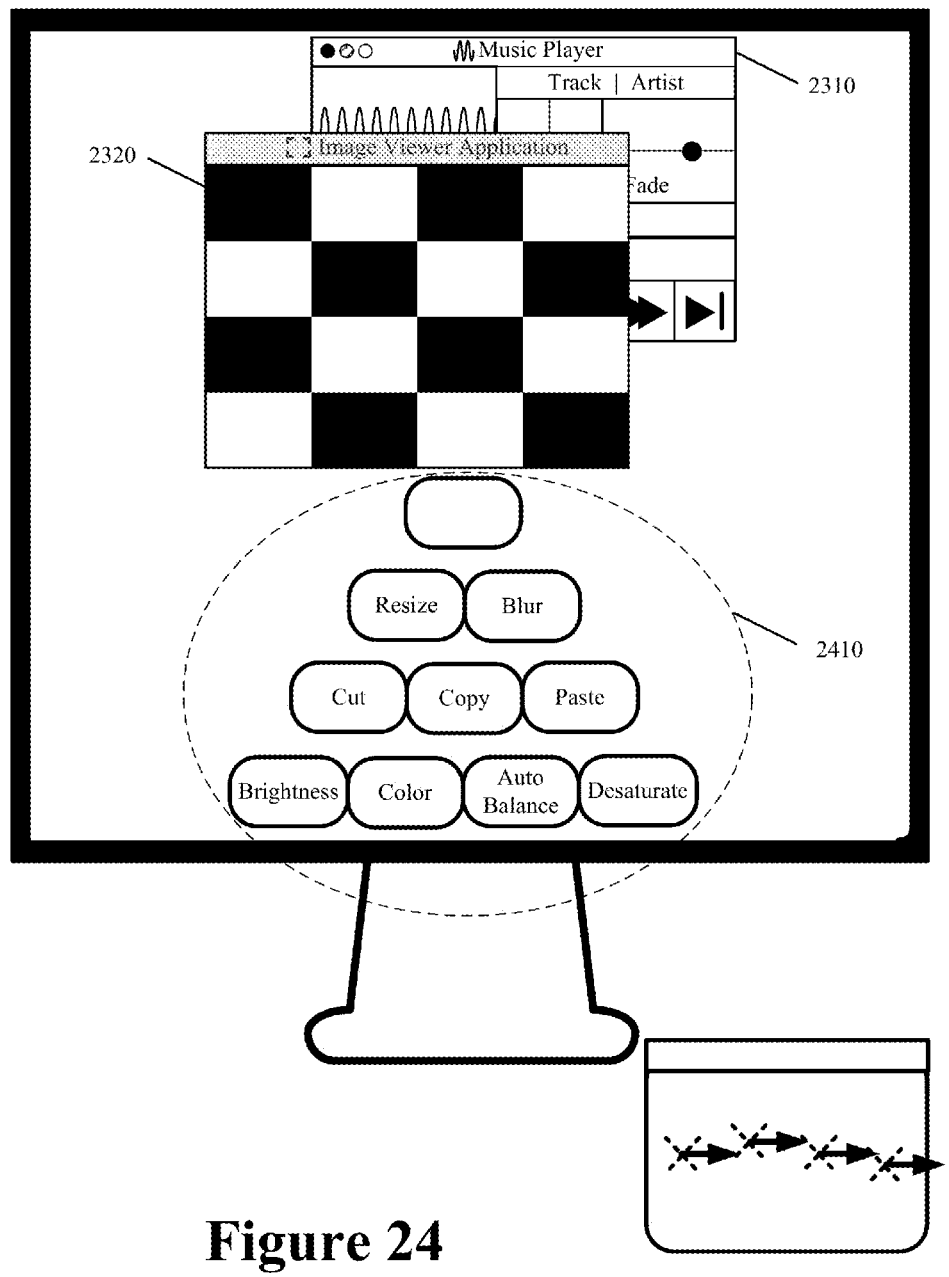
FIG. 24 illustrates that the second application is frontmost and that the first application is in the background.

In FIG. 24, the application 2320 is frontmost and the application 2310 is in the background. Application 2320 is an image editing application. Accordingly, when the user performs the rightward four finger directional flick that causes the TEI system to enter the LOCK operational mode, the TEI viewer displays symbols 2410 that identify a set of image manipulation operations that are specific to the image editing application.

Figure 25:
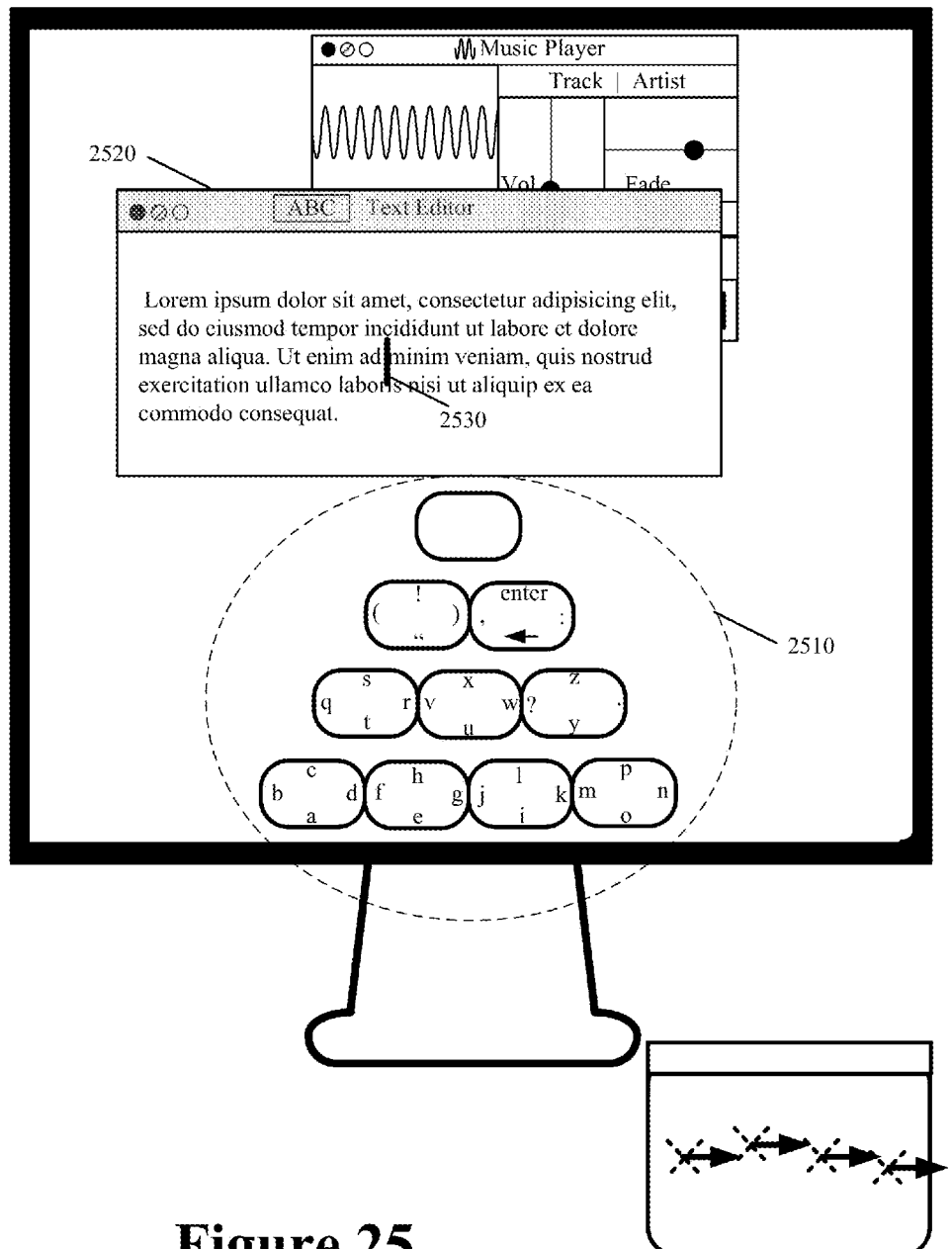
FIG. 25 illustrates a particular application that is frontmost and that includes a text field that has focus, and no characters are selected in the text field.

As a third example, when an application with a text field is frontmost, the TEI system determines from the system state information whether the text field has focus and whether a text selection has been made in the text field. When there are one or more selected characters in a focused text field, the TEI system automatically provides access to a set of text manipulation operations. When the text field has focus and no text selection is made in the text field, the TEI system automatically provides access to the character insertion operations. For example in FIG. 25, application 2520 is frontmost and application 2520 includes a text field that has focus, and no characters are selected in the text field. Accordingly, the TEI viewer displays symbols 2510 that identify characters that can be inserted into the text field at the insertion point 2530. In some cases, the language of the focused element may vary, in which case the TEI viewer presents the set of characters for insertion which are appropriate for the language. For example, when the focused element is a text field containing French text, the TEI viewer presents the set of characters for that language which includes accented characters. If the focused element is then changed to a text field containing Japanese text, the TEI viewer presents a set of Japanese characters, which may include multiple sets such as hiragana, katakana, kanji, and romaji.

As a fourth example, when a spreadsheet-like application is frontmost, the user may click on cells that are formatted differently. A first cell may contain text, a second cell may contain a dollar figure, and a third cell may contain a star rating. As the user clicks these different cells, the TEI viewer presents a context appropriate set of symbols to facilitate relevant input.

In some embodiments, the TEI system stores aggregated data reflective of past user activity. Such accumulated data may also be utilized by the TEI system to determine specific symbols, output actions and other facets of the TEI operation.

Using the system state information and user activity historical data, the TEI system can dynamically display remote generated symbols. For example, when a web browser application is frontmost, the TEI system can populate the TEI viewer with links to common or frequently accessed URLs within the top domain name of the site. For example, many sites contain intra-site links to pages such as home, sign-in, my account, search, store, shopping cart, checkout, about us, locations, site map, etc. The TEI system presents such locations as symbols in order to facilitate quick and easy access, as well as some degree of consistency between web sites.

Additionally, the TEI system can populate the TEI viewer with symbols from sites of content providers that pay to have the links populated within the TEI viewer. The TEI viewer can also include symbols linking to applications or scripts of content providers that pay to have their applications or scripts accessible from within the TEI system. Similarly, advertisements can be presented within the symbols of the TEI viewer such that when the user performs a flick that invokes a particular advertisement, the user device is made to present information that pertains to the particular advertisement. The information may include, as examples, loading a website of the advertiser, running a script, downloading and launching an application, or opening a file with advertisement information etc. Additionally, when an application of a particular developer is launched, one or more symbols of the TEI viewer can be set to display symbols that identify other application products of the particular developer where the particular developer has paid for these symbols to be present on the TEI viewer. Such functionality is available for any device that functions with the TEI system and where the remote generated symbols are obtained over a network in real time or on a periodic basis.

J. Screen-Mapped UI

When the TEI system is running under a screen-mapped UI (such as a tablet device), the fingers of the user manipulate the touch surface, which is directly on top of the display. Usage of the TEI system in conjunction with such a screen-mapped UI creates additional operational paradigms.

One such operational paradigm is referred to as the "beginner mode". When using the TEI system in the beginner mode, the user may interact directly with the symbols of the TEI viewer by touching them directly. For example, the user first invokes the TEI viewer with a four finger tap, a four finger directional flick up, left, or right, or with a touch and hold of one or more fingers anywhere on the touch surface of the device. Next, the user performs an operation that is identified by a particular symbol of the TEI viewer by issuing taps, holds, slides or flicks directly over the particular symbol. Moreover, a topmost symbol of the TEI viewer can be expanded to a set of symbols by issuing a slide directly over the topmost symbol in some embodiments. This "beginner mode" allows users to become familiar with symbol orientation and other TEI characteristics while utilizing only a single finger, rather than the above described touch combinations, to access the functionality associated with each of the symbols of the TEI viewer. The beginner mode is also intended to accommodate users who may have manual dexterity challenges or other physical limitations.

Figure 26:
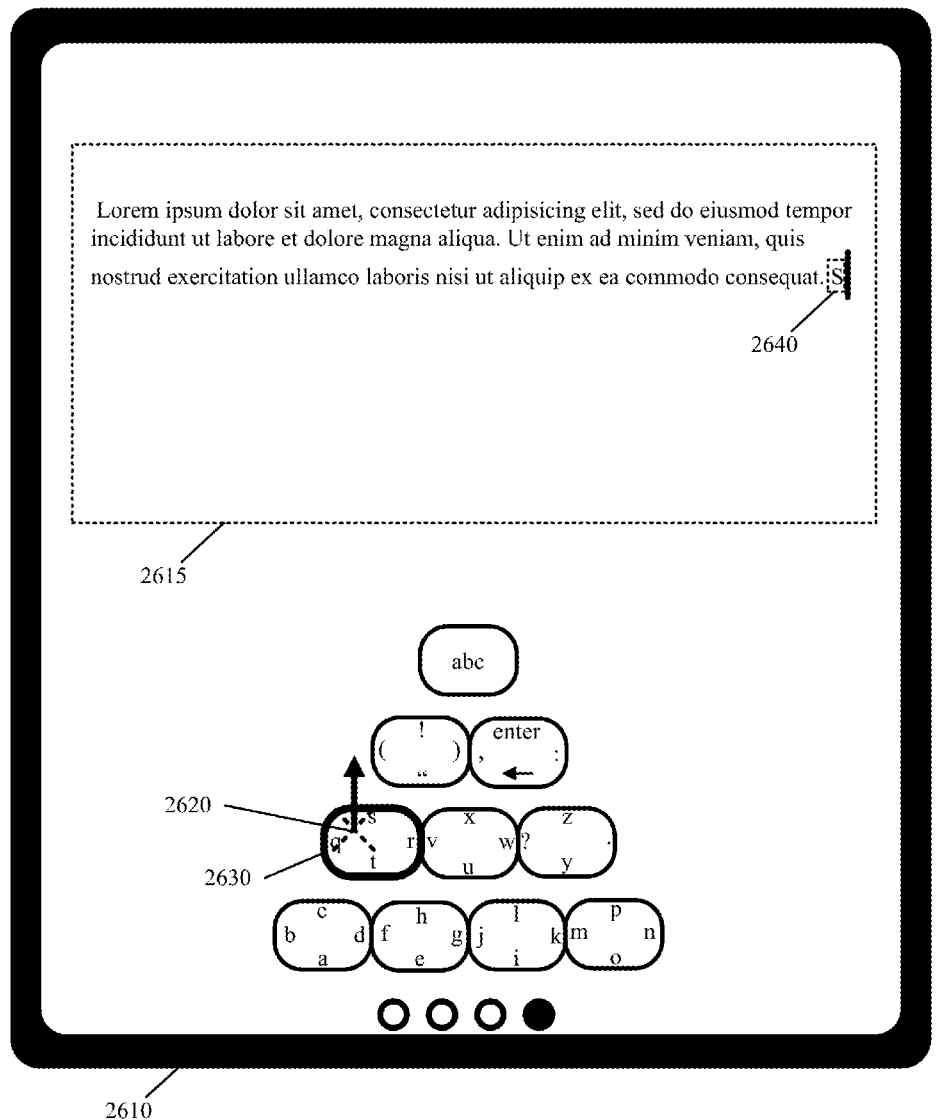
FIG. 26 illustrates inserting text by issuing touches directly over displayed symbols of the TEI viewer using a touchscreen device under a screen-mapped UI in accordance with some embodiments.

FIG. 26 illustrates inserting text by issuing touches directly over displayed symbols of the TEI viewer using a touchscreen device under a screen-mapped UI in accordance with some embodiments. In this figure, a four finger upward flick (not shown) was performed somewhere on the touchscreen of the device 2610 to instantiate the TEI viewer with the symbols that identify characters for insertion into text field 2615. It should be noted that the TEI viewer may have been invoked automatically, or in response to other input such as a gesture, button, tilt, rotation, etc. When the user issues a touch 2620 over symbol 2630, the user can insert the "q", "r", "s", and "t" characters. Specifically, flicking the touch 2620 upward inserts the "s" character, flicking the touch 2620 downward inserts the "t" character, flicking the touch 2620 leftward inserts the "q" character, and flicking the touch 2620 rightward inserts the "r" character. In this figure, the user flicks the touch 2620 upward and the "s" character is inserted at 2640 into the text field 2615. In this manner, the user can access the TEI system functionality in a beginner mode. Users can access any symbol with a single touch thereby foregoing the need to associate a particular touch combination to a particular symbol.

Running the TEI system under a screen-mapped UI however creates the potential problem of the fingers and hands of the user visually blocking areas of the display while in use. To minimize this phenomenon, a second operational paradigm referred to as the "omni-touch mode" is provided. In the omni-touch mode, the symbols of the TEI viewer are presented in an inverted triangle centered at the top of the device. Such a configuration mirrors the previously described configuration in that single touches are displayed on the top row (i.e., row with four symbols), dual touches on the following row (i.e., row with three symbols), triple touches in the next lower row (i.e., row with two symbols), and four-finger touches in the lowest row. However, to access the functionality associated with each symbol, the user need not touch directly on the symbol as was described above with reference to the beginner mode. Instead, the user can establish home positions anywhere on the screen-mapped UI with a four finger tap, four finger flick, or touch and hold. From the established home positions, the TEI system can thereafter differentiate the user's touches and associate them to different fingers. The user can then issue touches, taps, flicks, slides to access the corresponding functionality or the user may reestablish the home positions.

Figure 27A:
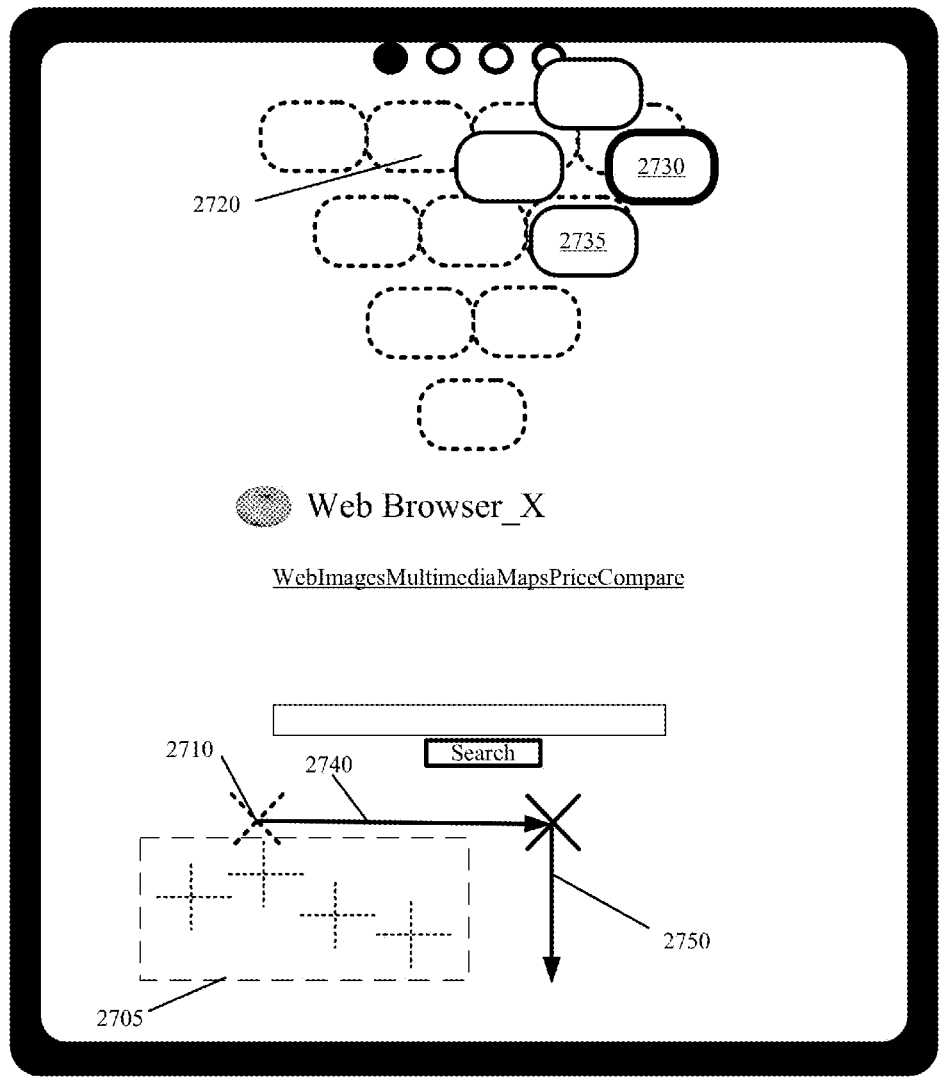
FIG. 27a illustrates similar operation that can be used to expand symbols and perform other operations such as invoking output actions.

FIG. 27a illustrates usage of the TEI system from the omni-touch mode in accordance with some embodiments. In this figure, the user issues a four finger tap (as denoted by the four dotted "+" characters) at position 2705 on the touch surface of the device. The TEI system processes the four finger tap to display the TEI viewer in the inverted orientation from the top of the device and to establish the home positions for the touches. The user then issues a touch 2710 closest to the established home position for the middle finger and so the touch is associated with operation of symbol 2720 in the TEI viewer. The user slides the touch 2710 to the right (movement 2740) to expand the symbol 2720 into the set of symbols. The rightward slide 2740 selects the symbol 2730 in the expanded set of symbols. A subsequent downward flick 2750 of the touch 2710 invokes the output action that is identified by the symbol 2735.

In some embodiments, the omni-touch mode and associated functionality enables multiple simultaneous users to interact with the TEI system using a single touchscreen device. This is referred to as the multi-user omni-touch mode. In the multi-user omni-touch mode, each user is provided with an instance of TEI input. Each instance provides each user complete and independent access to the TEI system functionality. Such usage is useful for a multi-tasking OS or multi-user environment, wherein a first user interacts with a first application running on the device while a second user interacts with a second application running on the device. For example, a first instance may be used by a first user to securely enter a password into a text field of an application running a particular touchscreen device while a second user uses a second instance to control a music player application elsewhere on the particular touchscreen device. Such usage is also useful for collaboration between two users on a single device. For example, separate instances of TEI input may be instantiated for a two player game, wherein the first instance allows the first user game playing controls and the second instance allows the second user game playing controls based on the above described TEI system taps, slides, and flicks.

Each instance of TEI input is instantiated based on where the user issues a four finger tap, four finger directional flick, or touch combinational hold to access the TEI system functionality. The instantiated instance of TEI input is then controllable by subsequent touches, taps, holds, slides, and flicks that the user issues at or adjacent to the tap, flick, or touch combinational hold that was used to instantiate that instance (i.e., the home positions). Each instance provides the instantiating user access to his/her own set of operations that can be invoked or switched out for a different set of operations without affecting the other instances that are instantiated elsewhere on the same device by different users. In some embodiments, each instance is represented by a different TEI viewer that is displayed adjacent to the tap, flick, or touch combinational hold of the user that was used to instantiate that instance. In some embodiments, each instance of TEI input is a separate process that is instantiated from a master process or application of the TEI system, whereby the separate processes have access to a shared set of application resources. The multi-user omni-touch mode is ideal for large touchscreen devices, collaborative touchscreen surfaces, or for media hubs that offer various services to multiple simultaneous users.

Figure 27B:
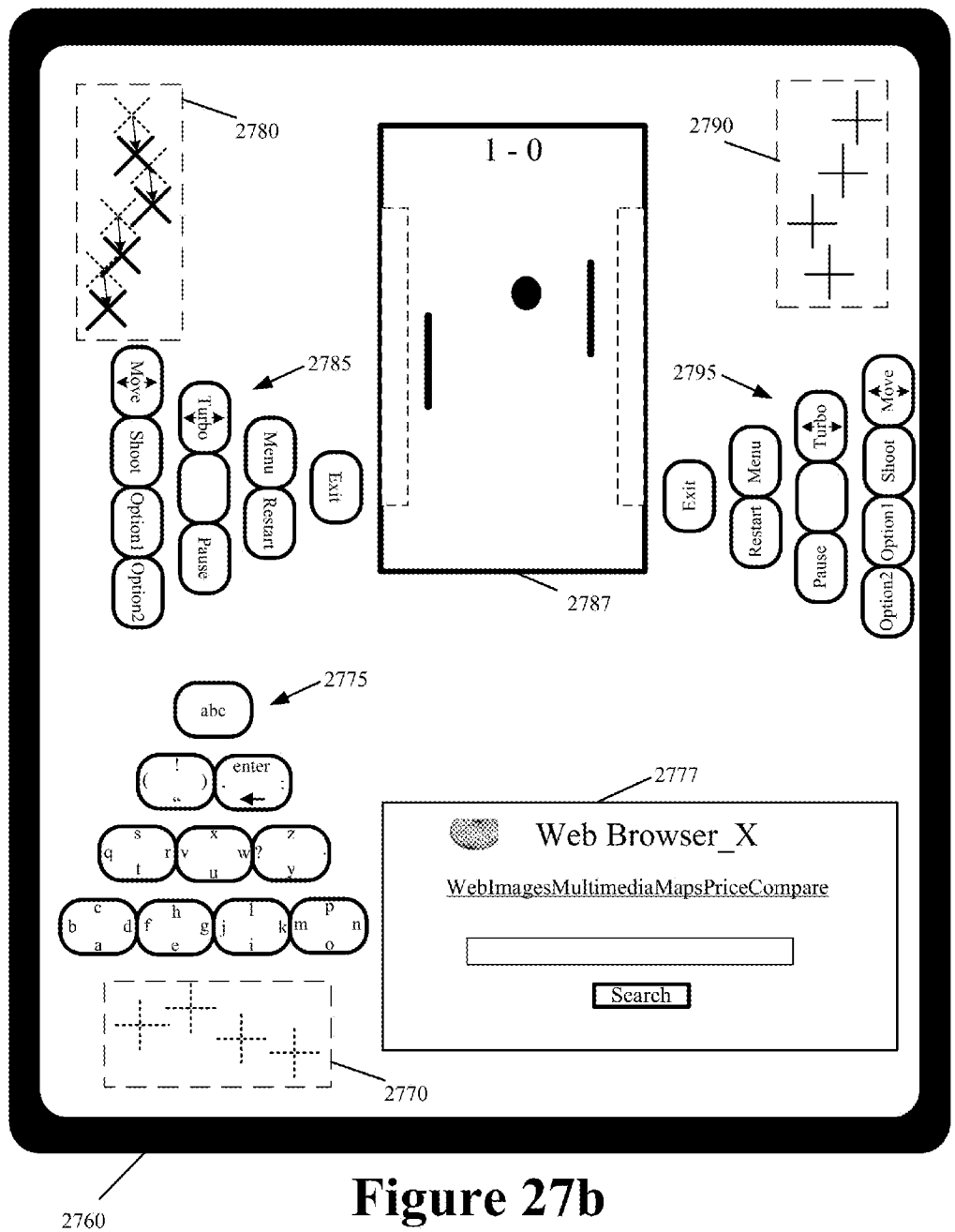
FIG. 27b illustrates the multi-user omni-touch mode of the TEI system in accordance with some embodiments.

FIG. 27b illustrates the multi-user omni-touch mode of the TEI system in accordance with some embodiments. Specifically, FIG. 27b illustrates three simultaneous users that each interact with a separate instance of TEI input on the same touchscreen device 2760.

The first instance of TEI input is enabled when a first user performs an essentially simultaneous four finger tap (of the right hand) as indicated by the four dotted "+" 2770. The examples in this figure illustrate all users using the right hand, although the TEI system would interpret left hand usage and adapt accordingly. In response to the four finger tap, a first instance of TEI input is instantiated for use by the first user. The first instance of TEI input is represented by the first TEI viewer 2775 that is presented above the initial four finger tap of the first user. For this first instance, the four finger tap enabled access to a set of characters for text insertion operations in conjunction with the application 2777. It is assumed for the purposes of this figure that application 2777 has the first user's operational focus. In addition to instantiating the first instance in response to the four finger tap, the TEI system also establishes the home positions for the first user based on the four finger tap such that subsequent touches, taps, holds, slides, and flicks performed by the first user will be processed in relation to the established home positions in order to (1) determine that the input is intended to control the first instance and (2) determine which finger or fingers the inputs correspond to in order to provide a user intended result. In other words, the first instance uses the established home positions in order to determine if a subsequent single finger flick is issued by the first user based on the proximity of the subsequent flick to the established home positions and which finger the single finger flick corresponds to based on a proximity of the single finger flick to the established home positions for the first user's index, middle, ring, or little fingers. The first user can switch out of the text insertion set of operations by performing a four finger leftward or rightward flick or by switching the set of operations using any of the other above described gestures.

The second instance of TEI input is enabled when a second user performs an essentially simultaneous rightward four finger flick 2780 while the first instance of TEI input is running and the rightward four finger flick 2780 is performed a sufficient distance from the first user's four finger tap 2770 such that the TEI system is able to distinguish between the touches of the first user and those of the second user. In response to the rightward four finger flick 2780 of the second user, a second instance of TEI input is instantiated as represented by the second TEI viewer 2785. The second TEI viewer 2785 is presented adjacent to the rightward four finger flick 2780 of the second user. For this second instance, the rightward four finger flick 2780 launches the game application 2787 and provides the second user with controls to the game application 2787.

The third instance of TEI input is enabled when a third user performs a four finger touch and hold 2790 while the first instance and the second instance of TEI input are running, and the touch and hold 2790 is performed a sufficient distance from the first user's four finger tap 2770 and the second user's rightward four finger flick 2780. In some embodiments, additional sensors or techniques described herein, including proximity sensing, context, and historical data are employed to further assist the TEI system from determining when a new instance of TEI input should be instantiated. When these conditions are satisfied, the TEI system is able to distinguish between the touch inputs of the first, second, and third users and in response to the four finger touch and hold 2790, a third instance of TEI input is instantiated. The third instance is represented by the third TEI viewer 2795 that is presented adjacent to the four finger touch and hold 2790. For this third instance, the four finger touch and hold 2790 provides a second set of controls to the game application 2787 such that the third user can now play the game at the same time as the second user.

K. Trackpad Viewer

In some embodiments, the TEI system includes an optional trackpad viewer. The trackpad viewer graphically depicts user touches that are performed on a trackpad or other touch device as the TEI system runs. Such a display allows a user to simultaneously view her/his touches and movements on the trackpad and the corresponding actions they perform on the TEI viewer. In some embodiments, the trackpad viewer also serves to teach users about the functionality of the TEI system. In some embodiments, the trackpad viewer displays ranges which categorize the user's touches into finger assignments. Specifically, the trackpad viewer may display four ranges where each range identifies that an initial touch performed in that range will be assigned to control operations specific to a particular finger. The trackpad viewer is therefore a useful tool to train users in the use and operation of the TEI system.

Figure 28:
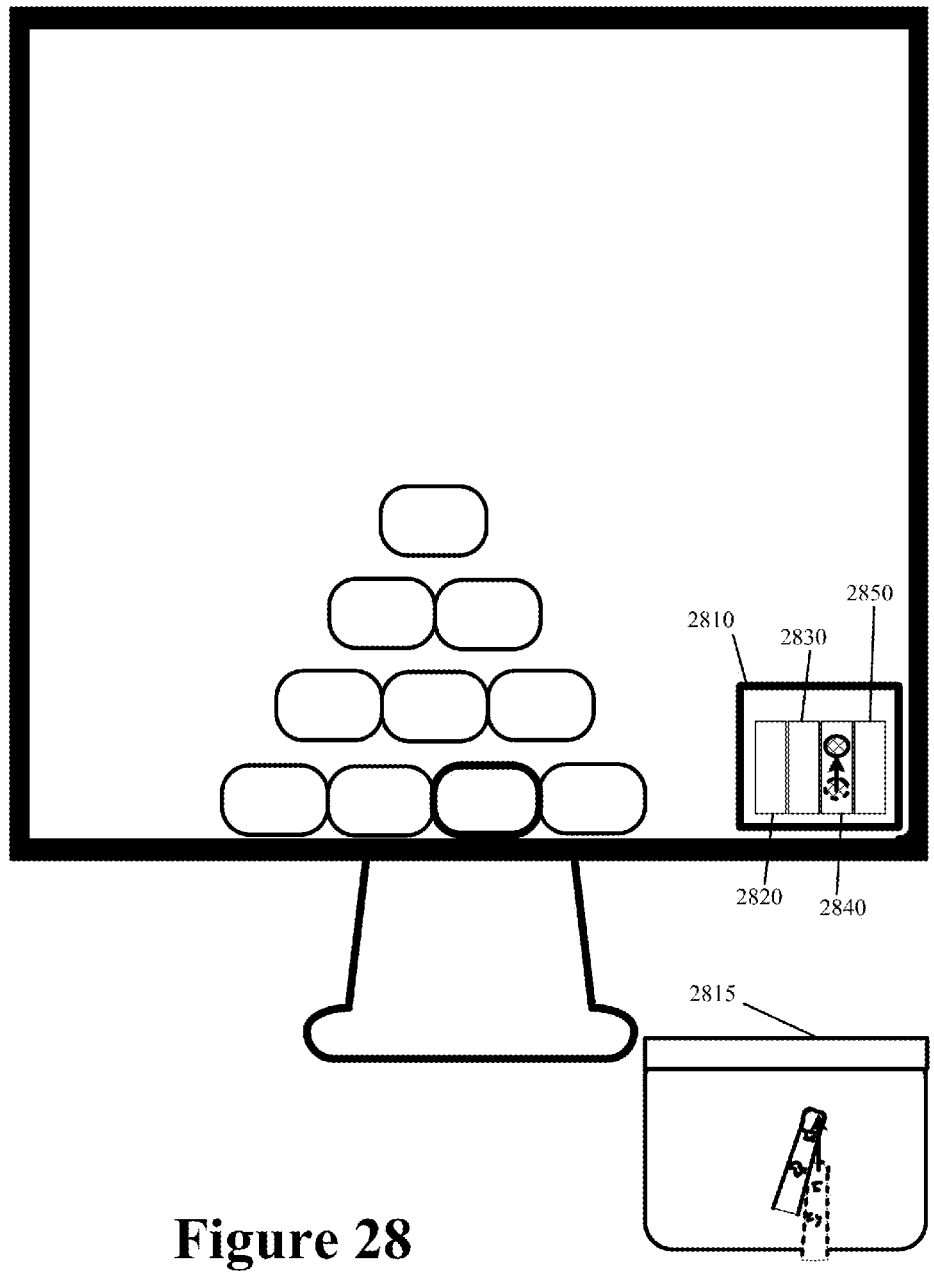
FIG. 28 illustrates the trackpad viewer in accordance with some embodiments.

FIG. 28 illustrates the trackpad viewer 2810 in accordance with some embodiments. The trackpad viewer 2810 provides on-screen monitoring of the user touches that are performed on the trackpad 2815. Specifically, the trackpad viewer 2810 includes a set of indicators where each indicator represents a user's touch on the trackpad 2815. The indicator may include digit representations of the user's fingers and/or other symbols and representations. The trackpad viewer 2810 also includes four ranges 2820, 2830, 2840, and 2850. In some embodiments, each range is used to identify to the user how touches performed on the trackpad 2815 are assigned to control operations with different finger combinations. Touches issued in range 2820 are assigned to control index finger associated operations, touches issued in range 2830 are assigned to control middle finger associated operations, touches issued in range 2840 are assigned to control ring finger associated operations, and touches issued in range 2850 are assigned to control little finger associated operations. Therefore, when the user issues a touch on the trackpad 2815 and the touch is mirrored to fall in the range 2840 of the trackpad viewer 2810, that touch can be used to perform operations that are assigned to the ring finger. When the user moves the touch, the movement is reflected in the indicator of the trackpad viewer 2810 and initial home positions are interactively adjusted in real time.

II. TEI System

The above described functionality is implemented by the TEI system of some embodiments. As shown in FIG. 29a and FIG. 29b, the TEI system operates alongside existing touch functionality of a touch operated device.

FIG. 29a illustrates the simplified operation of a touch operated device without the TEI system of some embodiments. The device includes system software 2910 and device event handler 2920. A user provides user actions (e.g., touch, tap, slide) to the device using one or more input devices that may include a trackpad, touchscreen, a set of touch sensitive keys, buttons, areas, or objects, or any other sensing hardware that detects finger contact and/or movement, and communicates with the device.

The system software 2910 includes device drivers for the various input devices. The system software 2910 generates touch events 2930 based on user actions. In some embodiments, the touch events 2930 are data that specifies, for example, a state, an identifier, and an x-y coordinate for each detected touch. In some embodiments, the touch events 2930 specify one of three states: begin, move, and end. The begin state indicates that a new touch was detected. The move state indicates that an existing touch was moved. The end state indicates that a touch has been released. A unique identifier is assigned to each begin state event. The assigned identifier is included with each subsequent move state event and end state event. Based on the identifier, the path and release of a particular touch can be tracked. The x-y coordinates of the events 2930 map to an x-y coordinate space of the device screen display, a remote screen, or coordinate space that is associated with the input device on which the user actions are being performed.

A two finger touch causes the system software 2910 to generate two events. A first event is generated for the first touch and a second event is generated for the second touch. The first event specifies the begin state, is assigned a first identifier, and identifies an x-y coordinate of the first touch. The second event specifies the begin state, is assigned a second identifier, and identifies an x-y coordinate of the second touch. Subsequent movements of the first finger generate events that specify the move state, include the first identifier, and identify differing x-y coordinates to track the movement within the x-y coordinate space.

The touch events 2930 are processed by the device event handler 2920 in order to perform operations that perform various functionality on the device. The device event handler 2920 may be implemented in firmware, as part of an operating system (OS) of the device, or one or more applications or processes that run on the OS or device.

FIG. 29b illustrates the enhanced operation of the touch operated device when the device is enhanced with the TEI system 2950 of some embodiments. In addition to the system software 2910 and device event handler 2920, the device includes the TEI system 2950. The TEI system 2950 includes TEI engine 2960, TEI database 2970, and TEI viewer 2980. The TEI system 2950 may be (1) a separate executable software application, process or plug-in component, (2) integrated into the OS of the device, or (3) integrated as firmware instructions or other executable instructions that are stored in computer-readable media such as the memory of the device.

The TEI engine 2960 requests touch events 2930 from the system software 2910. In some embodiments, the requests are made via API calls or by altering settings of the system software 2910 or OS of the device. When the TEI system 2950 is integrated as a core component of the device, the events 2930 are directly routed to the TEI engine 2960.

The TEI engine 2960 analyzes the received events 2930 to (i) identify right-handed or left-handed operation, (ii) establish home positions, (iii) assign touches to control operations that are associated with a particular finger, (iv) change between the active operational modes and sub-modes, and (v) generate enhanced events 2990 based on user actions (e.g., touches, holds, taps, slides, flicks, etc.). The enhanced events 2990 pass from the TEI engine 2960 to the TEI database 2970 where they identify and perform the various operations of the various sub-modes. The TEI database 2970 also stores the symbols for the TEI viewer 2980 display. Based on the active sub-mode of the TEI engine 2960, the TEI engine 2960 selects different sets of symbols from the TEI database 2970 for display in the TEI viewer 2980.

In some cases, when the TEI system is not fully integrated into the OS of the device, the TEI system may need to override existing touch device functionality in certain modes and sub-modes of the TEI engine. For example, when using the TEI system to type text into a text field, the various flicks and other manipulations should not also move the cursor, scroll the display, click on any UI element, etc. The TEI system may therefore include specific instructions to block or counteract such unintended operation overlap.

A. TEI Engine

Figure 30A:
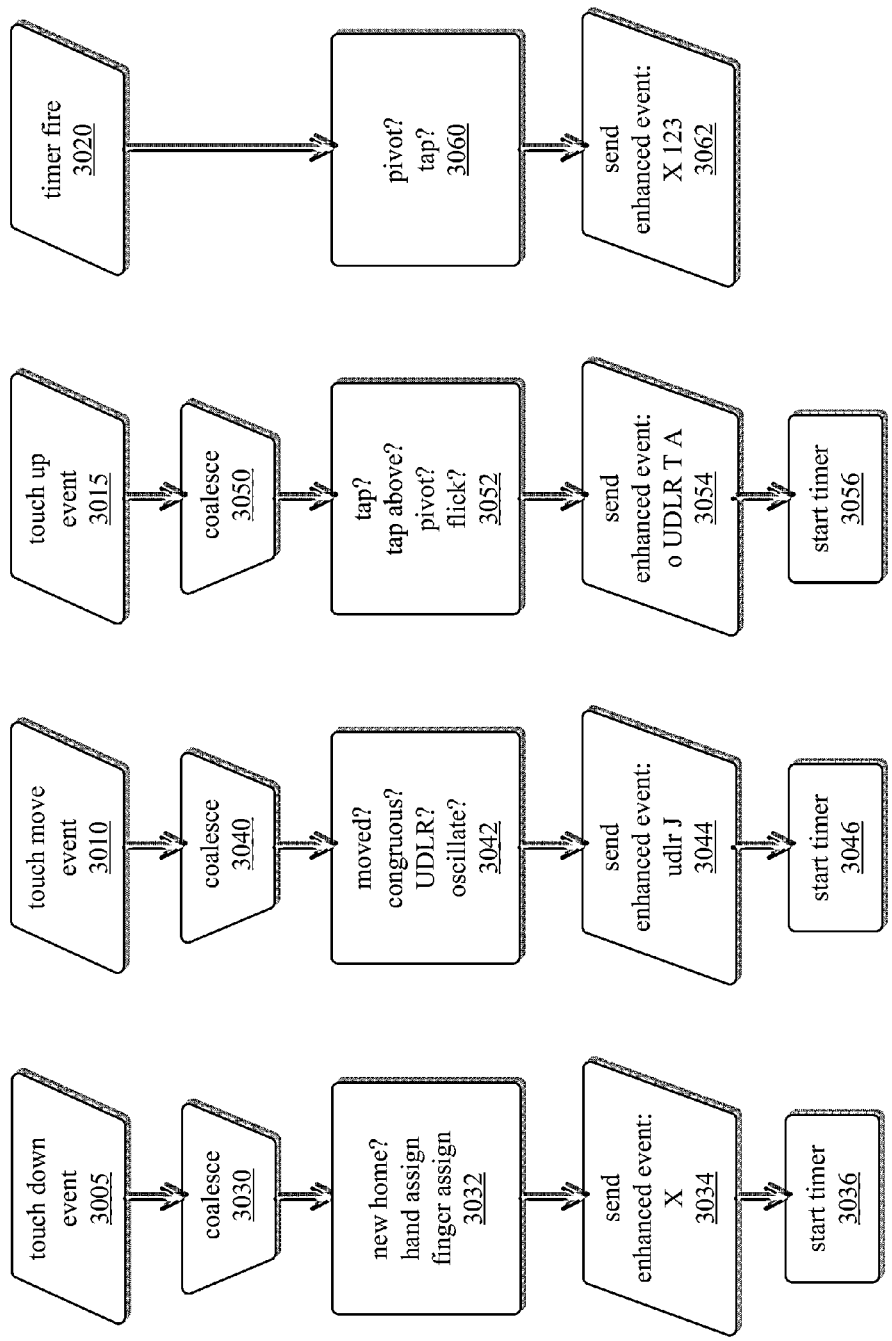
FIG. 30a conceptually illustrates how the TEI engine processes touch events to control the TEI viewer and to generate and issue the enhanced events to the TEI database in order to perform one or more operations.

FIG. 30*a* conceptually illustrates how the TEI engine 2960 processes received touch events (i.e., raw touch inputs) to control the TEI viewer 2980 and to generate and issue the enhanced events 2990 to the TEI database 2970 in order to perform one or more operations. As shown, the touch events intercepted or otherwise obtained by the TEI engine 2960 include: (1) a touch down event 3005, (2) a touch move event 3010, (3) a touch up event 3015, and (4) a timer fire 3020. A touch down event 3005 is input associated with the detection of a new touch. In some embodiments, the touch down event 3005 provides coordinates to identify where the touch occurs relative to a coordinate space of a touch sensitive surface and may provide other values for determining a size of touch (e.g., diameter, circumference, shape, etc.) and pressure as some examples. The touch move event 3010 is input that tracks movement of a previously detected touch down event 3005. In some embodiments, the touch move event 3010 is a series of coordinates, a beginning or end coordinate, or length and angle of deflection as some examples. The touch up event 3015 is input associated with the removal of a previously detected touch down event 3005. In some embodiments, the touch up event 3015 provides coordinates for where the touch was removed. The timer fire 3020 tracks timing relationships of the touch down event 3005 and may also track timing relationships of the other events 3010 and 3015 independently or in conjunction with the timing of the touch down event 3005. In some embodiments, a timer fire 3020 occurs when a touch down event 3005 is retained beyond a particular time threshold.

In response to a touch down event 3005, the TEI engine stores the event 3005 in a buffer and coalesces (at 3030) the touch down event 3005 with other recent touch down events. The grouping of these coalesced events is determined by a maximum allowable time from the timestamp of the first event. In some embodiments, the maximum allowable coalesce time is initially 50 ms, then the time adjusts in response to data accumulated through actual use, and is defined per user. In some embodiments, the maximum allowable coalesce time is monitored to detect reversal of unintended actions and to adjust timings to minimize reoccurrence of such unintended actions. When the coalesce time has expired and the grouping of events has been determined, the TEI engine processes (at 3032) the one or more coalesced events to determine several essential assignments, settings and functionality, including (1) rejecting non-finger touches (e.g., thumb, palm, wrist) when only finger movement is desired, (2) the possible determination of new home positions for the four fingers when there are four fingers touching simultaneously, (3) assignment of touches to the left or right hand, especially after a period of inactivity, and/or dictated by historical user habits, (4) assignment of each touch to a specific finger (e.g., index, middle, ring, little) in accordance with the processes described in the sections below, (5) finger assignment assessment/confirmation based on other sensor data (e.g., hover, proximity, camera), (6) re-assessment of previous finger assignments that were ambiguous, and (7) determination of mode and other states of the TEI system. On completion of the event processing (at 3032), one or more enhanced events are sent (at 3034) to the TEI database, which identifies any matching output actions or other operations to perform. Finally, a timer is started (at 3036) which may be used for further output action invocation and functionality as described below.

In response to a touch move event 3010, the coalesces (at 3040) the event 3010 in a manner similar to the coalescing at 3030. In some embodiments, the coalesce time for touch move events is different from the coalesce time for other event handlers, as is the tracking and ongoing use data analysis that adjusts this duration parameter. Furthermore, in some embodiments, such coalescing is performed independently for each touch, and tracked historically on the basis of finger assignment per user. When the grouping of move events has been determined, the TEI engine processes (at 3042) the event or events to correlate movements and distill them into identifiable gesture components. Specifically, (1) determinations are made between touches that have not substantially moved for a period of time, (2) determine when the movement angles of a series of move events generally correspond with an up, down, left or right direction relative to established home positions and finger assignments, (3) identify when a series of move events from two or more touches generally correspond to each other in some geometrically discernible manner, (4) determine if a back-and-forth oscillating motion is occurring, and if so, with which fingers, and in which directions. The results of the processing (at 3042) enable the TEI engine to send (at 3044) one or more enhanced events to the TEI database, which identifies any matching output actions or other operations to perform. Finally, a timer is started (at 3046) which may be used for further output action invocation and operations as described below.

When a touch is released, a touch up event 3015 is generated (by the OS or other system software) and read by the TEI engine. As with the touch down and move events described above, the up events are coalesced (at 3050) using a time limit that may be dynamically adjusted in response to learned user behavior. The one or more coalesced events are processed (at 3052) to (1) identify if a finger or fingers have performed a tap or double tap, etc., by releasing within a time window without substantial finger movement, (2) identifying when a tap occurred substantially above an expected tap zone, (3) identify when one or more fingers remain substantially without movement while other fingers move or flick or are simply lifted, (4) identify when a touch has been released while substantial movement was occurring, and in a substantially linear direction. The results of the processing (at 3052) allow the TEI engine to send (at 3054) appropriate enhanced events to the TEI database, which identifies any matching output actions or other operations to perform. Next, a timer is started (at 3056) which may be used for further output action invocation and operations as described below.

A timer is started in response to the various events (3005, 3010, and 3015). If the timer is not cancelled by previous events, and thereafter fires, it is registered as a timer fire 3020 by the TEI engine. Such timer firings enable various processing (at 3060) to occur, such as (1) determining that a touch has been substantially held beyond a time duration in one place while other touches have been moved, added, or released, (2) that a tap or partial tap is in progress or has been completed. The results of the processing (at 3060) determine the one or more enhanced events to send (at 3062) to the TEI database, which identifies any matching output actions or other operations to perform.

The enhanced events that are generated by the TEI engine as shown in FIG. 30a (at 3034, 3044, 3054, and 3062), are comprised of status representations for each digit. Each qualifying new touch is assigned to a particular digit, then the status for the new digits is combined with the status of previous touches that were not coalesced in the current grouping of events. For example, in embodiments where four fingers are being tracked, when an essentially simultaneous touch of four fingers occurs, the four events are coalesced (at 3030) and then processed (at 3032), where each touch is assigned to one of four fingers. The status of each of the four fingers is represented in an array of four characters as "xxxx", with "x" representing that a touch is down. This sequential representation is then sent as an enhanced event (at 3034). Though not shown in FIG. 30b, each enhanced event may also include a prefix that identifies the operational mode or submode that the TEI engine is in when an enhanced event is generated. For example, with reference to FIG. 1, an enhanced event ABC1_xxxx represents that each of four fingers is down while in the ABC1 submode of the LOCK operational mode.

Figure 30B:
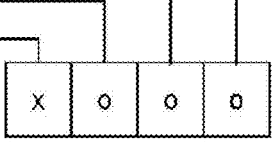
FIG. 30b provides detail regarding the sequential representations and the vocabulary employed to conceptually represent the enhanced events that are generated by the TEI engine.

FIG. 30b provides further detail regarding the sequential representations and the vocabulary that they employ. As can be seen in 3070, the sequential representation mapping depends on which hand has been determined to have effectuated the touches. The status of each of the digits in the sequential representation is updated for each touch event and timer fire that occurs (at A, F, L or R). Fingers that do not change as a result of the processing remain in their current state. To continue the previous example, if the little finger touch is released, but the other touches remain down, the sequential representation changes to "xxxo" (assuming the right hand was used), which will be sent in the enhanced event (at 3054) along with the current mode.

As can be seen in FIG. 30b at 3072, there are a variety of characters that the TEI engine uses when creating enhanced messages. Line 1 of 3072 shows that the lower case "o" character represents a digit that is not in contact with the touch surface, and line 2 shows that the "x"" character represents a digit that is touching, and not moving beyond a distance threshold. An uppercase "A" character represents a touch that occurred above the expected touch area for a digit. Line 4 shows that the uppercase "X" character represents a digit that is touching and has not moved beyond a distance threshold for some period of time. Line 5 shows that the lowercase "u", "d", "l", and "r" characters represent digits that have moved in an essentially up, down, left, or right direction, whereas an uppercase "U", "D", "L", or "R" character represents a digit that has flicked in an essentially up, down, left or right direction, and is no longer in contact with the touch surface. When a digit has performed a tap, a numeral representing the number of sequential taps within a particular time period is designated as shown at line 7. A repeating oscillating motion that meets certain requirements is usually represented as a slide, appended with "_osc" as shown in line 8.

Some examples of gesturally created enhanced event sequences and their timings are given in FIG. 30b. In example 3074, line 1 shows that all touches went down at a zero reference time. Next, at line 2, the "XXXX" sequential representation designates that all four touches have been held at essentially the same coordinate positions beyond a specific duration, which in this case is one second, as shown in the timestamp column on the right. At line 3, "uuuu" designates that the four touches all moved in an essentially upward direction. If the touches continued sliding in an essentially upward direction, further "uuuu" enhanced events would be issued by the TEI engine of some embodiments, and depending on how much movement occurs, there may be many such sequential "uuuu" enhanced events sent. For the sake of clarity and brevity, only one such move event is shown in these examples. Other embodiments designate specific movement distances and directions along with the enhanced events. Next, at line 4, it can be seen that the user moved all four digits in an essentially downward direction, and then, at line 5, back up again. The user released all digits about 12 seconds after the first touches, as can be seen in line 7.

In the particular gestural sequence just described (at 3074) in a four-touch TEI system embodiment, the initial four finger touch was held for a period of time, which invokes the TEI viewer. The TEI viewer then interactively displays all available options until it is dismissed. The TEI viewer is resized to a larger size at line 3, then a smaller size at line 4, then finally brought up to the final size at line 5. Releasing all fingers at line 7 causes the TEI viewer to be dismissed.

Figure 30C:
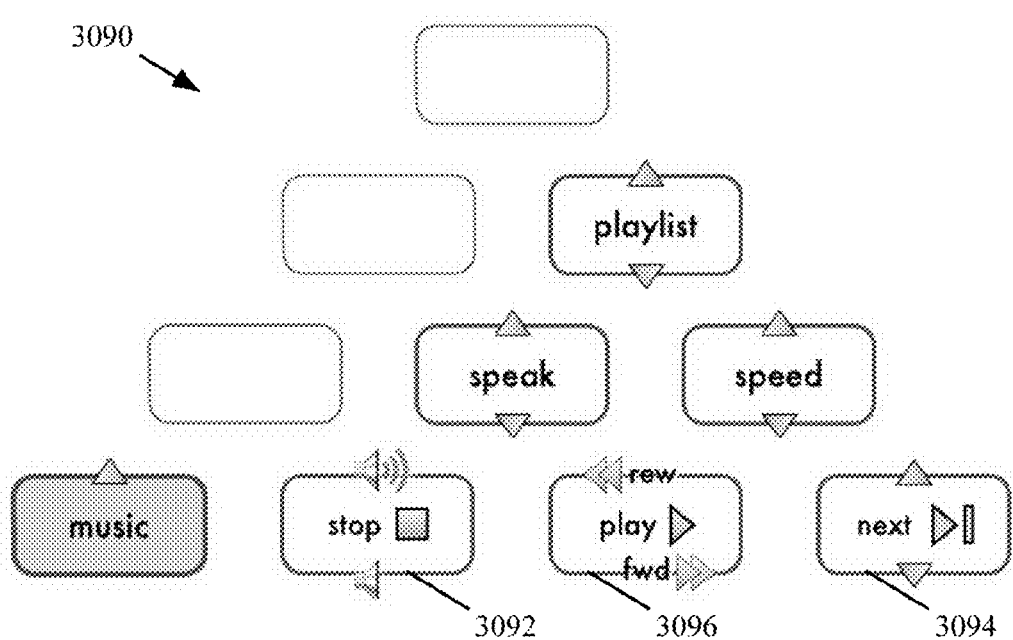
FIG. 30c illustrates performing various operations presented in a TEI viewer based on enhanced events that are generated by the TEI engine.

The next example (at 3076) demonstrates a gesture sequence which controls a media application such as a music or video player. As can be seen in line 1, a four finger touch occurred, followed by the release of all but the index finger at line 2. This is an example of a partial release gesture, which starts with four fingers down (in a 4-finger embodiment), followed by the release of one or more fingers, while retaining the touch of at least one finger. This allows a particular hold sub-mode to be entered without waiting for a particular hold time. Because the user wishes to see the TEI viewer for reference, the index finger was held beyond a time duration as shown in line 3, which invokes the TEI viewer 3090 as shown in FIG. 30c. The user can now visualize the various taps, slides and flicks that the remaining finger combinations will perform while in this media player context. Lines 4 through 6 represent the user tapping the ring finger while continuing to hold the index finger down. The touch down of the ring finger, indicated on line 4, while continuing the hold of the index finger down causes the media player to start playing (i.e., invoke the operation that is identified by symbol 3096). Note that in line 6 a tap status was included in the enhanced event sent by the TEI engine. In this context of the media player application, the TEI database did not identify any matching output actions, so it was ignored. Next, at line 7, the user slid the middle finger down, which lowered the volume by an amount commensurate with the number and speed of downward slide enhanced event messages received. As can be seen with reference to the TEI viewer 3090 symbol 3092, the middle finger touch can be used to stop the media player application with a tap, increase volume with either a slide or flick up, and decrease volume with either a slide or flick down. In line 9, the user taps the little finger, which causes the player to advance to the next track (i.e., invoke the operation that is identified by symbol 3094). The user then wishes to turns the volume up substantially, and does so by flicking the middle finger in an upward direction two times at lines 12 and 14, and then sliding the same finger up and then down in lines 16 and 17 for a final precise volume setting. Finally, the user releases the index finger at line 19, which dismisses the TEI viewer 3090.

After the user has controlled the media player application of their device in this manner multiple times, they will eventually not need to consult the TEI viewer. Referring back to the example at line 3 of 3076, the step of holding the touch to invoke the TEI viewer may be eliminated, which speeds operation. In fact, a key advantage of omni-gesture sequences is the speed of operation and the benefit of the user not needing to look at the display after muscle memory is established. Gesture sequences can begin at any position on the touch surface, and at any angle. In fact, some embodiments of the TEI engine exist on devices with no display at all. Another key advantage is that frequently used commands can be issued in the background, without first exiting a frontmost application and navigating multiple layers of UI.

Gestural Sequences can also be used to enter passwords as described above with reference to section F entitled "Password Entry". When the OS of the device requests a password, this is a modal state, so the gestural sequence can be immediately invoked from the OFF state, without requiring any other preliminary taps or holds. Line 1 of 3078 shows that the user started the authentication gesture with two fingers sliding in a primarily downward direction as shown on line 2. Next, the rightmost finger is released at line 3, and the remaining single finger slides left at line 4. This is followed by a downward flick at line 5, which releases all touches. It is important to note that this gesture could have been performed by the index and middle fingers, middle and ring fingers, or ring and little fingers. The TEI system accounts for this possibility because there were only two fingers touching simultaneously in this example. A graphic depiction of this gesture can be seen in FIG. 15*b* above.

A different kind of authentication gesture is shown in 3080 which requires the additional timing criterion of some embodiments of the TEI engine. In this example, the timing of the touches is taken into consideration, such that a correct entry must substantially conform to the timing of the original authentication gesture sequence. In lines 1 through 3 of 3080, a single digit is flicked in a downward direction, followed by two quick taps of the next finger to the right (lines 4 and 6), followed at line 8 by a downward flick of the next finger to the right.

Because this example employed three distinct touches, which could have been performed by the index/middle/ring, or the middle/ring/little fingers, the TEI system as in the above example, accounts for this possibility. Unlike the touch assignment described in subsection "iii. Touch Assignment" below, password finger assignment is less stringent. As the authentication gesture sequence is performed, any simultaneous processing occurs so that any acceptable finger combination will be accepted as valid.

An example of a hold and pivot gesture sequence is depicted at 3082. This gesture selects several sentences and then speaks the selected text. At line 1, the user rests the index finger on the touch surface and holds it there without substantial movement for about one second as shown in line 2, which invokes the TEI viewer. While retaining the index finger in place, the user at line 3 flicks the middle finger in a downward direction, which causes several sentences to be selected, based on the velocity of the flick. At line 5, a downward slide adds a few more sentences to arrive at the precise selection desired. Then, at line 8, an essentially simultaneous tap of the middle and ring fingers invokes the text-to-speech function of the OS. At this point, the user releases the index finger, and the TEI viewer is dismissed.

A final example of a gestural sequence is given at 3084. In this sequence, the user is entering the text "dog" into the frontmost text field. As discussed previously, an upward flick performed at line 2 enters the ABC submode of the LOCK mode. Then, on line 3, an index finger rightward flick types the "d" character, followed by the "o" character at line 5 and the "g" character at line 8. To dismiss the TEI viewer, a four-finger downward flick is issued at line 10.

As one skilled in the art would recognize in light of the present disclosure, alternate representations and/or classifications may be used to obtain functionally similar operation, however the essential mechanism and process and GUI embodiments herein described, which distill raw gesture data into component sequences that trigger output actions, is the work intended to be protected by the present invention.

i. Finger Positioning Criteria

Prior to establishing home positions from a four finger touch, the TEI engine determines whether the four finger touch satisfies a set of finger positioning criteria. The finger positioning criteria is used to determine whether the four finger touch is a valid four finger touch. Such valid four finger touches may be at any rotation relative to the actual device. A valid four finger touch includes four touches that are linearly spaced within acceptable ranges, and whose perpendicular axis offset between touches is within an acceptable range, where such ranges correspond with hand and finger geometric analysis data. It should be noted that in other embodiments, thumb, palm, and multi-hand analysis is used to establish valid home positions.

One example of an invalid four finger touch includes a four finger touch where the touches are in a rectangular configuration. The TEI engine ignores this invalid touch in some embodiments, and the TEI system remains in the OFF state or reverts from the NEW state back to the OFF state. The TEI engine also does not update the home positions based on the invalid four finger touch.

One example of a valid four finger touch is when the index finger of the right hand produces an x-coordinate that is less than the x-coordinate produced by the middle finger of the right hand; the middle finger of the right hand produces an x-coordinate that is less than the x-coordinate produced by the ring finger of the right hand; the ring finger of the right hand produces an x-coordinate that is less than the x-coordinate produced by the little finger of the right hand; the index finger of the right hand produces a y-coordinate that is less than the y-coordinate produced by the middle finger of the right hand; the middle finger of the right hand produces a y-coordinate that is greater than the y-coordinate produced by the ring finger of the right hand; and the ring finger of the right hand produces a y-coordinate that is greater than the y-coordinate produced by the little finger of the right hand. In some embodiments, additional algorithms and/or multiple calculations are employed to determine if a user has shifted rotational hand position relative to the device.

When a four finger touch satisfies certain finger positioning criteria, the TEI engine makes a determination as to whether the left hand or right hand was used to issue the four finger touch. Specifically, from the x-y coordinates of the four finger touch, the TEI engine calculates relative offsets and determines which hand was used to issue the touch according to hand and finger geometric analysis data, as well as past historical usage data, and the operation of the TEI system is configured accordingly (as in FIG. 15*a* above).

ii. Establishing Home Positions

In some embodiments, the TEI engine establishes a home position for each of the index, middle, ring, and little fingers whenever four essentially simultaneous touches are registered as a valid four finger touch. The home positions are retained in memory until a new valid four essentially simultaneous touches are performed. As will become evident from the discussion below, the home positions are used in determining which finger is assigned to each touch.

Upon receiving a valid four finger touch from which home positions can be established, the TEI system determines (i) a center point of the four finger touch and (ii) offsets of each touch from the center point. The center point is a single point of a mathematical model which tracks movement of the user's hand in order to keep the home positions aligned with the user's hand as new touches are added and existing touches are moved. The TEI system derives the home positions based on the offsets from the current center point position. Each of four offsets from the current center point position establishes a home position for a particular touch of the index, middle, ring, and little fingers. Accordingly, the center point is a single point from which individual digit proximities can be derived when analyzing new touches, and by which existing touches that move can bias the center point so it can be used as a basis for future calculations. New touches within certain ranges and time constraints can also bias the center point. In some embodiments, lateral finger movement is mapped per finger according to an anatomical geometric model which describes arcs rather than straight lines to track the natural motion of the hand. For example, the index finger of the right hand as it slides to the left will arc downward to a greater degree than the other fingers which would be more horizontal.

Figure 31:
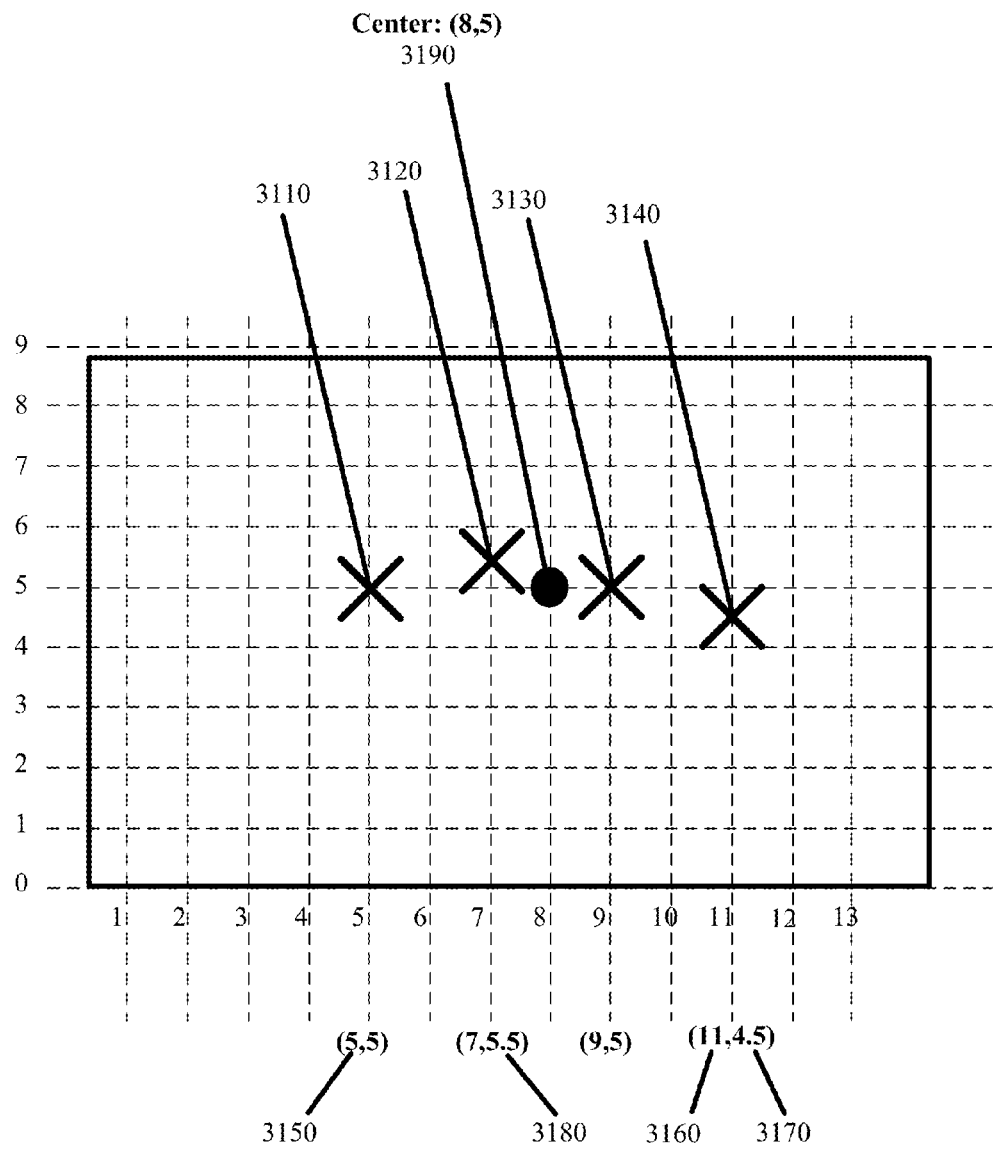
FIG. 31 illustrates determining the center point from a four finger touch of the right hand in accordance with some embodiments.

FIG. 31 illustrates determining the center point 3190 from a four finger touch 3110, 3120, 3130, and 3140 of the right hand in accordance with some embodiments. As shown, the touch surface is mapped to an x-y coordinate space. Each touch 3110-3140 produces a specific x-y coordinate in the x-y coordinate space.

To find the center x-coordinate, the TEI engine computes the midpoint for the smallest x-coordinate (i.e., 3150) and the largest x-coordinate (i.e., 3160). To find the center y-coordinate, the TEI engine computes the midpoint for the smallest y-coordinate (i.e., 3170) and the largest y-coordinate (i.e., 3180). The center point 3190 is then derived from the center x-coordinate and the center y-coordinate.

In some embodiments, tracking the movement of the user's hand involves tracking additional geometric cues of the user's hand in addition to the four touches. For example, by tracking the position of the palm relative to the fingers, the TEI engine is better able to align the home positions with the user's hand. In some embodiments, a trackpad or other sensing hardware can be used by the TEI engine to monitor a user's hand, finger, and palm positions even when no touches are directly applied to the touch surface of the trackpad or other sensing hardware. Specifically, the sensing capabilities of the trackpad or other sensing hardware can be enhanced to identify a user's hand proximity as it hovers over the touch surface. It should be noted that the accuracy of this proximity does not necessarily need to be precise in order to still provide cues to the TEI system, so that it can update its mathematical model and increase the accuracy of new touch finger assignments.

After computing the center point 3190, the TEI engine computes the deltas or offsets (D) for each touch relative to the center point 3190. The delta for a particular touch (P) is computed by subtracting the x-y coordinates of the center point (C) from the x-y coordinates of the particular touch:

$$D \cdot x = P \cdot x - C \cdot x \quad (1)$$

$$D \cdot y = P \cdot y - C \cdot y \quad (2)$$

Figure 32:
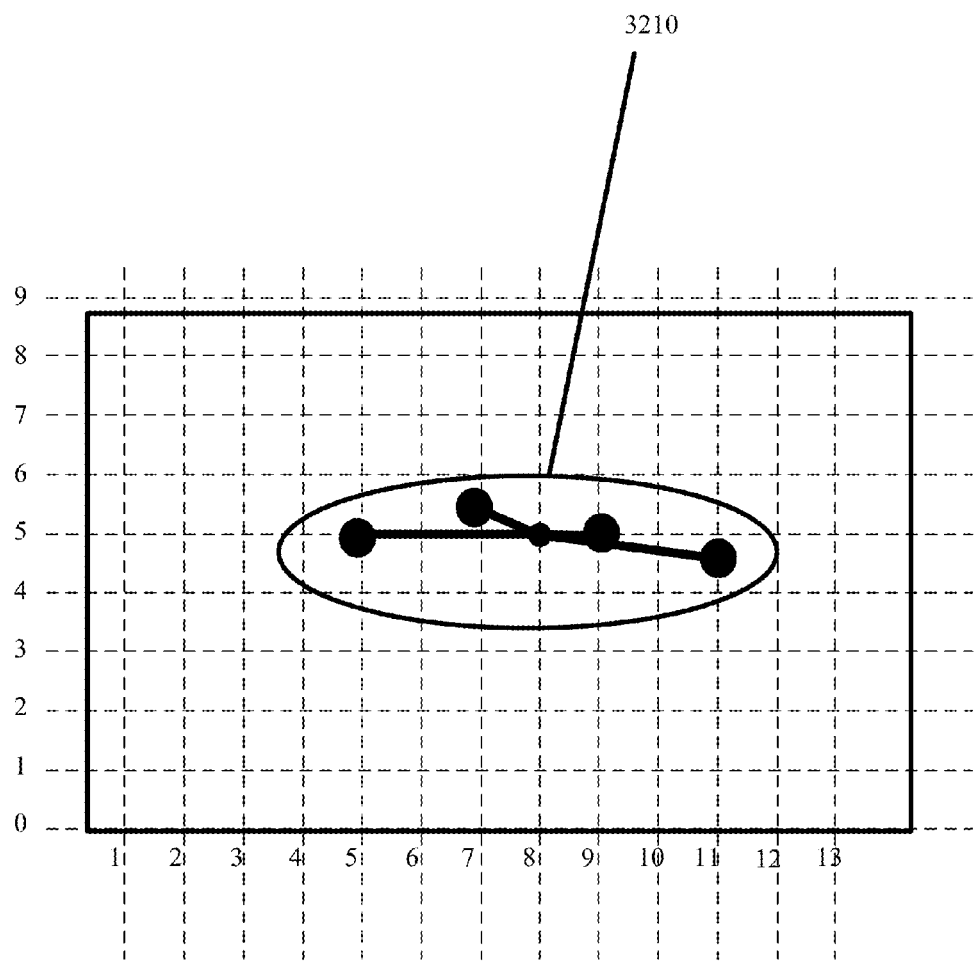
FIG. 32 illustrates the home positions for the four finger touch of FIG. 31.

Once the x-y deltas for each touch are computed, the mathematical model is established and predictive zones for each home position can be calculated. Subsequent slides and new touches iteratively bias the mathematical model in order to increase new finger touch assignment accuracy. In some embodiments, the home positions are established from the initial touch x-y coordinates of a four finger touch as indicated by the begin state in the events that are received from the system software. FIG. 32 illustrates the home positions 3210 for the four finger touch of FIG. 31.

iii. Touch Assignment

Once the TEI system is in a particular LOCK sub-mode or HOLD sub-mode, touches of different finger combinations can be used to perform different operations. For example, an upward flick of the index finger performs a different operation than an upward flick of the middle finger. Accordingly, the TEI engine includes various methods for determining whether a detected touch should be assigned to control operations that are associated with the index finger, middle finger, ring finger, or little finger. In some embodiments, these methods include: a) proximity assignment, b) shift assignment, or c) release assignment. It should be noted that in some embodiments, various combinations of these assignment techniques are employed, and such variations may change based on a variety of factors including the current operating mode or sub-mode, timing data, historical data, etc.

a. Proximity Assignment

Proximity assignment involves comparing the x-y coordinates of a detected touch to the x-y coordinates of previously established home positions in order to determine which finger is activating which touch. The detected touch is assigned to control operations that are associated with whichever finger's home position is closest to the detected touch. Since two different detected touches can both be closest to a particular home position, the TEI engine performs the proximity assignment process in two passes as described below in FIG. 33.

Figure 33:
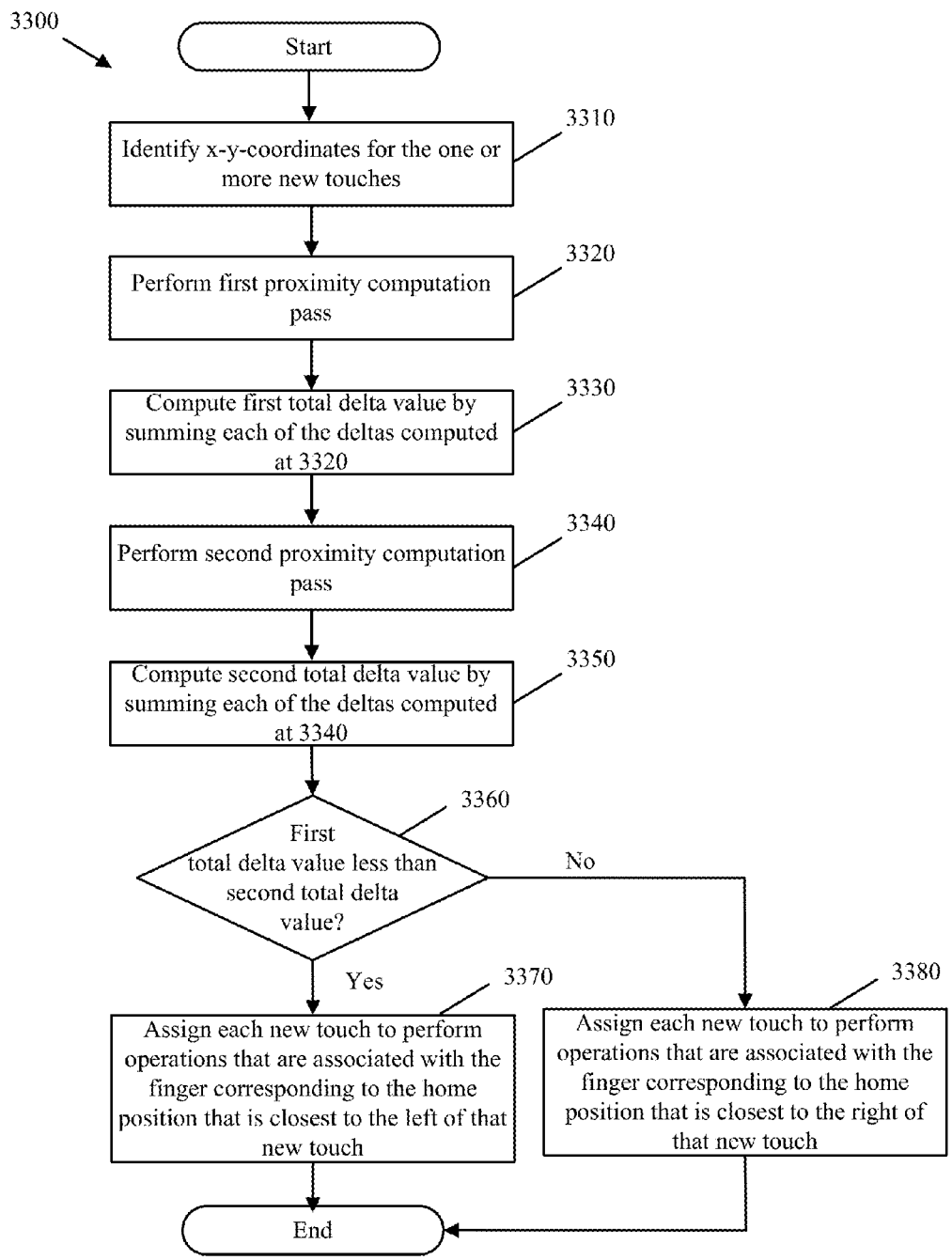
FIG. 33 presents a proximity assignment process performed by the TEI engine to determine which touch corresponds with which finger in accordance with some embodiments.

FIG. 33 presents a proximity assignment process 3300 performed by the TEI engine to determine which touch corresponds with which finger in accordance with some embodiments. The process begins when one or more touches are newly detected. More specifically, the process 3300 is performed when the TEI engine receives from the system software one or more touch events that specify the began state. In some embodiments, the TEI system buffers the touch events so that essentially simultaneous touch events are interpreted at the same time as a single issued touch combination.

The process identifies (at 3310) the x-y coordinates for the one or more new touches. The process performs (at 3320) a first proximity computation pass. For the first proximity computation pass, the process (i) identifies which previously established home position is closest to the left of each newly detected touch and (ii) computes a delta or distance between the x-y coordinate for each newly detected touch and the x-y coordinate for the home position that is closest to the left of that newly detected touch. The delta can be computed by the sum of the difference in the x coordinate position of the touch and the home position and the difference in the y coordinate position of the touch and home position. The delta can also be computed based on the square root of the sum of the squares for the x-y coordinates of the touch and the home position. The process sums each of the deltas computed at step 3320 to compute (at 3330) a first total delta value. The process then performs (at 3340) a second proximity computation pass. For the second proximity computation pass, the process (i) identifies which previously established home position is closest to the right of each newly detected touch and (ii) computes a delta between the x-y coordinate for each newly detected touch and the x-y coordinate for the home position that is closest to the right of that newly detected touch. The process computes (at 3350) a second total delta value by summing each of the deltas computed at step 3340.

The process compares (at 3360) the first total delta value to the second total delta value to identify the lowest total delta value. This comparison determines how the TEI engine will assign the newly detected touches. A conceptual illustration of the assignment process is presented in FIG. 34 below. When the first total delta value is less than the second total delta value, the process assigns (at 3370) each newly detected touch to perform operations that are associated with the finger corresponding to the home position that is closest to the left of that newly detected touch and when the second total delta value is less than the first total delta value, the process assigns (at 3380) each newly detected touch to perform operations that are associated with the finger corresponding to the home position that is closest to the right of that newly detected touch.

Figure 34:
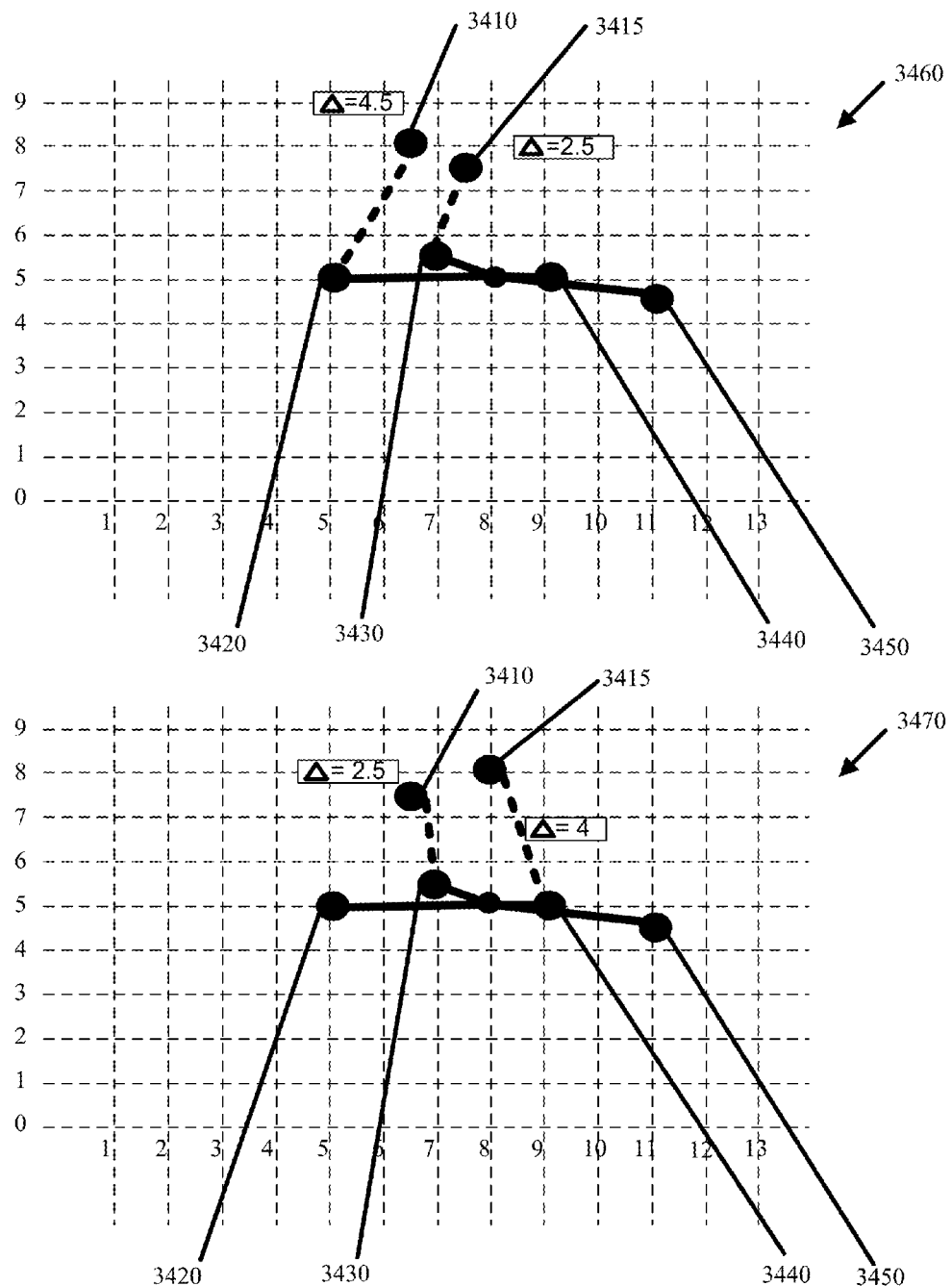
FIG. 34 conceptually illustrates using the above described proximity computations to identify which finger is assigned to which touch in accordance with some embodiments.

FIG. 34 conceptually illustrates using the above described proximity computations to identify which finger is assigned to which touch in accordance with some embodiments. In this figure, the user has previously defined the home positions with a four finger touch. The home positions include a home position for the index finger 3420, a home position for the middle finger 3430, a home position for the ring finger 3440, and a home position for the little finger 3450. The user then issues a pair of new touches 3410 and 3415.

Per process 3300, the TEI engine identifies the x-y coordinates for each of the newly detected touches 3410 and 3415. The TEI engine then performs the two pass proximity computations. The first pass proximity computation is shown by 3460 and the second pass proximity computation is shown by 3470.

For the first pass proximity computation (3460), the TEI engine (i) computes the delta between the newly detected touch 3410 and the established home position for the index finger 3420 that is closest to the left of the touch 3410 and (ii) computes the delta between the newly detected touch 3415 and the established home position for the middle finger 3430 that is closest to the left of the touch 3415. A total delta value of 7.0 results from the first pass proximity computation.

For the second pass proximity computation (3470), the TEI engine (i) computes the delta between the newly detected touch 3410 and the established home position for the middle finger 3430 that is closest to the right of the touch 3410 and (ii) computes the delta between the newly detected touch 3415 and the established home position for the ring finger 3440 that is closest to the right of the touch 3415. A total delta value of 6.5 results from the second pass proximity computation.

The total delta value from the second pass proximity computation is less than the total delta value from the first pass proximity computation. Accordingly, the TEI engine assigns the newly detected touches 3410 and 3415 based on the home positions that are closest to the right of those touches 3410 and 3415. In this figure, the home position for the middle finger 3430 is the closest home position to the right of the touch 3410 and therefore the TEI engine assigns the touch 3410 to perform operations that are assigned to the middle finger. Similarly, the home position for the ring finger 3440 is the closest home position to the right of the touch 3415 and therefore the TEI engine assigns the touch 3415 to perform operations that are assigned to the ring finger.

The two pass proximity computation of FIG. 34 eliminates the assignment ambiguity that could otherwise occur when two distinct touches are both closest to a single home position. The proximity computations also allow users to perform touches, taps, holds, slides, or flicks without initially touching directly at the home positions. In this manner, some variance is provided with which to initiate a touch, tap, hold, slide, or flick.

In some embodiments, the touch assignment is performed up to a certain distance limit. When the maximum distance for the touch to any of the home positions exceeds the distance limit, the touch is out of range and does not get assigned to control operations of any particular finger. In response, the TEI engine may switch operational modes or ignore the touch. So long as a new touch is within a maximum distance limit of at least one home position, that touch will be assigned to control operations for the finger of the closest home position.

In some embodiments, each of the home positions specifies the same maximum distance limit. In some other embodiments, each of the home positions specifies a different maximum distance limit.

Figure 35:
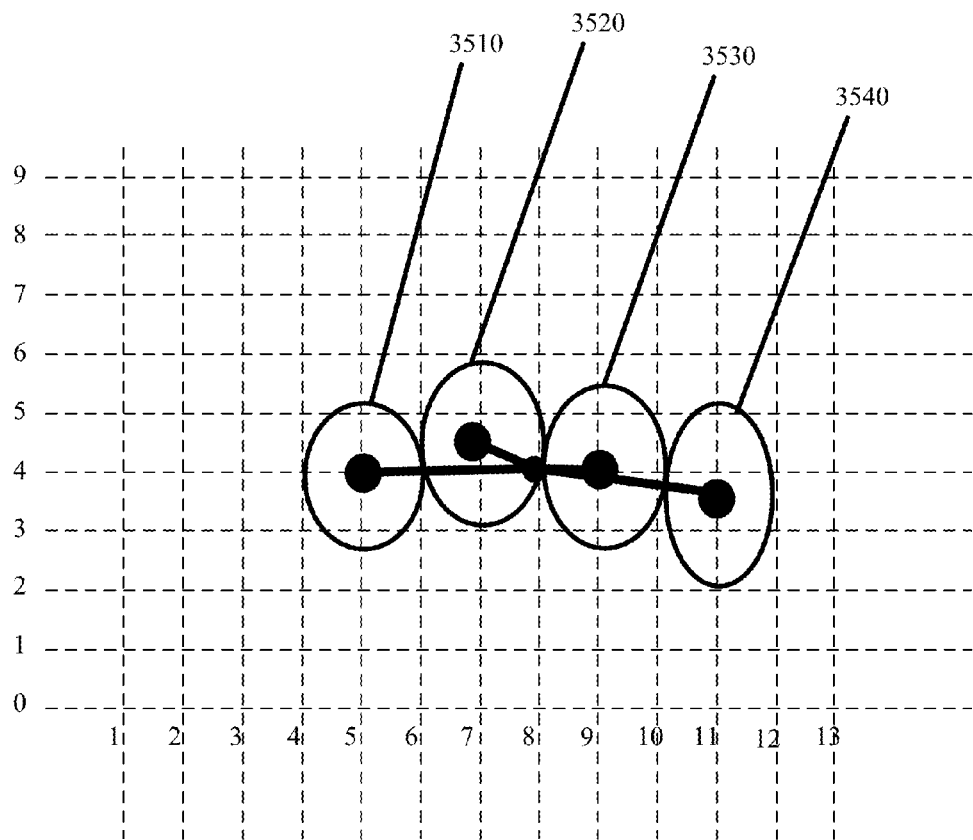
FIG. 35 conceptually illustrates coordinate range for the index finger home position, coordinate range for the middle finger home position, coordinate range for the ring finger home position, and coordinate range for the little finger home position.

The maximum distance limit(s) define(s) coordinate ranges within which a user can establish a new touch for each finger. FIG. 35 conceptually illustrates coordinate range 3510 for the index finger home position, coordinate range 3520 for the middle finger home position, coordinate range 3530 for the ring finger home position, and coordinate range 3540 for the little finger home position. As shown, each of the coordinate ranges is represented by an oval. However, in some embodiments, each of the coordinate ranges may be circular, rectangular, or irregular in shape. Whenever a touch occurs within the coordinate range 3510, that touch can be used to perform operations that are associated with the index finger. Similarly, whenever a touch and hold occurs within the coordinate range 3540, that touch and hold can cause the TEI engine to enter a particular HOLD sub-mode that provides access to a specific set of operations that is accessible by holding the little finger.

Figure 36:
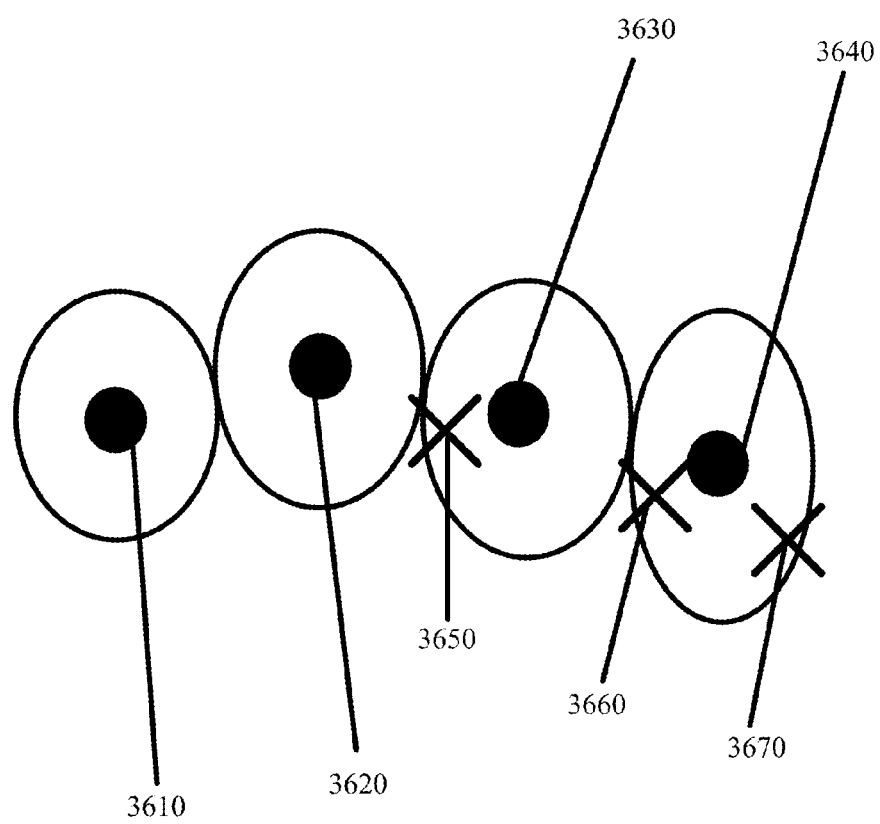
FIG. 36 illustrates a touch reassignment being performed based on the maximum distance threshold.

In some embodiments the maximum distance limit is used to refine the two pass proximity computations described above. Specifically, when an outlying detected touch is not nearest to any home position, but that touch is still detected within a maximum distance limit of an outermost home position (i.e., index finger home position or little finger home position), then the TEI engine may perform a touch reassignment so that the detected touch is assigned to control operations associated with the outermost home position and the other touches are shifted to control operations of the next adjacent home position. FIG. 36 illustrates a touch reassignment being performed based on the maximum distance limit.

The figure illustrates a previously established index finger home position 3610, middle finger home position 3620, ring finger home position 3630, and little finger home position 3640. Additionally, three new touches 3650, 3660, and 3670 are detected. Touch 3650 is closest to the ring finger home position 3630, touch 3660 is closest to the little finger home position 3640, and touch 3670 is within the maximum distance limit of the little finger home position 3640 but is not nearest to that home position 3640 because of touch 3660. The TEI engine detects the outlying touch 3670 and adjusts the touch assignment such that touch 3650 is reassigned to control operations that are associated with the middle finger, touch 3660 is reassigned to control operations that are associated with the ring finger, and touch 3670 is assigned to control operations that are associated with the little finger. It should be noted that if touch 3670 is not within the maximum distance limit of the little finger home position 3640, then touch 3670 would be ignored and no touch reassignment would occur.

Figure 37:
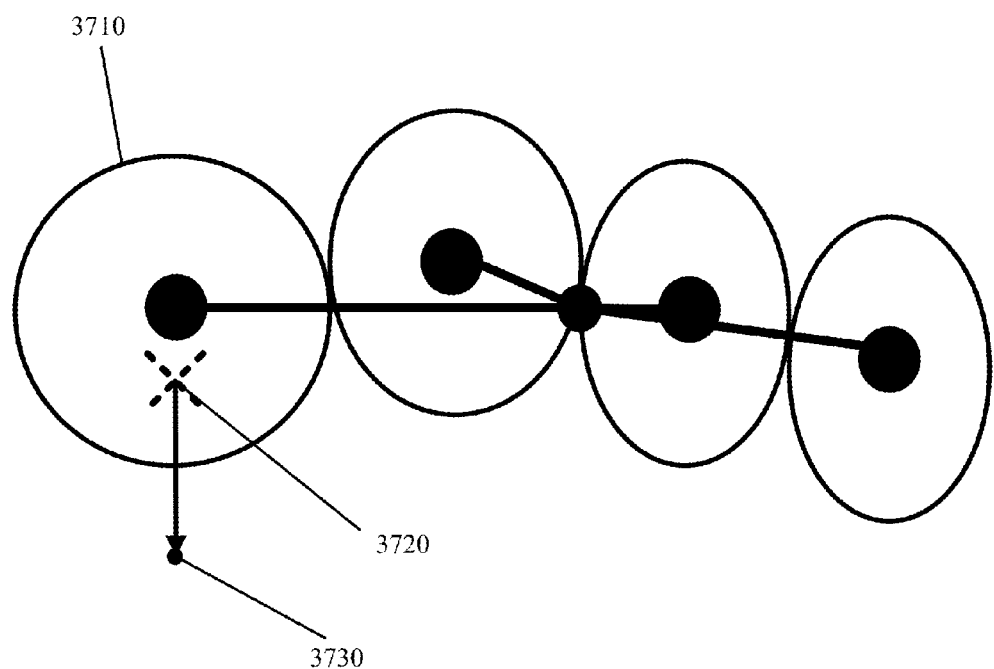
FIG. 37 illustrates a valid flick that is initiated within the coordinate range for an index finger home position in accordance with some embodiments.

In some embodiments, for a slide or flick to be valid, the slide or flick must be initiated within a particular touch coordinate range. FIG. 37 illustrates a valid flick that is initiated within the coordinate range for an index finger home position in accordance with some embodiments. In this figure, the maximum distance limit for the index finger home position is represented by the coordinate range 3710. When a touch is initiated within the coordinate range 3710, that touch is assigned and can be used to perform operations that are associated with the index finger.

In this figure, a user initiates a touch 3720 within coordinate range 3710. The touch 3720 is then moved downward to begin a flick. The movement continues downward outside the coordinate range 3710 to a position 3730 before it is released in order to complete the flick. Since the flick was initiated with a touch that occurred within the coordinate range 3710, the flick is registered as a valid flick of the index finger irrespective of whether the flick was completed outside the coordinate range 3710.

b. Shift Assignment

In some embodiments, the TEI engine performs the proximity assignment based on home positions that were established at some prior interval of time. When the interval of time expires and a new set of home positions has not been established, the TEI engine considers the home positions to be unreliable. In such cases, the TEI engine does not utilize the above described proximity assignment method. Instead, the TEI engine utilizes the shift assignment method described below.

In some embodiments, the shift assignment method includes a setting that specifies a default left or right-handed operation of the TEI system. In either left or right-handed operation, a single touch is assigned to control operations that are associated with the index finger irrespective of where the touch is issued on a trackpad or touchscreen. However when the right-handed operation setting is specified and multiple touches are detected, the leftmost touch of at least two touches is assigned to control operations that are associated with the index finger. When the left-handed operation setting is specified and multiple touches are detected, the rightmost touch of at least two touches is assigned to control operations that are associated with the touch of the index finger.

In some embodiments, a user can on-the-fly change the number of touches that are used and the TEI engine automatically reassigns the touches to different fingers when appropriate. For example, when the right-handed setting is specified and a second touch is added to the right of a first touch that is assigned to control operations associated with the index finger, the first touch continues to control operations associated with the index finger as the first touch is still the leftmost touch, and the second touch is assigned to control operations that are associated with the middle finger. However when the right-handed setting is specified and a second touch is added to the left of a first touch that is assigned to control operations associated with the index finger, then the first touch is reassigned from the index finger to the middle finger. This reassignment occurs since the first touch is no longer the leftmost touch for right-handed operation. Instead, the newly added second touch is the leftmost touch and therefore the TEI engine assigns the second touch to control operations that are associated with the index finger.

When the user removes a touch, some embodiments retain the last touch assignment for any remaining touches. As an example, when there are three touches and right-handed operation is specified, the leftmost touch or first touch is used to control operations that are associated with the index finger, the next adjacent touch or second touch is used to control operations that are associated with the middle finger, and so on. When the leftmost touch is removed, the second and third touches are not reassigned. The remaining touches continue to control operations as before. Accordingly, the second touch that is now the leftmost touch continues to control operations that are associated with the middle finger. In some such embodiments, the touches are reassigned only when all touches are removed and a new set of touches subsequently applied.

c. Release Assignment

Users can also operate the TEI system by performing an initial four finger touch then releasing some but not all of the touches while retaining other touches. In some such embodiments, the TEI engine assigns each of the touches of the initial four finger touch to a particular finger. Then, when some of the touches are subsequently released, the TEI engine retains the assignment for those touches that were not released. The assignment is used so long as at least one of the touches is retained.

iv. Directional Identification for Operations

In some embodiments, when generating an enhanced event to pass to the TEI database, the TEI engine identifies one of four directions in which a slide or flick is performed. The TEI engine determines the direction of a slide or flick by analyzing the received events that are associated with a touch in order to (i) compute an angle and an amount of deflection associated with a touch that is being moved and (ii) identify completion of the movement in order to distinguish a flick from a slide.

Specifically, to identify a directional flick, the TEI engine analyzes the received events to determine (i) that an end event for a particular touch is received and (ii) that the distance that the particular touch traveled within a particular time range exceeds a particular distance range. To compute the distance traveled, the TEI engine maintains a queue of x-y coordinates from the received events for that particular touch. When the flick is complete (end event is received), the TEI engine examines a stored set of x-y coordinates from the queue in order to compute the angle and the deflection for that flick. Specifically, the queue stores x-y coordinates from a begin event and various move events that were received for that particular touch. From the computed angle, the TEI engine determines whether the flick occurred up, down, left, or right. When the computed angle is between 45 and 135 degrees, the TEI engine determines that the flick was performed in the up direction; when the computed angle is between 135 and 225 degrees, the TEI engine determines that the flick was performed in the left direction; when the computed angle is between 225 and 315 degrees, the TEI engine determines that the flick was performed in the down direction; and when the computed angle is between 315 and 45 degrees, the TEI engine determines that the flick was performed in the right direction.

Figure 38:
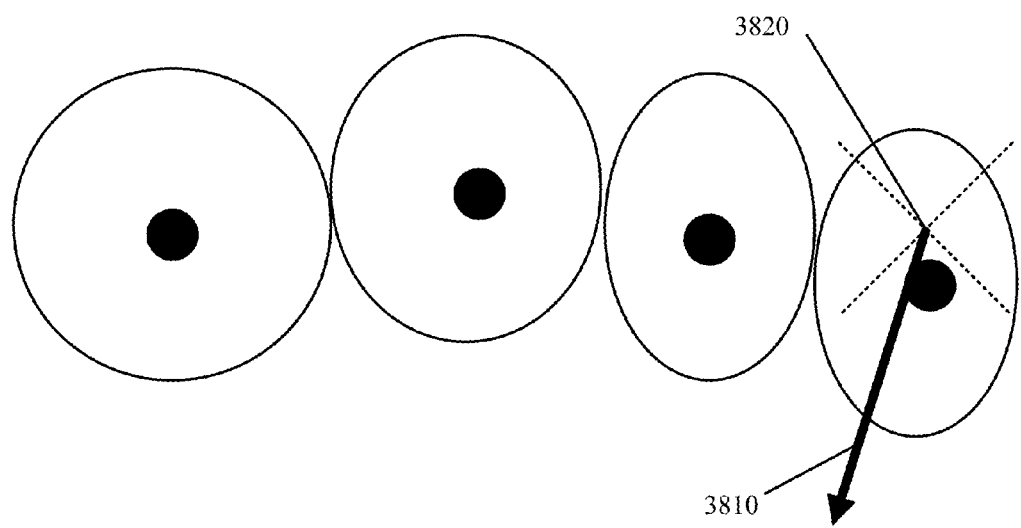
FIG. 38 conceptually illustrates identifying a direction of a flick in accordance with some embodiments.

FIG. 38 conceptually illustrates identifying a direction of a flick in accordance with some embodiments. In this figure, a flick 3810 is performed. Flick 3810 is initiated at position 3820. From position 3820, the TEI engine computes the angle of the flick 3810. From the computed angle, the TEI engine determines that the flick 3810 was performed in a downward direction. To better illustrate the direction of the flick 3810, the starting position 3820 of flick 3810 is recognized as the center point of 90 degree quadrants that are offset from vertical by 45 degrees, where each quadrant identifies a direction. As shown, the flick 3810 falls within the quadrant that identifies the downward direction.

v. Directional Identification for Symbol Expansion

When performing topmost symbol expansion, the TEI system needs to accurately identify the angle and amount of deflection of a slide in order for the TEI viewer to properly enlarge or shrink various expanded symbols. Depending on the angle, the TEI engine determines which one or more symbols to enlarge or shrink, and depending on the amount of deflection, the TEI engine determines how much to enlarge or shrink the symbols.

The TEI system determines which symbol to expand and the degree of expansion according to a four range partitioning of the coordinate space in which a slide occurs. As with flick directional determination, the four range partitioning is based on a starting position of the slide. In some embodiments, the partitioning is performed relative to the position of the touch sensing input device such that the up direction points to a common position on the touch sensing device even when the device is slightly rotated. In some other embodiments, the partitioning is performed relative to an internal compass in the device such that the up direction points to the same position in space irrespective of the rotation of the device.

Figure 39A:
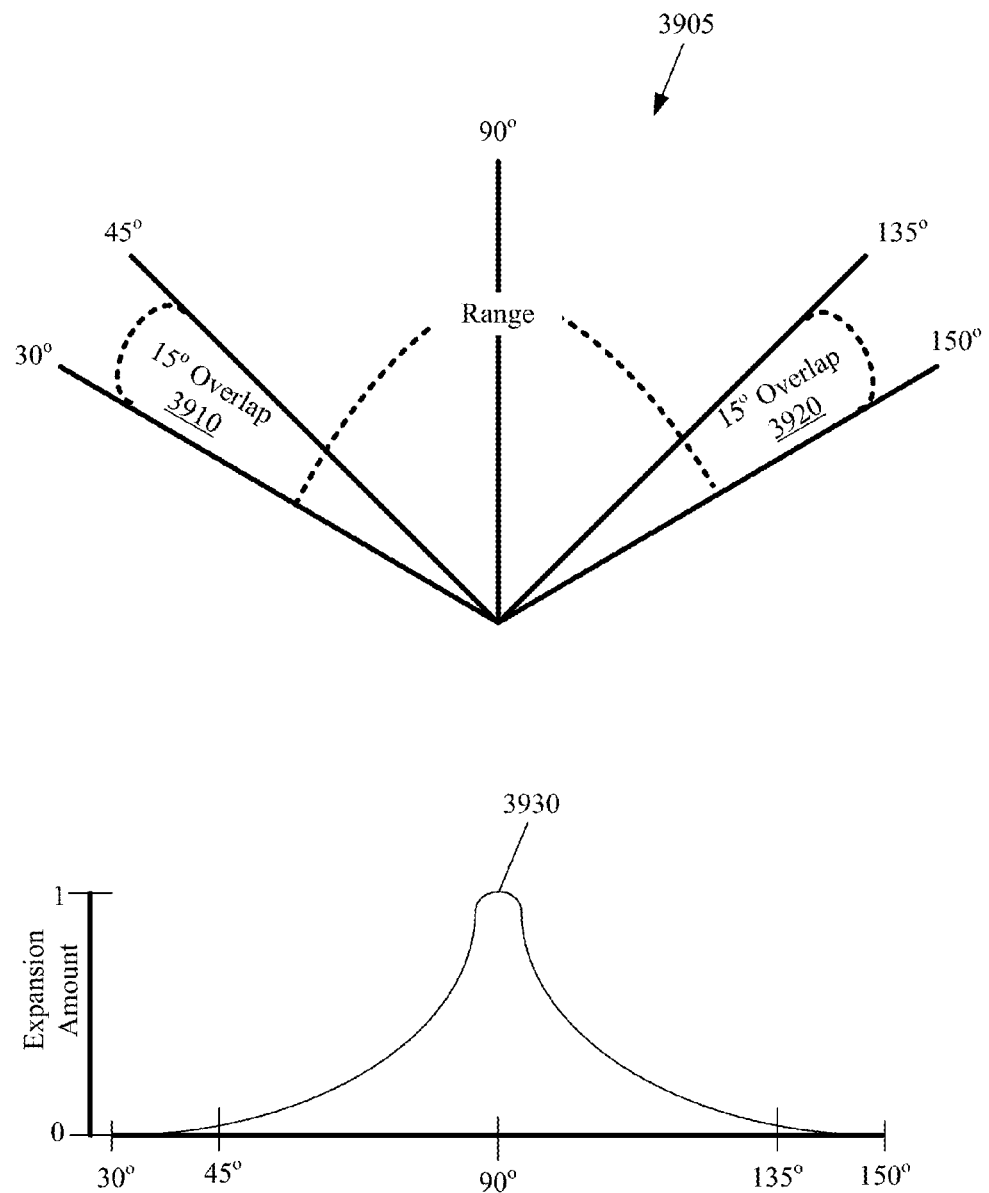
FIGS. 39a and 39b conceptually illustrates determining which symbols in an expanded set of symbols to enlarge or shrink based on a computed angle of a slide.

FIG. 39a illustrates one such range 3905 of the four range partitioning used by the TEI system for symbol expansion. The range 3905 is a 120° range that begins at 35° and ends at 150°. 15° at either end of the range 3905 overlaps with a neighboring range of the four range partitioning. The TEI system defines a transfer function 3930 over the range 3905. The transfer function 3930 determines the amount with which to enlarge or shrink a symbol of the TEI viewer when a touch from its initial position is slid at an angle and an amount of deflection that result in the touch moving into the range 3905. As can be seen, the transfer function 3910 has its maximum value of one at the center of the range 3905 (i.e., 90°) and the value of the transfer function gradually tails off from the center until a zero value is achieved at the ends of the overlapping regions. The maximum value represents the point at which the symbol is enlarged to its maximum size and the zero value represents the point at which the symbol is at its default size (i.e., not enlarged).

Figure 39B:
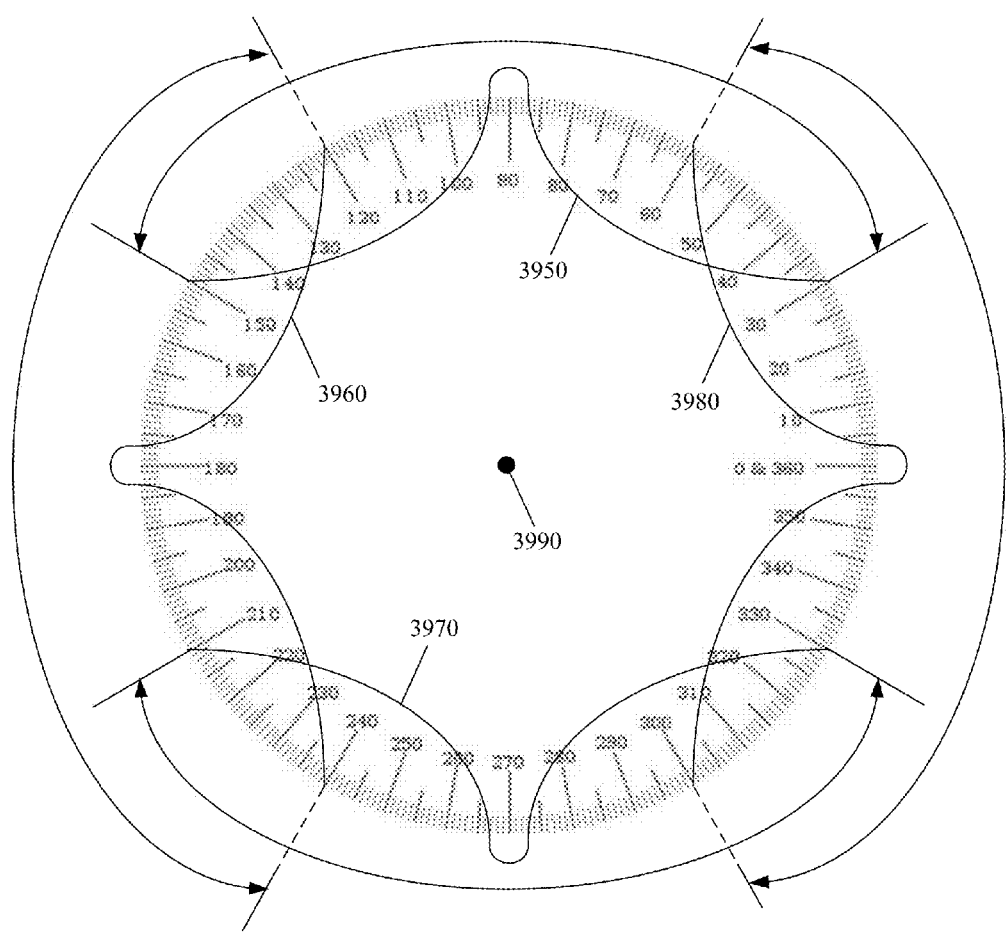

FIG. 39b illustrates the four range partitioning and the transfer function for each range conceptually used by the TEI system to perform symbol expansion in accordance with some embodiments. As shown there are four transfer functions 3950, 3960, 3970, and 3980. Transfer function 3950 spans over the range defined for a symbol in an expanded set of symbols of the TEI viewer that is in the "up" position with the range spanning between 30° to 150°; transfer function 3960 spans over the range defined for a symbol in an expanded set of symbols of the TEI viewer that is in the "left" position with the range spanning between 120° to 240°; transfer function 3970 spans over the range defined for a symbol in an expanded set of symbols of the TEI viewer that is in the "down" position with the range spanning between 210° to 330°; and transfer function 3980 spans over the range defined for a symbol in an expanded set of symbols of the TEI viewer that is in the "right" position with the range spanning between 300° to 30°. Also shown is the center point 3990. The center point 3990 represents the initial touch point where a slide begins and from where the TEI system performs the four range partitioning. When the user issues a touch and performs a slide of the touch, the TEI system defines the center pointer 3990 to be the position of the initial touch from where the slide began.

An example is now provided to explain the operation of the transfer functions. For this example, it is assumed that the user issues a touch and slides the touch at a 20° angle with some amount of deflection from the initial point of where the slide began. Based on this angle, the TEI system determines that only transfer function 3980 returns a positive value. This indicates that the slide should be used to enlarge a symbol at the right position in an expanded set of symbols of the TEI viewer. Based on prior disclosure, it should be apparent that the expanded set of symbols of the TEI viewer is determined based on the number of touches used to perform the slide and which fingers those touches correspond to. The TEI system directs the TEI viewer to enlarge the symbol at the right position based on the value indicated by the transfer function 3980.

In the above example, the slide was moved to a position that is within a non-overlapping region of a single range and so only one symbol in the TEI viewer was enlarged. However, when the slide transitions from a non-overlapping region of a first range into an overlapping region of the first and second ranges, the symbol that is associated with the first range is gradually decreased in size while the symbol that is associated with the second range gradually begins to increase in size as the slide enters into the region of the second range that overlaps with the first range. Continuing with the above example, as the touch is further slide from 20° to 35°, the angle falls within the overlapping region of the "up" and "right" ranges such that both transfer functions 3950 and 3980 produce positive values. As a result, the TEI viewer gradually reduces the enlarged size of the symbol at the right position because the transfer function 3980 returns a smaller value as the slide transitions from 20° to 35°. The TEI viewer also gradually increases the symbol at the up position as the slide transitions from 30° to 35°, wherein 30° is the angle at which the transfer function 3950 also produces a positive value. The overlapping regions are thus defined to provide a smooth transition in enlarging and reducing symbol sizes as the user touch transitions between the up, down, left, and right directions.

Figure 40:
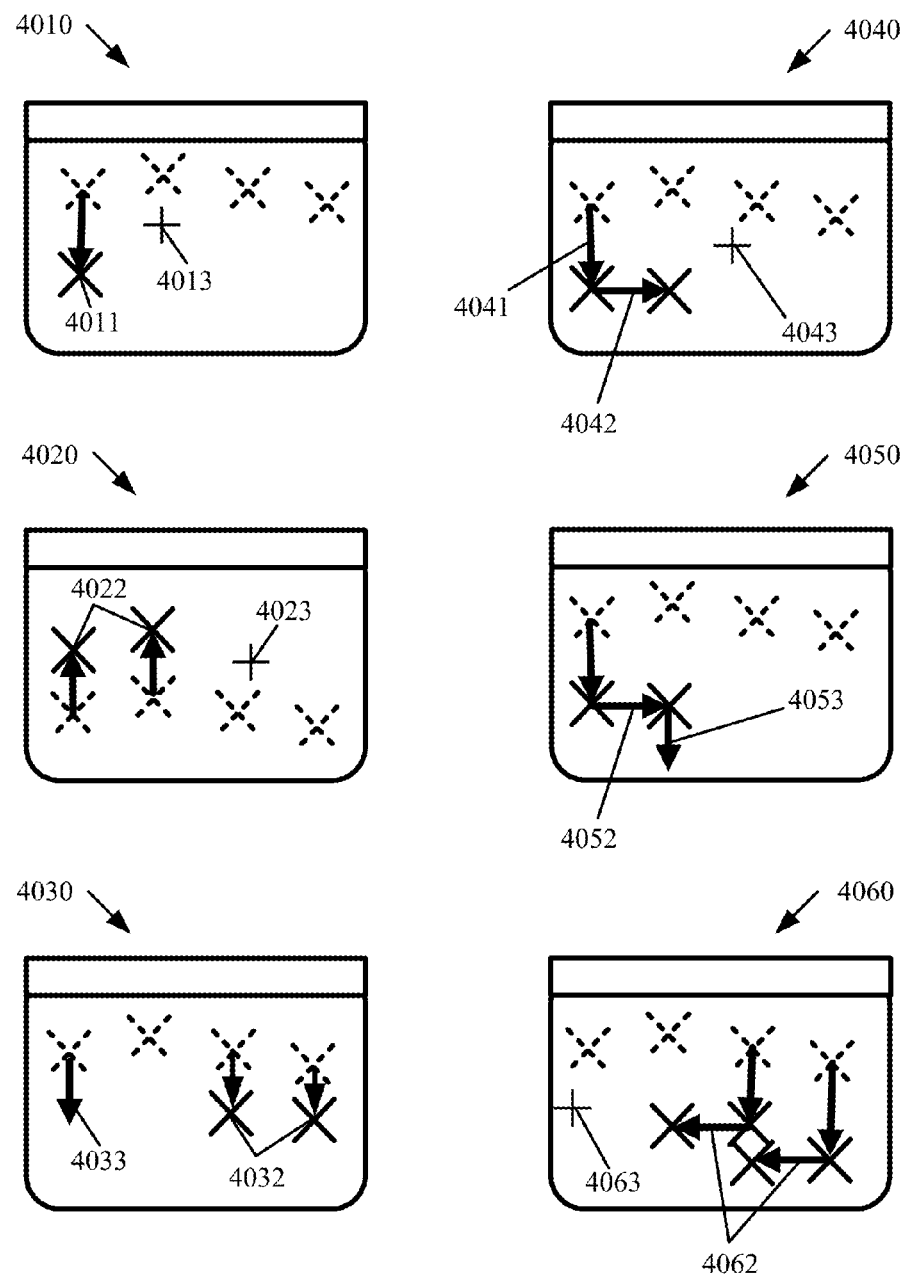
FIG. 40 provides various examples of using slides to access different set of operations using touch combinational slides in accordance with some embodiments.

In some embodiments, slides can be used to access different sets of operations instead of or in addition to expanding the topmost symbols. FIG. 40 provides various examples of using touch combinational slides to access different set of operations in accordance with some embodiments. This alternative use of the slide can be combined with the aforementioned symbol expansion functionality. Moreover, based on the directional identification performed by the TEI engine, the slides can include multi-part slides whereby different combinational directional slides access different sets of operations.

4010 depicts a touchpad wherein the user has already performed a four finger touch which has caused the TEI system to enter a particular LOCK mode. The four finger touch is represented by the four broken line "X" indications. Using the index finger, the user then performs a downward slide 4011 which began near the index finger home position, so it is assigned as an index finger touch. Since the touch is retained, the home positions are temporarily biased in the direction and length of the slide.

Because the user essentially stopped the slide movement for a period of time, the TEI engine allows for a new set of operations that may be invoked by any remaining touches, as long as the instigating slide 4011 does not substantially move. The TEI viewer presents the symbols for the remaining digits (middle, ring, little) that correspond with the index-down instigating slide for this particular previously invoked LOCK mode.

Next, the user issues a tap 4013 at a location that is somewhat below the home position designated for the middle finger. Due to the home positions being biased in a downward direction, the location of the tap 4013 is within an acceptable proximity to the middle finger designation, and is so assigned. The corresponding middle finger tap message is sent to the TEI database, which contains the output action that is invoked in response.

4020 is essentially similar to 4010, except that the instigating slide 4022 was performed in an upward direction, with starting locations corresponding with the index and middle fingers. The upward slide 4022 provides access to a different set of operations than the downward slide of the index finger in 4010. Also, the tap 4023 was assigned to the ring finger because the location of the touch was closest to that home position, which was biased by the average of the length and angle of the instigating slides.

4030 illustrates the ability of the TEI system to detect not only taps after a slide, but flicks as well. Similar to 4010 and 4020, four home positions were previously established. Then the user performed a downward slide 4032 using the ring and little fingers essentially simultaneously. As before, the downward slide 4032 provides access to yet another set of operations than those in 4010 and 4020. The user then issued a flick 4033 in the downward direction, using what was determined to be the index finger, due to the proximity to the downward-biased index finger home position.

In addition to sensing an instigating slide by one or more fingers, the TEI engine is capable of detecting one or more discrete directional slides associated with the slide instigation in some embodiments, as illustrated at 4040. As in the previous figures, the home positions were established. Then the user performed a downward slide with the index finger as indicated in the first arrow 4041. If there are corresponding actions that respond to an index-down slide, they would at this point be displayed on the TEI viewer. The user, however, does not leave the index finger stationary, and instead slides to the right as indicated in the second arrow 4042. This causes the TEI viewer to change to a new set of symbols that correspond with an index-down-right instigating slide. Specifically, the set of symbols identifies a set of operations that are now accessible based on the index-down-right instigating slide.

Next, the user issues a tap 4043, which is determined to be associated with the middle finger. Even though the location of the tap is in closer proximity to the home position for the ring finger, the combined downward and leftward biasing that was caused by the instigating slides causes the proximity to be closer to the middle finger.

As discussed previously with reference to 4030, a flick action can also invoke output actions after an instigating slide. This remains true when the instigating slide comprises two slides in different directions, as illustrated at 4050. As at 4040, home positions were established and an index-down-right instigating slide 4052 was performed. At this point the user performed a downward flick 4053, which causes that corresponding action to be invoked.

The TEI engine is able to discern instigating slides in one or more directions that are associated with one or more essentially simultaneous fingers, as is illustrated at 4060. With established home positions, the user issues a slide using the ring and little fingers 4062, which causes the TEI viewer to display symbols, if they exist in the TEI database, for the remaining index and middle fingers. The user issues a tap 4063 at a location that is determined to be associated with the index finger, and as such, the corresponding output action in the TEI database is invoked.

vi. NEW State

With reference to FIG. 30, the TEI engine 2960 begins in the OFF state. From the OFF state, the first touch event that is received by the TEI engine causes the TEI engine to transition to the NEW state where the event and subsequent events are aggregated and analyzed with other events and timing information to determine which operational mode or sub-mode to enter.

The TEI engine analyzes the events to determine for a given user action the number of touches involved, the position and movement of each touch, and the duration of each touch. This information is acquired from the events that are generated by the system software wherein the events specify state (e.g., begin, move, end), an identifier, and x-y coordinates for each touch. The TEI system may also utilize other representations and information associated with the particular touch hardware output. Furthermore, in some embodiments, the TEI system is incorporated into the firmware of the touch hardware, providing additional vocabulary to the output communications from the touch device.

The TEI engine starts a timer for each received event that identifies a new touch in the begin state. The timer runs until the TEI receives an event that specifies an end state for that touch. The TEI engine identifies which timer to stop based on the identifier that is provided as part of the received end event. The TEI engine monitors the timer for each touch to determine whether to categorize the touch as a hold. In some embodiments, when the timer reaches 10 milliseconds, the touch is categorized as a hold and the TEI engine enters a HOLD sub-mode that is associated with the one or more touches being held.

To identify a tap, the TEI engine analyzes the received events to determine whether (i) a begin event and an end event that specify the same touch identifier are received within a particular time threshold and that (ii) the distance between the x-y coordinates of the begin event and the end event do not exceed a particular distance range. In other words, the touch and release for a tap must occur relatively close to one another in time and distance. When a four finger tap is identified, the TEI engine enters the last active LOCK sub-mode.

As described above, to identify a flick, the TEI engine analyzes the received events to determine (i) that an end event for a particular touch is received and (ii) that the distance that the particular touch traveled within a particular time period exceeds a particular distance range. When a four finger flick up, left, or right is detected, the TEI engine enters different LOCK sub-modes. Other received events may be ignored or may cause the TEI engine to enter the TRACK operational mode.

vii. TRACK/LOCK/HOLD Operational Mode

When in any of the LOCK or HOLD sub-modes, the TEI engine generates different enhanced events in response to user actions. The enhanced events pass from the TEI engine to the TEI database where they are ignored or used to perform various operations.

In some embodiments, an enhanced event includes two parameters. The first parameter is an identifier for identifying which sub-mode is active. For example, with reference to FIG. 1, when the LOCK sub-mode 155 is active, the TEI engine generates enhanced events with the "ABC1" identifier and when the HOLD sub-mode 180 is active, the TEI engine generates enhanced events with the "ARRW" identifier.

As was discussed above, the second parameter is a set of four characters that identify a hold, tap, no touch, or directional flick of each of the index, middle, ring, and little fingers. Accordingly, when the LOCK sub-mode 155 is active, the index and middle fingers are flicked upwards, and the ring and little fingers are not used to issue a touch, the TEI engine generates the following enhanced event:

ABC1_UUoo                                        (3)

In the enhanced event (3) above, the prefix "ABC1" identifies the sub-mode that is active, the first "U" represents an upward flick of the index finger, the second "U" represents an upward flick of the middle finger, the first "o" represents that no touch for the ring finger was detected, and the second "o" represents that no touch for the little finger was detected. Other representations for the second parameter include: the letter "x" to represent that a touch has been held down for a particular time threshold (i.e., hold), the letter "T" to represent a tap, the letter "D" to represent a downward flick, the letter "L" to represent a leftward flick, and the letter "R" to represent a rightward flick.

The enhanced events pass from the TEI engine to the TEI database. The enhanced events are compared against entries of the TEI database to determine whether the identifier (e.g., "ABC1") of the enhanced event identifies a set of operations and whether the user action in the enhanced event (e.g., "UUoo") performs a particular operation in the set of operations.

When the enhanced event does not identify an entry in the TEI database, the enhanced event is ignored or is passed to the device's event handler. When an entry is identified, the TEI database performs the identified operation. Performing the operation may include invoking an output action, performing a text manipulation operation, or inserting characters into a text field. Each TEI database entry stores code, scripts, function calls, API calls, or instructions for performing the various operations. In some embodiments, the identified code, scripts, calls, or instructions are executed by an execution component of the TEI database.

When in a sub-mode or an operational mode, the TEI engine continually issues enhanced events irrespective of whether the enhanced events perform an operation. The TEI engine alters the first parameter of the enhanced events in response to changes in the sub-mode or operational mode.

In some embodiments, the TEI engine enters the TRACK operational mode and utilizes the "TRAK" identifier for the enhanced events whenever the events received in the OFF state do not cause the TEI engine to enter a LOCK sub-mode or a HOLD sub-mode. The TRACK enhanced events generated by the TEI engine do not cause any operations within the TEI database to be performed. This allows the device to perform preexisting touch gestures without interference by the TEI system. When the touch gestures are complete (i.e., all touches released), the TEI engine returns to the OFF state.

B. TEI Viewer

In some embodiments, the TEI viewer is an optional application of the TEI system. The TEI viewer may be a standalone application that is controlled by the TEI engine or the TEI viewer may be incorporated as part of the TEI engine. The symbols for the TEI viewer are stored in the TEI database. Whenever the sub-mode or operational mode of the TEI engine changes, different sets of symbols are provided to the TEI viewer from the TEI database. The TEI database further stores the expanded sets of symbols for when a slide is performed in the LOCK operational mode. Based on the angle and amount of deflection associated with a slide, the TEI viewer adjusts the size of the expanded symbols. Whenever the TEI engine reverts to the OFF state, the TEI engine causes the TEI viewer to be hidden.

Optional settings specified within the TEI engine can be used to customize the behavior of the TEI viewer. For example, a first setting can specify a one second delay in displaying the TEI viewer when a particular HOLD sub-mode becomes active, a second setting can specify a 100 ms delay in displaying the TEI viewer when a particular LOCK sub-mode becomes active, and a third setting can specify not displaying the TEI viewer when a sub-mode that provides access to character insertion operations becomes active.

Some embodiments provide a software application that allows users to specify which symbols to display when a particular LOCK sub-mode or HOLD sub-mode is active. In so doing, users can also specify which operations may be performed using the various directional flicks or taps of one or more touches. The software application then updates the TEI database with the user customizations. In some embodiments, the software application is a web application that the user may access through a browser on the touch-based device. From the browser, the user can change the symbol configurations and the operations that may be performed.

In some embodiments, users customize the TEI viewer display by inserting and removing symbols from the TEI viewer to specify which symbols are displayed in the different sub-modes. A symbol can be added to the TEI viewer by dragging the symbol from the desktop, menu, etc. and dropping the symbol onto a desired location of the TEI viewer such that the operation that is associated with the symbol is performed using a desired touch combination. A symbol can be removed from the TEI viewer by dragging the symbol off of the TEI viewer to a recycle or trash icon.

III. Electronic Device

Many of the above-described processes and modules are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computer system are meant in their broadest sense, and may include any electronic device with a processor that executes instruction stored on computer-readable media or that are obtained remotely over a network connection. Examples of computer-readable media include, but are not limited to, CD-ROMs, flash drives, RAM chips, hard drives, EPROMs, etc. Further, wherever a server, computer, or computer system is identified as a component of the embodied invention, it is understood that the server, computer, or computer system may be a single physical machine, a cluster of multiple physical machines performing related functions, virtualized machines co-resident on a single physical machine, or various combinations of the above.

Figure 41:
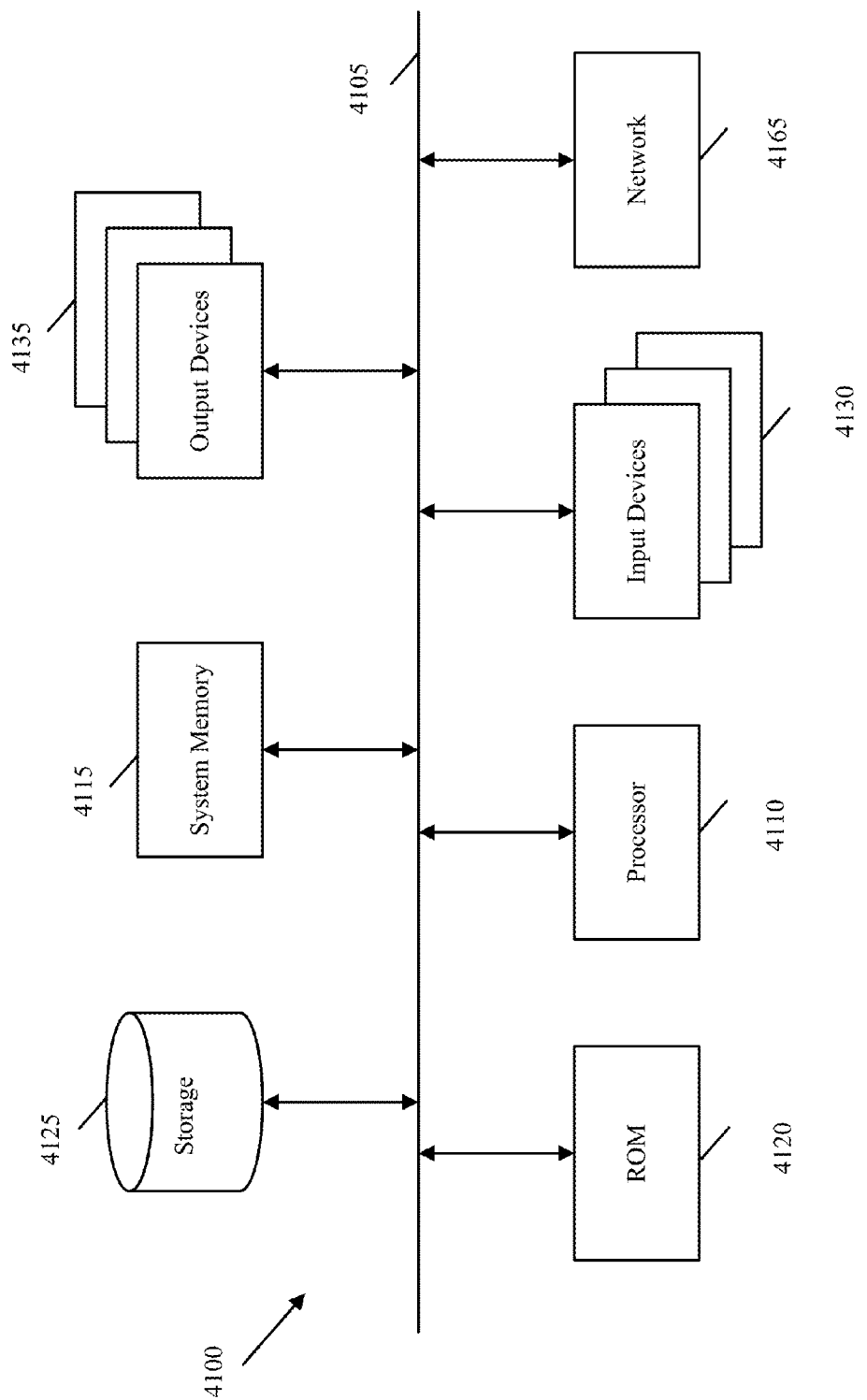
FIG. 41 illustrates a touch-based electronic device with which some embodiments are implemented.

FIG. 41 illustrates a touch-based electronic device with which some embodiments are implemented. Such a touch-based electronic device includes various types of computer-readable mediums and interfaces for various other types of computer-readable mediums that implement the various processes, modules, viewers, and engines described above (e.g., the TEI engine and the TEI viewer). Touch-based electronic device 4100 includes a bus 4105, a processor 4110, a system memory 4115, a read-only memory 4120, a permanent storage device 4125, input devices 4130, and output devices 4135.

The bus 4105 collectively represents all system, peripheral, and chipset buses that communicatively connect the numerous internal devices of the computer system 4100. For instance, the bus 4105 communicatively connects the processor 4110 with the read-only memory 4120, the system memory 4115, and the permanent storage device 4125. From these various memory units, the processor 4110 retrieves instructions to execute and data to process in order to execute the processes of the invention. The processor 4110 is a processing device such as a central processing unit, integrated circuit, graphical processing unit, etc.

The read-only-memory (ROM) 4120 stores static data and instructions that are needed by the processor 4110 and other modules of the computer system. The permanent storage device 4125, on the other hand, is a read-and-write memory device. This device is a non-volatile memory unit that stores instructions and data even when the touch-based electronic device 4100 is off. Some embodiments of the invention use a mass-storage device (such as a magnetic or optical disk and its corresponding disk drive) as the permanent storage device 4125.

Other embodiments use a removable storage device (such as a flash drive) as the permanent storage device. Like the permanent storage device 4125, the system memory 4115 is a read-and-write memory device. However, unlike the storage device 4125, the system memory is a volatile read-and-write memory, such as random access memory (RAM). The system memory stores some of the instructions and data that the processor needs at runtime. In some embodiments, the processes are stored in the system memory 4115, the permanent storage device 4125, and/or the read-only memory 4120.

The bus 4105 also connects to the input and output devices 4130 and 4135. The input devices enable the user to communicate information and select commands to the computer system. The input devices 4130 include any of a capacitive touchscreen, resistive touchscreen, any other touchscreen technology, a trackpad that is part of the device or attached as a peripheral, a set of touch sensitive buttons or touch sensitive keys that are used to provide inputs to the device, or any other touch sensing hardware that detects multiple touches and that is coupled to the device or is attached as a peripheral. The input devices 4130 may also include alphanumeric keypads (including physical keyboards and touchscreen keyboards), pointing devices (also called "cursor control devices"). The output devices 4135 display images generated by the touch-based electronic device. For instance, these devices display the TEI viewer symbols. The output devices include printers and display devices, such as cathode ray tubes (CRT) or liquid crystal displays (LCD).

Finally, as shown in FIG. 41, bus 4105 also couples touch-based electronic device 4100 to a network 4165 through a network adapter (not shown). In this manner, the electronic device 4100 can be a part of a network of devices (such as a local area network ("LAN"), a wide area network ("WAN"), cellular, WiFi, or an Intranet, or a network of networks, such as the Internet. For example, the touch-based electronic device 4100 may be coupled to a web server (network 4165) so that a web browser executing on the touch-based electronic device 4100 can interact with the web server as a user interacts with a GUI that operates in the web browser.

As mentioned above, the touch-based electronic device 4100 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A method of adapting user touches on a touch sensitive surface for performing operations on a computing device, the method comprising:
   detecting a first touch action, said detecting comprising identifying a first set of distinct touches involved in the first touch action and a location for each of the distinct touches;
   selecting a particular operational mode from a plurality of operational modes when the first set of distinct touches comprises at least two distinct touches and when each touch of the first set of distinct touches is issued as a tap or directional flick, each operational mode of the plurality of operational modes enabling access to a different set of operations from a plurality of operations while disabling pointer movement, clicking, dragging, and scrolling;
   mapping invocation of a first subset of operations enabled by the particular operational mode to individual touches of an index finger, middle finger, ring finger, and little finger, invocation of a different second subset of operations enabled by the particular operational mode to different two touch combinations involving different pairs of the index finger, middle finger, ring finger, and little finger, and a different third subset of operations enabled by the particular operational mode to different three touch combinations of the index finger, middle finger, ring finger, and little finger;
   detecting a second touch action, said detecting comprising identifying a second set of distinct touches involved in the second touch action and a location for each of the distinct touches;
   corresponding each distinct touch of the second touch action to controls defined for a different finger based on a mapping of each touch of the first touch action to one of the index finger, middle finger, ring finger, and little finger and further based on a location of each distinct touch of the second touch action to a distinct touch of the first touch action; and
   performing an operation from the set of operations enabled by the particular operational mode based on which of the index, middle, ring, and little fingers each distinct touch of the second set of distinct touches corresponds to and a number of touches issued as part of the second touch action, wherein said performing comprises performing an operation from the first subset of operations when the number of touches issued as part of the second touch action is one, performing an operation from the second subset of operations when the number of touches issued as part of the second touch action is two, and performing an operation from the third subset of operations when the number of touches issued as part of the second touch action is three.

2. The method of claim 1 further comprising displaying a set of symbols identifying which finger and finger combinations perform which operation of the set of operations.

3. The method of claim 2, wherein the displaying the set of symbols comprises displaying a pyramidical arrangement for the set of symbols comprising a plurality of rows of symbols with each row of symbols comprising one more symbol than a row that precedes it and a base row comprising a symbol identifying an individual finger for performing an operation identified by the symbol.

4. The method of claim 1, wherein selecting the particular operational mode comprises selecting a first operational mode from a plurality of operational modes enabling access to a first set of operations from the plurality of operations when each touch of the first set of distinct touches is issued as a tap and selecting a different second operational mode from the plurality of operational modes enabling access to a different second set of operations from the plurality of operations when each touch of the first set of distinct touches is issued as a directional flick.

5. The method of claim 1, wherein selecting the particular operational mode comprises selecting a first operational mode from a plurality of operational modes enabling access to a first set of operations from the plurality of operations when each touch of the first set of distinct touches is issued as a directional flick in a first direction and selecting a different second operational mode from the plurality of operational modes enabling access to a different second set of operations from the plurality of operations when each touch of the first set of distinct touches is issued as a directional flick in a second direction that is different than the first direction.

6. The method of claim 1, wherein detecting the second touch action further comprises identifying an action used in issuing the second touch action, wherein the action comprises one of a tap, hold, directional slide, and directional flick.

7. The method of claim 6, wherein performing the operation comprises performing a first operation when the action is a tap and performing a second operation when the action is one of a hold, directional slide, and directional flick.

8. The method of claim 6, wherein performing the operation comprises performing a first operation when the action is a directional flick and performing a second operation when the action is one of a tap, hold, and directional slide.

9. The method of claim 1 further comprising generating a computer message identifying each distinct touch of the second touch action corresponding to any of the index finger, middle finger, ring finger, and little finger and a direction that each touch of the second touch action is moved in issuing the second touch action.

10. The method of claim 9, wherein performing the operation comprises performing an operation from the set of operations that is called using a finger combination and direction of each finger as identified by the computer message.

11. A method of adapting user touches on a touch sensitive surface for performing operations on a computing device, the method comprising:
 detecting a first touch action comprising at least one touch held down beyond a specified duration;
 associating each touch of the first touch action to any of an index finger, middle finger, ring finger, and little finger based on a location of each touch of the first touch action relative to one another;
 providing access to a set of a plurality of operations by determining which one or more fingers associated with at least one touch of the first touch action are held down beyond the specified duration; and
 performing a particular operation from the set of operations based on a detected second touch action comprising the at least one touch of the first touch action that is held being retained and at least one other touch that is tapped, slid, or flicked.

12. The method of claim 11 further comprising establishing positions for at least the index finger, middle finger, and ring finger based on at least a three finger touch that is issued as the first touch action and further associating each touch of the first touch action based on a location of each touch of the first touch action relative to positions of the three finger touch.

13. The method of claim 11, wherein providing access to the set of operations comprises providing access to a first set of operations from the plurality of operations when the at least one touch that is held down beyond the specified duration is associated with a first set of the index finger, middle finger, ring finger, and little finger and providing access to a different second set of operations from the plurality of operations when the at least one touch that is held down beyond the specified duration is associated with a different set of the index finger, middle finger, ring finger, and little finger.

14. The method of claim 11, wherein the set of operations comprises at least one of a set of operations for invoking different output actions, a set of operations for inserting text, and a set of operations for manipulating selected text.

15. The method of claim 11 further comprising changing access from the set of operations to a different set of operations from the plurality of operations when (i) a touch is added to or (ii) a touch is released from the at least one touch of the first touch action that is held down beyond the specified duration.

16. The method of claim 11, wherein performing the particular operation comprises performing a first operation of the set of operations when the at least one other touch of the second touch action is a tap at a first location and performing a different second operation of the set of operations when the at least one other touch of the second touch action is a tap at a second location that deviates from the first location by a threshold distance.

17. The method of claim 11, wherein performing the particular operation comprises performing a first operation of the set of operations when the at least one other touch of the second touch action is any one of a flick and slide in a first direction and performing a different second operation of the set of operations when the at least one other touch of second touch action is any one of a flick and slide in a second direction that is different than the first direction.

18. The method of claim 11 further comprising disabling access to the set of operations when all touches of the first touch action are released.

19. A method of adapting user touches on a touch sensitive surface for performing operations on a computing device, the method comprising:
 enabling access to a set of a plurality of operations based on a first touch action comprising at least a first, second, and third touches, wherein enabling access to the set of operations comprises disabling pointer movement, clicking, dragging, and scrolling in response to subsequent touch actions; and
 associating control of a first subset of operations from the set of operations to a first directional movement of different individual touches and combination of touches of the at least first, second, and third touches and control of a different second subset of operations from the set of operations to a different second directional movement of the different individual touches and combination of touches of the at least first, second, and third touches;
 detecting a second touch action involving at least one touch and a directional movement of the at least one touch of the second touch action;
 determining a correspondence between each touch of the second touch action and at least one of the at least first, second, and third touches of the first touch action; and
 performing an operation from the set of operations based on a number of touches of the second touch action, said correspondence of each touch of the second touch action to each touch of the first touch action, and the directional movement, wherein performing the operation comprises performing an operation from the first subset of operations when the directional movement for the second touch action is in the first direction and performing an operation from the second subset of operations when the directional movement for the second touch action is in the second direction.

20. The method of claim 19, wherein enabling access to the set of operations further comprises enabling access to a first set of operations from the plurality of operations when the first touch action comprises a tap and enabling access to a different second set of operations from the plurality of operations when the first touch action comprises a directional flick, wherein the first set of operations and the second set of operations exclude pointer movement and scrolling operations.

* * * * *